United States Patent
Gross

(10) Patent No.: US 10,475,136 B2
(45) Date of Patent: Nov. 12, 2019

(54) SOCIAL CONTENT CONNECTION SYSTEM AND METHOD

(71) Applicant: John Nicholas and Kristin Gross Trust U/A/D Apr. 13, 2010, Berkeley, CA (US)

(72) Inventor: John Nicholas Gross, Berkeley, CA (US)

(73) Assignees: John Nicholas, Berkeley, CA (US), Trust U/A/D April 13, 2010; Kristin Gross, Berkeley, CA (US), Trust U/A/D April 13, 2010

( * ) Notice: Subject to any disclaimer, the term of this patent is extended or adjusted under 35 U.S.C. 154(b) by 992 days.

(21) Appl. No.: 14/631,796

(22) Filed: Feb. 25, 2015

(65) Prior Publication Data
US 2015/0242755 A1 Aug. 27, 2015

Related U.S. Application Data

(60) Provisional application No. 61/944,215, filed on Feb. 25, 2014.

(51) Int. Cl.
*G06Q 50/00* (2012.01)
(52) U.S. Cl.
CPC .................................. *G06Q 50/01* (2013.01)
(58) Field of Classification Search
CPC . G06Q 50/01; G06Q 30/0241; G06F 16/9535
See application file for complete search history.

(56) References Cited

U.S. PATENT DOCUMENTS

| | | | |
|---|---|---|---|
| 8,321,261 B2 | 11/2012 | Gross | |
| 8,606,721 B1* | 12/2013 | Dicker | G06Q 50/01 705/319 |
| 8,626,608 B2 | 1/2014 | Gross | |
| 2008/0077574 A1* | 3/2008 | Gross | G06F 17/30699 |
| 2009/0177691 A1* | 7/2009 | Manfredi | G06F 17/3089 |
| 2010/0100416 A1* | 4/2010 | Herbrich | G06Q 30/02 705/7.32 |
| 2010/0100516 A1* | 4/2010 | Zhou | G06N 5/02 706/46 |
| 2011/0288919 A1* | 11/2011 | Gross | G06Q 30/02 705/14.19 |
| 2012/0084160 A1 | 4/2012 | Badros et al. | |
| 2012/0109757 A1 | 5/2012 | Kendall et al. | |
| 2012/0124073 A1* | 5/2012 | Gross | G06F 17/30873 707/767 |
| 2012/0151322 A1* | 6/2012 | Lindsay | H04L 51/32 715/234 |
| 2012/0179557 A1* | 7/2012 | Gross | G06Q 30/02 705/14.73 |

(Continued)

OTHER PUBLICATIONS

SalesForce.com, Inc., "The Facebook Ads Benchmark Report," https://www.salesforcemarketingcloud.com, Jun. 2013.

(Continued)

*Primary Examiner* — Kakali Chaki
*Assistant Examiner* — Ababacar Seck

(57) ABSTRACT

A content engagement system includes game logic configured to help users and their social contacts to find interesting content. The outputs can be used for optimizing ads, content, search results, etc., on mobile devices, social networking sites and similar domains.

17 Claims, 49 Drawing Sheets

(56) References Cited

U.S. PATENT DOCUMENTS

| | | |
|---|---|---|
| 2013/0031034 A1 | 1/2013 | Gubin et al. |
| 2013/0103692 A1* | 4/2013 | Raza .................. G06Q 30/02 |
| | | 707/741 |
| 2013/0179271 A1 | 7/2013 | Adams et al. |
| 2013/0246521 A1* | 9/2013 | Schacht .............. G06Q 50/01 |
| | | 709/204 |

OTHER PUBLICATIONS

Seufert, B. "Minimum Viable Metrics for Mobile," Mobile Dev Memo website, Feb. 5, 2013.

\* cited by examiner

| Users | Items | 1 | 2 | 3 | 4 | 5 |
|---|---|---|---|---|---|---|
| A | | R1 | - | R2 | - | - |
| B | | - | - | - | R3 | - |
| C | | - | R4 | R5 | - | - |
| D | | R6 | - | - | - | R7 |
| E | | - | - | - | - | - |

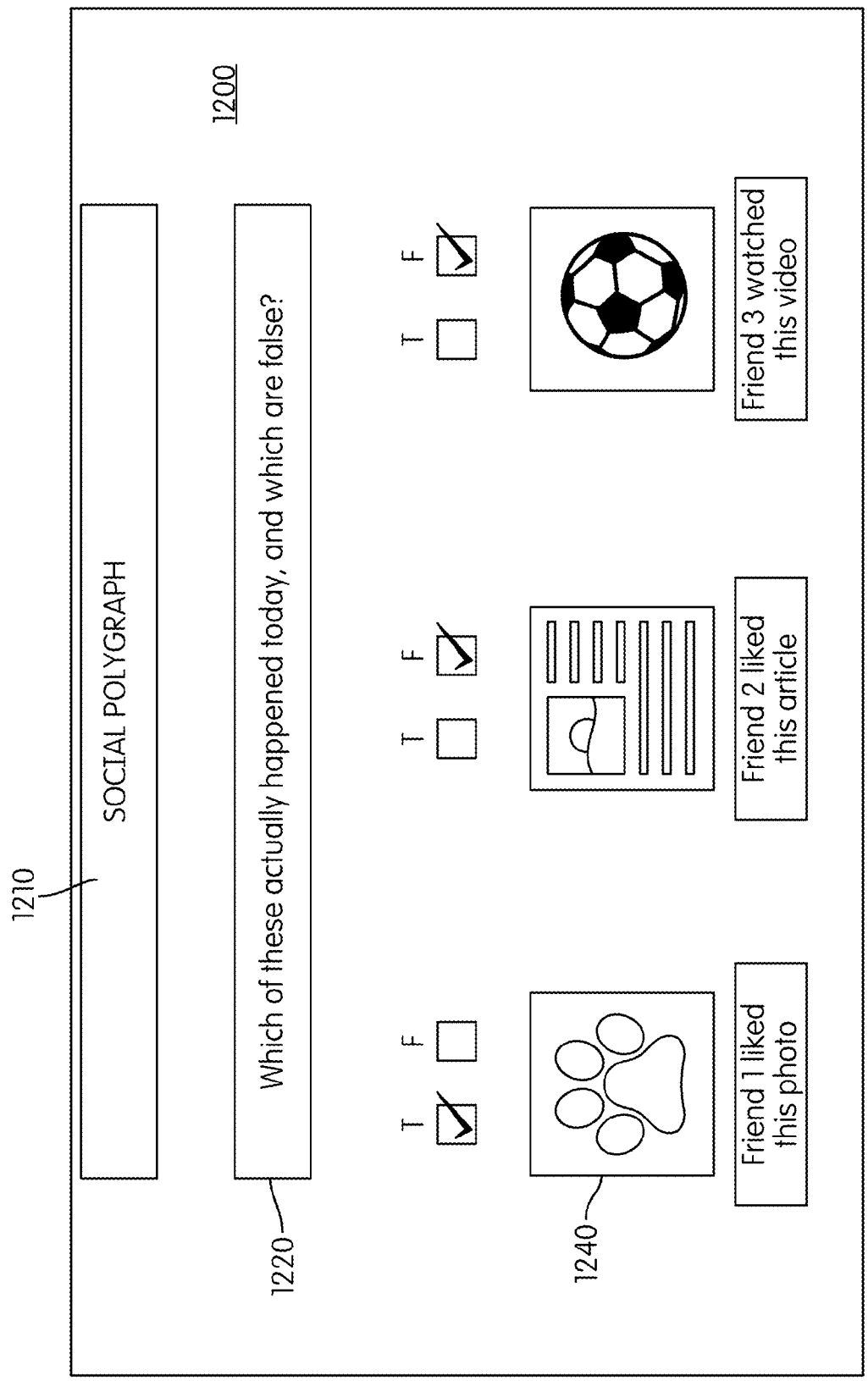

ACTIVITY JEOPARDY: V.1

| BILL | JANE | RON | GLAYDE | SARA |
|------|------|-----|--------|------|
| $100 | $100 | $100 | $100 | $100 |
| $200 | $200 | $200 | $200 | $200 |
| $300 | —    | —    | —      | —    |
| $400 | —    | —    | —      | —    |
| $500 | —    | —    | —      | $500 |

ACTIVITY JEOPARDY: V.2

| Likes | Photos | Music | Articles | Posts |
|-------|--------|-------|----------|-------|
| $100  | $100   | $100  | $100     | $100  |
| $200  | $200   | $200  | $200     | $200  |
| $300  | —      | —     | —        | —     |
| $400  | —      | —     | —        | —     |
| $500  | —      | —     | —        | $500  |

ACTIVITY BINGO

| Likes | Photos | Music | Articles | Posts |
|-------|--------|-------|----------|-------|
| Bill  | —      | —     | —        | —     |
| Joe   | —      | —     | —        | —     |
| Ned   | —      | FREE  | —        | —     |
| Nancy | —      | —     | —        | —     |
| Eric  | —      | —     | —        | —     |

FIG. 17

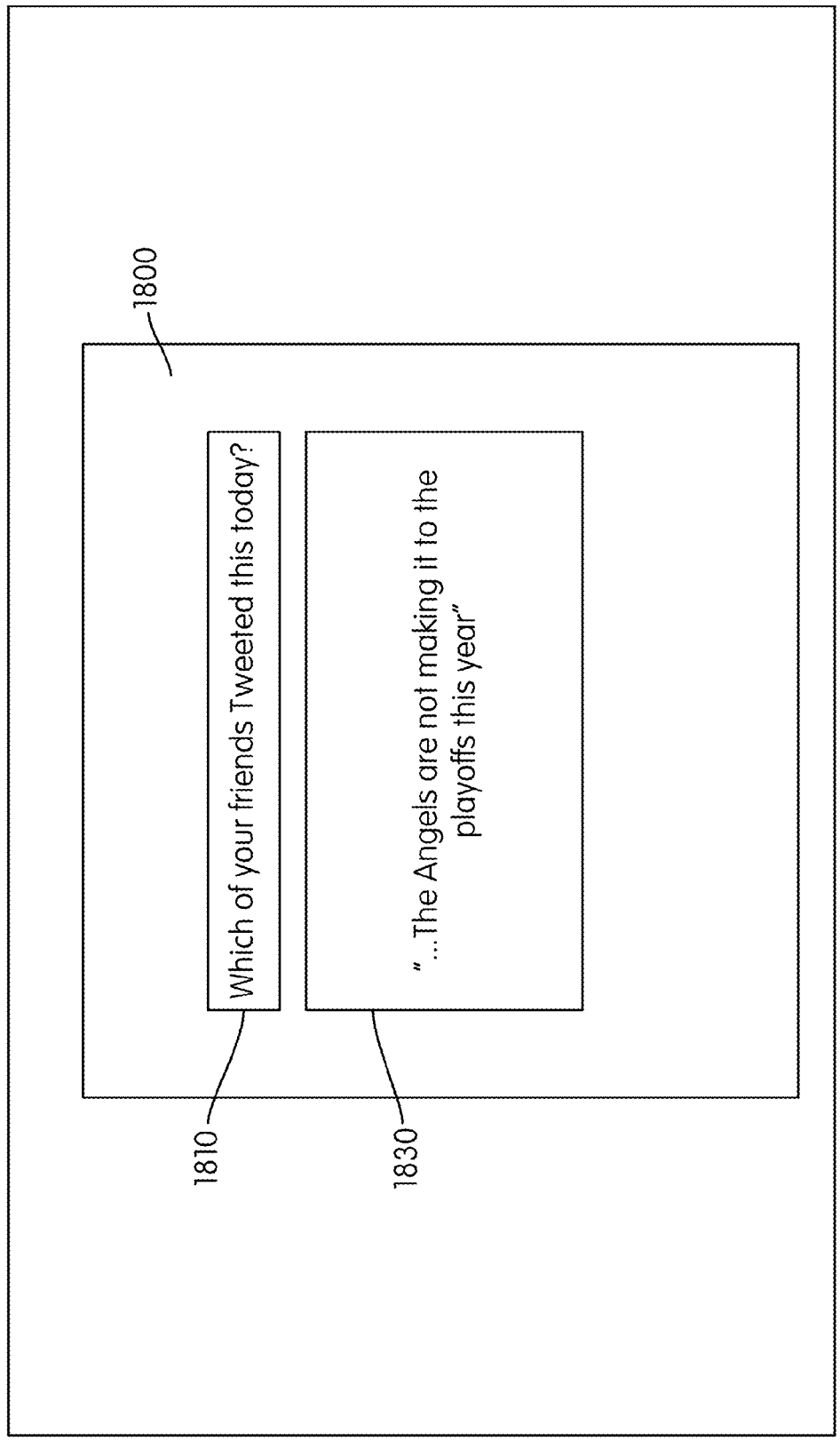

SOCIAL CONTENT CONNECTION SYSTEM AND METHOD

RELATED APPLICATION DATA

The present application claims the benefit under 35 U.S.C. 119(e) of the priority date of Provisional Application Ser. No. 61/990,429 filed Feb. 27, 2014 which is hereby incorporated by reference herein.

FIELD OF THE INVENTION

The present invention relates to automated tools, methods and systems that enhance user engagement with content, application programs, advertising, etc. The invention has particular utility in the areas of social gaming and social networking, mobile applications, content publishing and advertising delivery networks.

BACKGROUND

It is well known in the Internet industry that some of the primary benchmarks by which online websites are measured include: a) ability to attract new visitors; b) visitor time/interaction on site or with the content; and c) user (subscriber) retention rate. With respect to the first benchmark, the current emphasis in research is on developing computing systems that are more effective at attracting visitors through enhanced user targeting, optimized content, customized engagement, etc. Conventionally this is done through targeted advertising to customized audiences (i.e., particular demographics, particular interests) which attempts to engage users and deliver eyeballs to the site/content in question. In other words, an outdoor activities magazine publisher may try to attract subscribers by delivering ads to social network members of a particular gender, age, location who have identified "camping" as an interest.

But current targeted advertising algorithms have limited effectiveness, even when those algorithms have access to a user's social/interest graphs. In other words, the measured click through rate (CTR) of current techniques is usually small, and/or the ratio of impressions to actions is small. As research has revealed, the CTR can be as low as 0.01% for most ads. Some social network sites have improved this rate by placing advertising content directly in user newsfeeds, instead of in typical side banner locations. In today's market, it is desirable to achieve significantly higher rates (on the order of 4-5%). The cost to achieve these rates may be high, because cost is based on charging per click (CPC) (or some other engagement) or per impression (CPM). A recent report by SalesForce.com, Inc., (SalesForce.com, Inc., "The Facebook Ads Benchmark Report," Internet. Available at https://www(dot)salesforcemarketingcloud(dot)com/wp-content/uploads/2013/06/The-Facebook-Ads-Benchmark-Report.pdf. June, 2013.), the contents of which are incorporated by reference in their entirety, discusses these factors.

A notable result of this survey is the fact that computing systems configured to deliver certain types of ads (Sponsored Page Post Like Story) achieve more than 100 times better engagement rates than systems that only present conventional external website ads. These more effective types of ads incorporate content directly about a specific social network user and a specific merchant and are broadcast to members of the user's social graph.

Thus for a social networking site, or content publishing site, acquiring new users/customers solely through current advertising computing techniques is unpredictable, inefficient and expensive.

The second metric that conventional computing systems are measured against is their ability to engage and maintain user interest after users arrive at the Internet property/document. This benchmark is typically measured by monthly/daily active users based on time spent on site/session, actions taken, and so on. For example, Twitter (one social networking site) measures the number of timeline views for each user. In the case of Facebook, another social networking site, an active user is defined as a person who took an action to share content or activity with another friend. Other engagement metrics include statistics such as bounce rate; pages or content views per visit; number of shares of content per visit; average visit time on site, and so on. When a computing system is able to engage and retain a user's attention longer, the result is site bonding, opportunities for presenting advertising, new content, etc. Again, with all things being equal, systems that increase these figures relative to other systems are demonstrably more useful and desirable.

Finally, another metric is user retention rate, meaning, if a user is a member or subscriber, how well does the site's engagement logic retain such members? One standard benchmark measures such basic information as the number of members at the beginning of a period, the number of members at the end, and the number of new members. From these pieces of information, an online entity can compute basic benchmarks like retention rate, churn, etc. A recent article by Seufert (Seufert, B. "Minimum Viable Metrics for Mobile," Internet. Available at http://mobiledevmemo(dot)com/minimum-viable-metrics/, Feb. 5, 2013), the contents of which are incorporated by reference in their entirety, provides a good summary of these metrics.

The Seufert article makes mention of another parameter, too, called "virality," which is a key metric for mobile applications ("apps"). Generally speaking, one wants users to spread the adoption of apps through sharing, and this is measured by computing the average number of additional users each user introduces to the app. Achieving good virality figures is important because it substantially reduces the cost of advertising and overall user acquisition costs. As above, one focus of current research is on developing new computing systems which improve these figures compared to their predecessors.

It would be desirable, therefore, to develop new computing systems which improve the above metrics. Industries which have particular needs for improving their computing systems to perform better under these benchmarks include social networks and content publishing sites. These entities require continuous member growth and long retention to maintain profitability and sustainability. The established news/publishing industry in particular (e.g., The New York Times) is under severe pressure to monetize their content to readers and, to date, has been unable to compete against new era content providers using conventional technologies. Similarly, social network sites suffer from member attrition, because user engagement across social graphs is not targeted or attentive to user retention.

Prior art techniques solicit suggestions from friends for content. An app known as "Side" for example allows members to answer questions about other members. The questions are not directed to social graph activities or specific predictions per se, but rather open ended potential outside lifestyle activities. An example of a system that predicts user responses is described by Raza et al. in U.S. Patent Application Publication No. 2013/0103692, which is incorporated by reference herein. These existing apps require too much time and investment on the part of the user. In particular, the user is required to define a question that he/she is interested in, as opposed to presenting a predefined question on a single entry (rating) on something a user has already done (read an article). In addition while these apps are useful, they lack any substantial fun and game aspects, feedback, etc. which limits their use.

SUMMARY OF THE INVENTION

Primary objects of the present invention, therefore, are to reduce and/or overcome the aforementioned limitations of the prior art.

An aspect of the disclosure includes systems and methods that implement a social graph for recommending content to users of a social network. Such systems/methods generally generate a first prediction for a first rating that a first user would give to a first item; the first predicted rating is based at least in part on a prior second prediction given by a social network contact on the first prediction for the first rating that the first user would give to the first item.

Yet another aspect is to implement systems/methods of recommending content to users of a social network based on values embodied in a social graph. The system operates by monitoring and measuring user activities to create edges and nodes for the social graph connecting the users to each other as well as to a set of items. The social graph is stored in an electronic data file identifying the edges, nodes and associated values of each. A first prediction is solicited from a second user connected in the social graph to the first user concerning a first rating that the first user would give to a target item in the set of items. The target item is represented by a first node that is not yet connected to the first user in the social graph. A tentative edge is then created connecting the first node for the target item to the first user based in part at least on the first prediction. Thus recommendations for one of the set of items, including the target item, are based in part at least on said tentative edge.

Still another aspect concerns systems and methods of implementing content based games for mobile applications, social network sites and similar domains. Generally such systems operate by recommending content to users of a social network as part of a content game, including generally the steps of: presenting a first content item to a first user; collecting a predicted first rating for a second user concerning the first content item from the first user within a content game interface; performing an automated comparison of the predicted first rating against an actual second rating given by the second user for the first content item; and allocating a number of game points to the first user in accordance with a result of the automated comparison.

Still another aspect concerns systems that implement methods of conducting a content game on an e-commerce website with a computing system. Such computing systems perform such operations as: processing a first rating from a first user for a first content item reviewed by the first user with the computing system; processing a predicted second rating for a second user concerning the first content item from the first user with the computing system; processing a first action prediction from a first user for a first action to be undertaken by the second user on the e-commerce website with the computing system; processing an actual second rating provided by the second user for the first content item with the computing system; performing an automated comparison of the first rating, the predicted first rating and the actual second rating; allocating a number of game points to the first user in accordance with a result of the automated comparison; generating a content comparison score identifying a content interest correlation between the first user and the second user.

Other aspects are directed to optimizing engagement timing for content in social networks and other game platforms to maximize engagement rates, response rates, etc. This is done, by among other things, selecting optimal engagement times, optimal users for engagement, and so on. Recommender systems, search systems and advertising systems are also implementable with the benefit of the current teachings to increase attention, reach and engagement with content from such systems.

Further aspects include automated tools for increasing user engagement with members of a social graph, and self-associated groups for such user, including through lightweight surveys, self-ratings, impression ratings, guesses, prediction ratings and other discovery mechanisms that facilitate social discourse and entertainment. Other types of ecommerce sites can also benefit from implementing aspects of the disclosure, including merchant-purchase sites, media consumption sites, message broadcast sites, etc.

Still other aspects include social games that are based on tapping into and mining a social network activity log, so that general actions taken at such site can be converted into useful and interesting engagement questions that drive further activity and engagement.

DESCRIPTION OF THE DRAWINGS

FIGS. 6A-6D explain graphically and in table form how embodiments of the present invention augment and build out social graphs;

FIGS. 12A-12B; 13A-13C and 14A-14B show examples of graphical interfaces implemented on a user's computing device for presenting individual, group and other network game scores as experienced at a social networking site or similar platform;

FIGS. 15A-15B, 16A-16C and 17 are depictions of social games that are implementable in accordance with the present teachings;

FIGS. 18A-18D depict other embodiments of the invention as they are integrated into other e-commerce environments.

DETAILED DESCRIPTION

Figure 1:
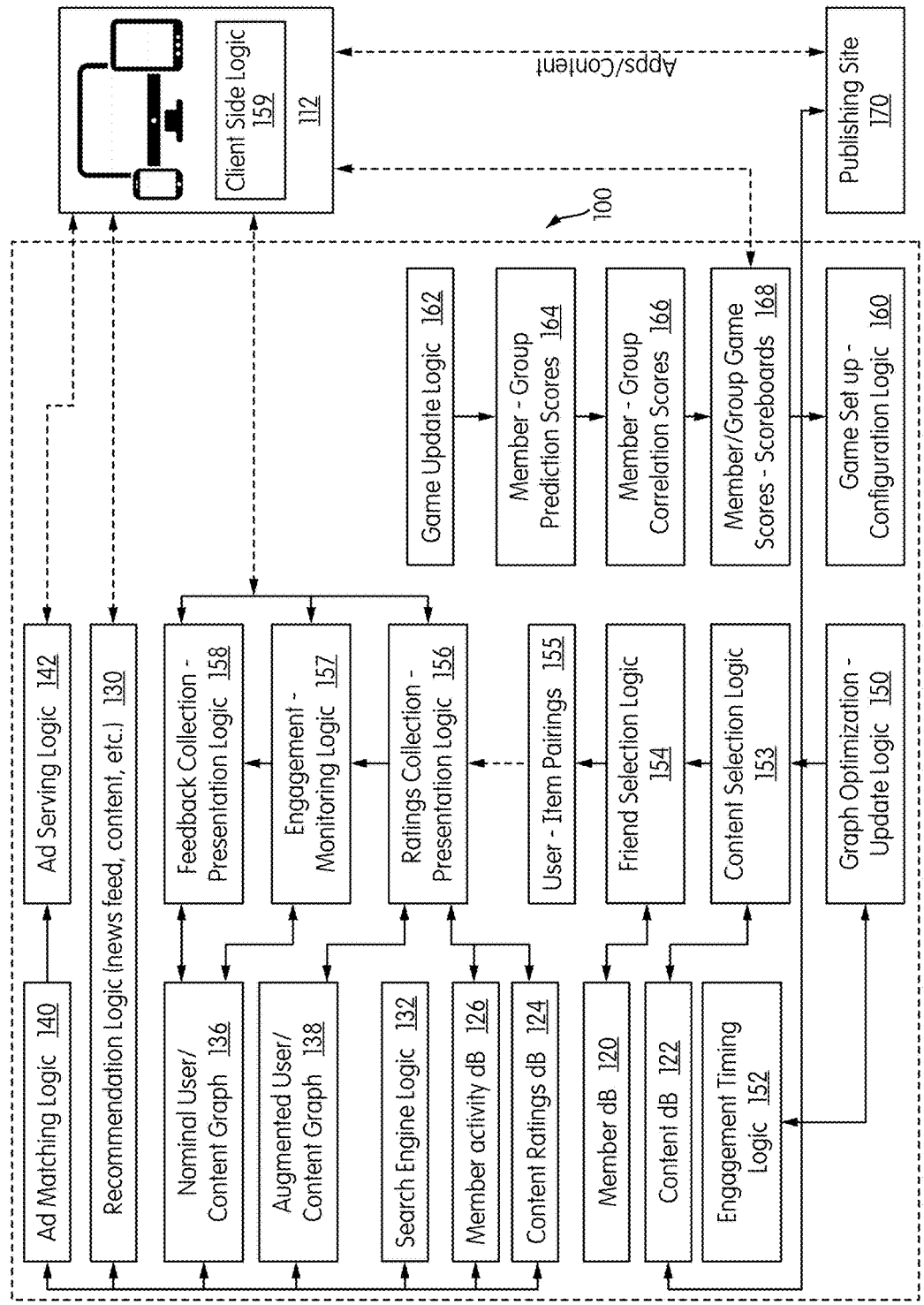
FIG. 1 is a block diagram of hardware and software computing components of an embodiment of an enhanced content engagement system implemented in accordance with the present teachings.

A number of entities are involved in trying to "gamify" aspects of business operations in a number of fields, i.e., use game play concepts to create game-like systems, applications, and methods that allow for data collection and user engagement without overly, or even overtly, burdening the user. Depending on the environment and the situation, the user may or may not realize the data collection or other business-operations purpose behind the game. The present invention extends and overlays game play and game concepts into the task realm of collecting ratings and predictions for content. By gamifying this task, social networking and similar businesses can benefit through increased content adoption, engagement, etc.

Embodiments of the present invention exploit human interest in social networks to optimize engagement with content, applications, advertising, other members, etc. Generally speaking, users of social networks are characterized by several factors, including:

they are interested in relevant content;
they trust friends more than machines for content;
they like social games, so long as there is: a) low effort barrier (easy, not time consuming to participate) and b) can choose level of engagement;
they like to know how they compare to others, and who is like/unlike them;
they like to feel that they know their social friends' tastes and personalities; and
they would like to know more about their social network characteristics: diversity, behavior, etc.

Conversely, social networking sites are driven by complementary goals:

they want to do a better job identifying relevant content for each member (better user modeling, recommendations);
they want to increase member engagement with that content; and
they want to know more about user clusters/segments characteristics to improve marketing—advertising targeting.

Embodiments of the present invention address these needs through, among other techniques, gamifying acts of user content consumption catalyzed by social network connections. Current techniques used by purely automated systems are deficient and do not result in optimized content recommendations. The goal of most prior art recommenders is to imitate "trusted" friends; by using actual real friends' predictions as described herein, an optimal targeting can begin to approach this ideal. Embodiments of the invention leverage further off of and incorporate human contributors to the prediction process, preferably as part of a social game.

This game element, referred to generally herein as "MANDEIVO™" (fr Greek: μαντεύω—guess, surmise, augur, presage; Latin: deity—god) gamifies the act of user content consumption. Thus, unlike prior schemes, claimed embodiments collect not just ratings for content, but also predictions and guesses by users about their friends' tastes and actions through very simple, direct, lightweight questions as part of a social game. The ratings and prediction data provide a positive experience for users because they connect 1:1 with their friends and get feedback on a) how they compare to friends, and b) how good their prognostication powers are (i.e., how well they actually know their friends); and c) their network taste/diversity characteristics. The result is increased engagement with content, better recommendations, and augmented or strengthened social graphs including renewed connections with less active users.

A preferred embodiment of a system 100 for enhanced content engagement implemented in accordance with the present teachings is depicted in FIG. 1. This system implements the many functions and operations described below. While the preferred embodiments are presented in the context of multi-media content (text, images, videos, songs, etc.), it will be understood that the invention has applicability to other types of items which can be the subject of predictions, ratings and games.

As seen in FIG. 1, computing system 110 is preferably an online collection of customized hardware computing machines (including networked servers), storage devices, communications adapters, peripherals and accompanying software modules suitable and configured particularly for implementing an online social networking site and performing the operations described below. The preferred system 100 interacts with client devices 112 (which may include desktop PCs, laptops, notebooks, tablets, smartphones, etc.) through a wired or wireless network and a web browser or app so that users can engage with, search, review and consume content from an Internet based site. In a preferred embodiment system 110 is part of or constitutes a social network website which can be accessed through a conventional browser running on such devices, or alternatively through an app on Android or IOS device.

A separate third party publishing site 170 (for example The New York Times, Youtube, etc.) creates content (such as identified above, including multi-media data for human consumption) that is searchable, reviewable, etc. by viewers through apps and/or web based interfaces on devices 112. This content may be communicated to, used and stored by online platform 110 in a content database 122 for their member's consumption as part of implementing a social networking site.

The social networking site preferably includes a number of databases, including:

member database 120 (which includes member id info, interest info, profile datat, etc.);
content database 122 (multi-media content as noted herein, including text stories, images, videos, audio files, etc.);
content ratings database 124 (member-member and member-content ratings based on any convenient scale, including basic binary monikers such as "likes" used at some sites; and
member activity database 126 (identifying activities (reading, postings, liking, playing) undertaken by members.

It will be understood by skilled artisans that other databases, or other data could be used of course in accordance with the present teachings.

In a preferred embodiment a content engagement system 110 includes recommendation logic 130, which provides a feed of customized content to each member through a network to the user's device 112. This content typically includes news, stories, member postings and other commercial "native" advertising predicted by an automated algorithm to be of interest for the particular member. For example, on the social networking site known as Facebook, this is identified as the "new feed," and is described generally in U.S. Patent Application Publication Nos. 2013/0246521 by Schacht et al.; US Pub. No. 2012/0084160 by Badros et al.; 2013/0031034 by Gubin et al.; and 2012/0109757 by Kendall et al., all of which are incorporated by reference herein.

The logic and composition of items presented in the user's news feed can be varied according to any number of target parameters. For example, a user's social/interest graph 136 is typically consulted to identify potential items of interest to be presented in the newsfeed. This means that members identified as friends of the user can influence (through their respective actions) a composition and timing of what the user sees in his/her newsfeed. The format and composition of the user's social/interest graph and how it is employed for recommendations, search and advertising is also discussed in the aforementioned references noted above. Other examples are of course useable with the present embodiments.

Similarly, search engine logic 132 includes functionality for searching the social networking site, or a larger network (such as the World Wide Web) using an index known in the art. This may include either a native, site-based search engine or a third party search engine, such as offered by Google, Microsoft, etc. Again in the context of social networking sites, it is often desirable to customize or personalize search results for members, so that search queries are resolved based on specific interests of the user. Thus while a generic search engine query for "Jaguar" might return results related to animals, a social networking member with identified interests in high end automobiles would see results tailored to Jaguar cars, and so on. Other examples will be apparent to those skilled in the art.

In addition, a social networking site preferably includes advertising delivery content, which is shown as part of platform 110, but may be provided as a service by a third party (not shown). Generally speaking, advertising matching logic 140 is programmed to provide appropriate/customized advertisements to members as part of a member social page, a member newsfeed, etc., based on interests, activities, etc., gleaned from member activity db 126 and user interest/social graph 136. Ad serving logic delivers the ads in accordance with parameters tailored for a client device 112, such as in mobile format, desktop format, etc. Again, the identification, selection, and delivery of advertising for social networking sites is also described generally in the aforementioned references above.

Note that while forms of recommendation logic 130, search engine logic 132, and ad serving logic 142 have been used in existing systems, the present embodiments are different in both structure and function so as to achieve objectives of the present teachings.

One additional feature preferably utilized in preferred embodiments is an augmented user social/interest graph 138. This structure, as described further below, includes an enhanced version of nominal graph 136 that includes tentative nodes and links based on user actions, predictions, feedback, etc. In other words, as explained below, this graph is populated with additional references beyond those found in the nominal graph, based on the engagements facilitated by the present teachings. This augmented graph 138 can be tapped into and used as a customization source by all of the modules previously discussed, including recommendations, search, and ad servicing. In addition, the objects and edges stored in the augmented graph 138 can be the subject of separate relevance scores based on game adjustments.

Figure 2:
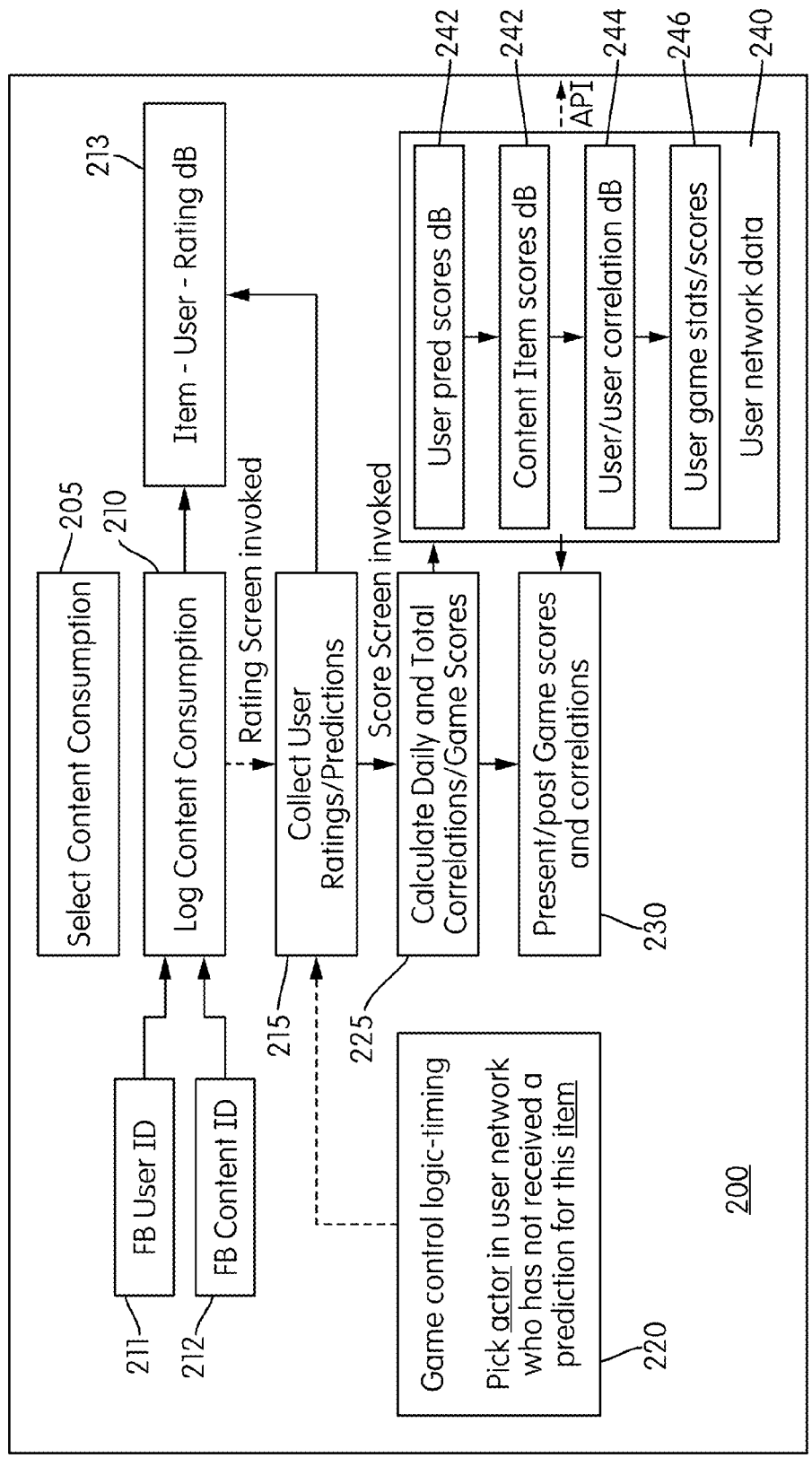
FIG. 2 illustrates an exemplary method used for identifying, presenting and calculating content and user scores for social graph engagements on a client side computing system.
Figure 3A:
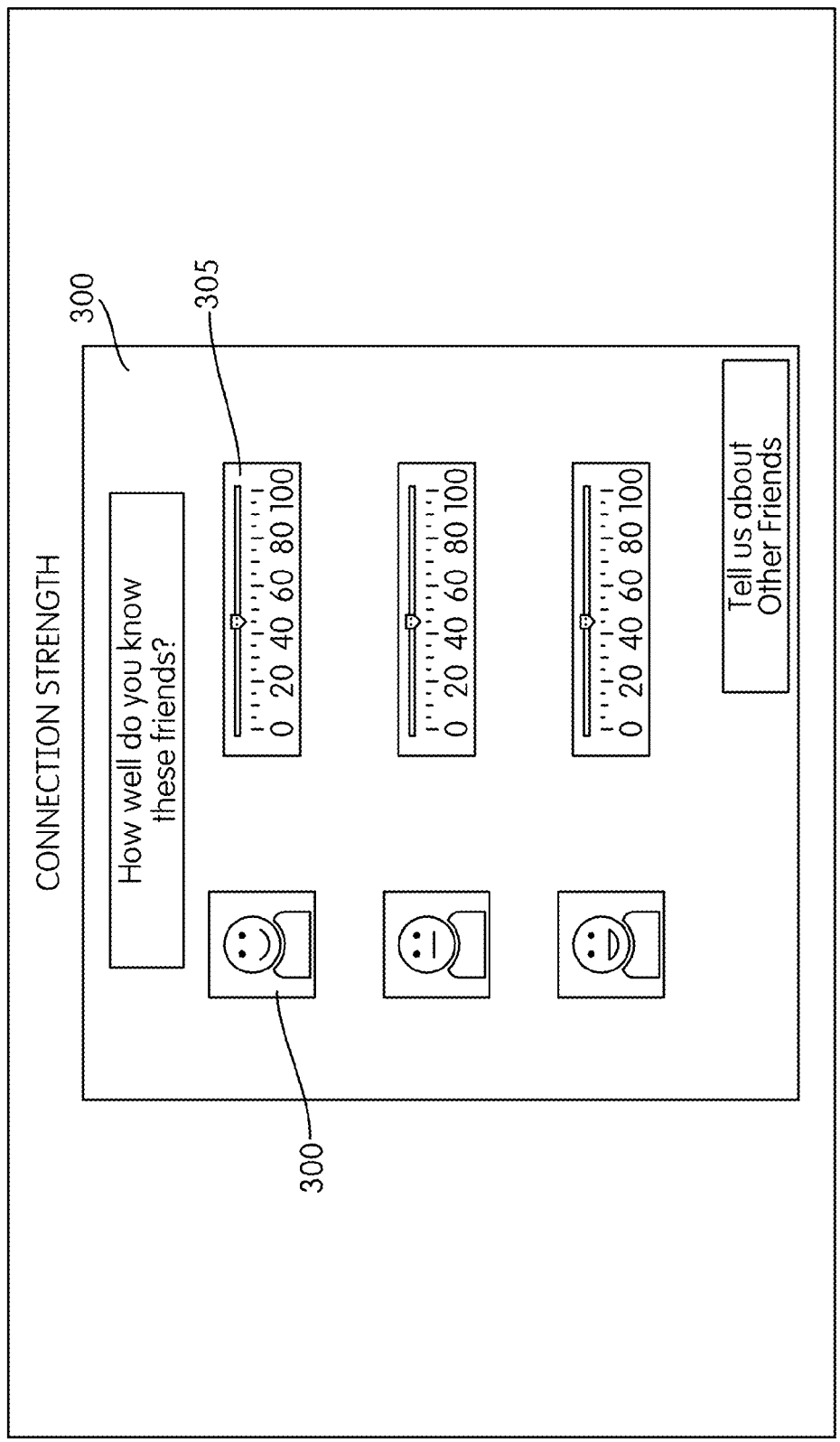
FIGS. 3A-3D show examples of graphical interfaces implemented on a user's computing device for capturing, presenting, collecting and scoring data.
Figure 3B:
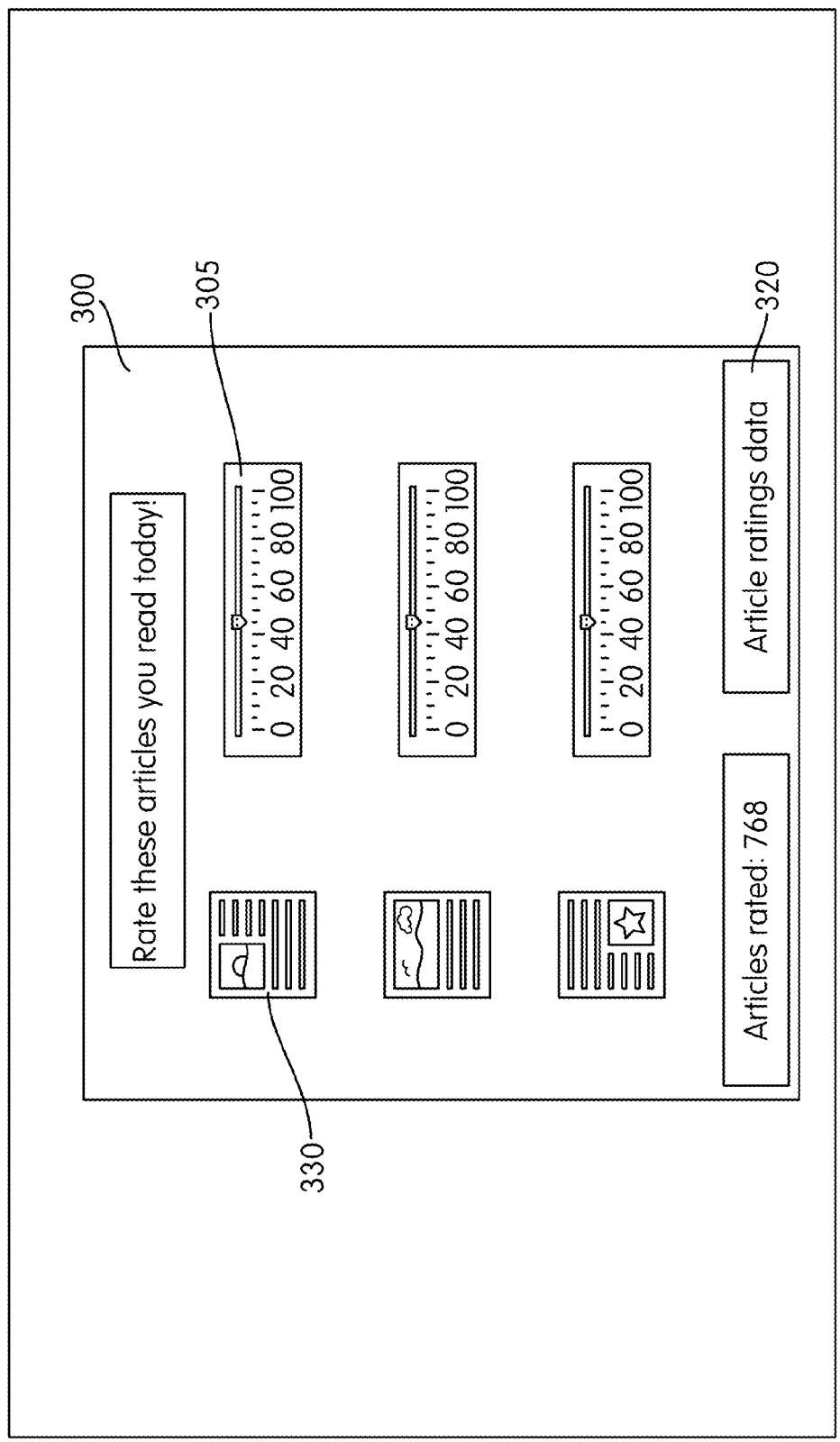
Figure 3C:
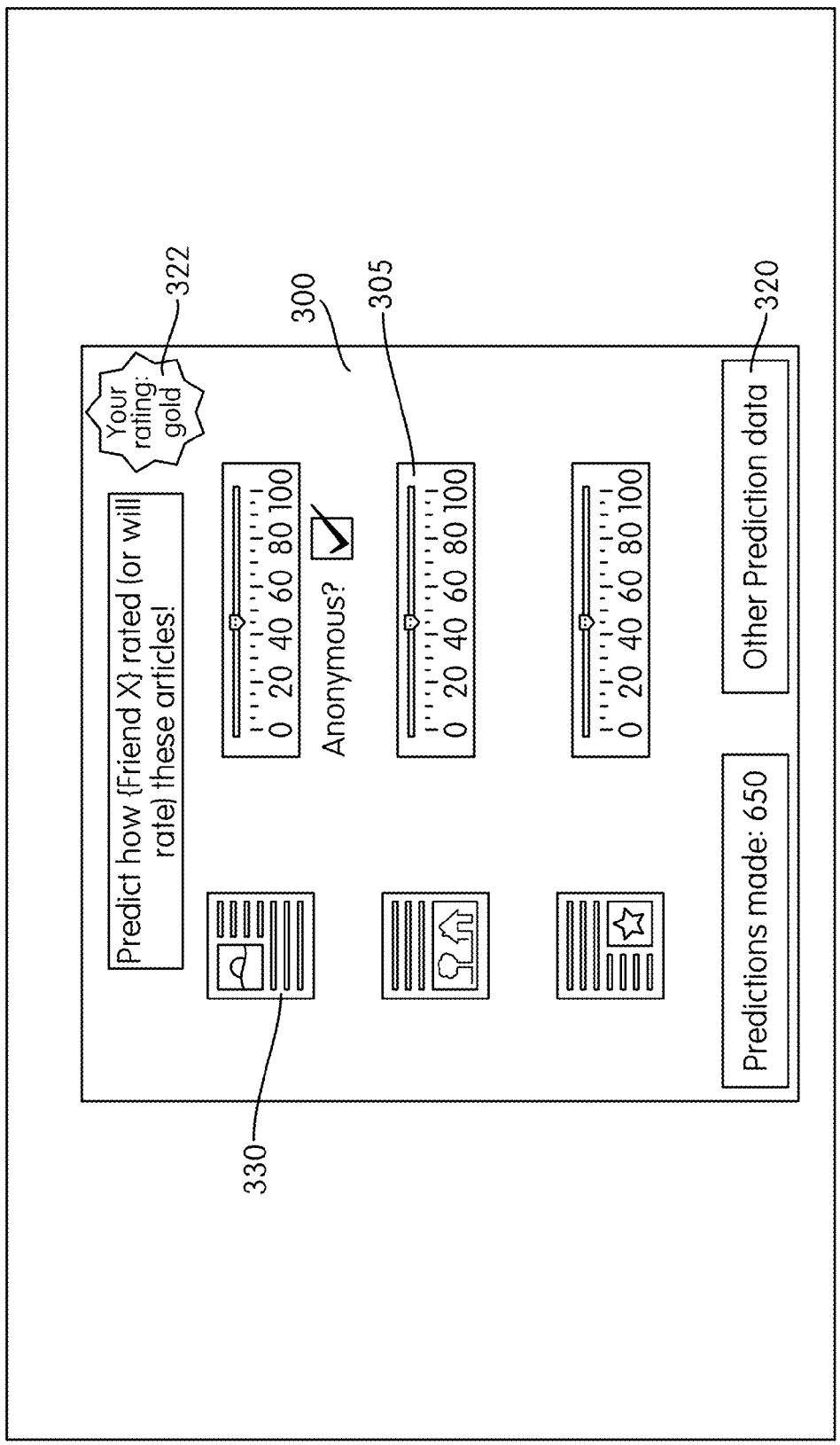
Figure 3D:
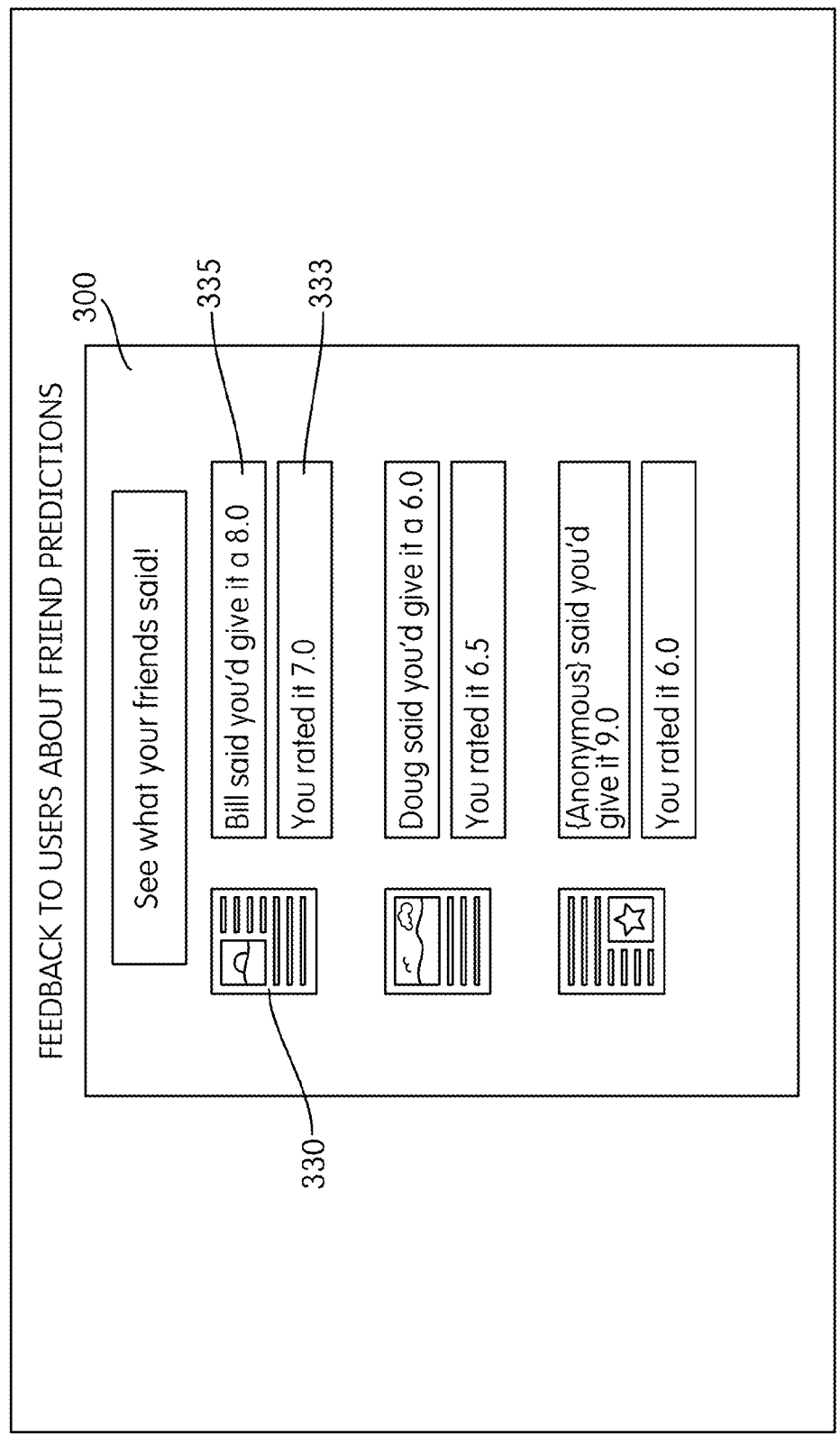
Figure 6A:
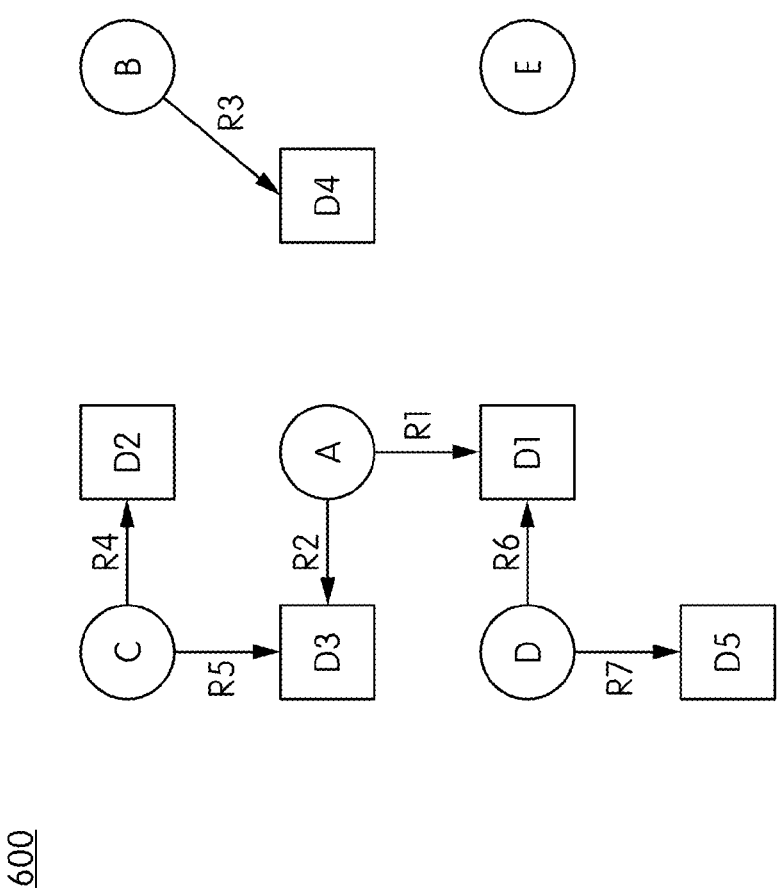
Figure 6C:
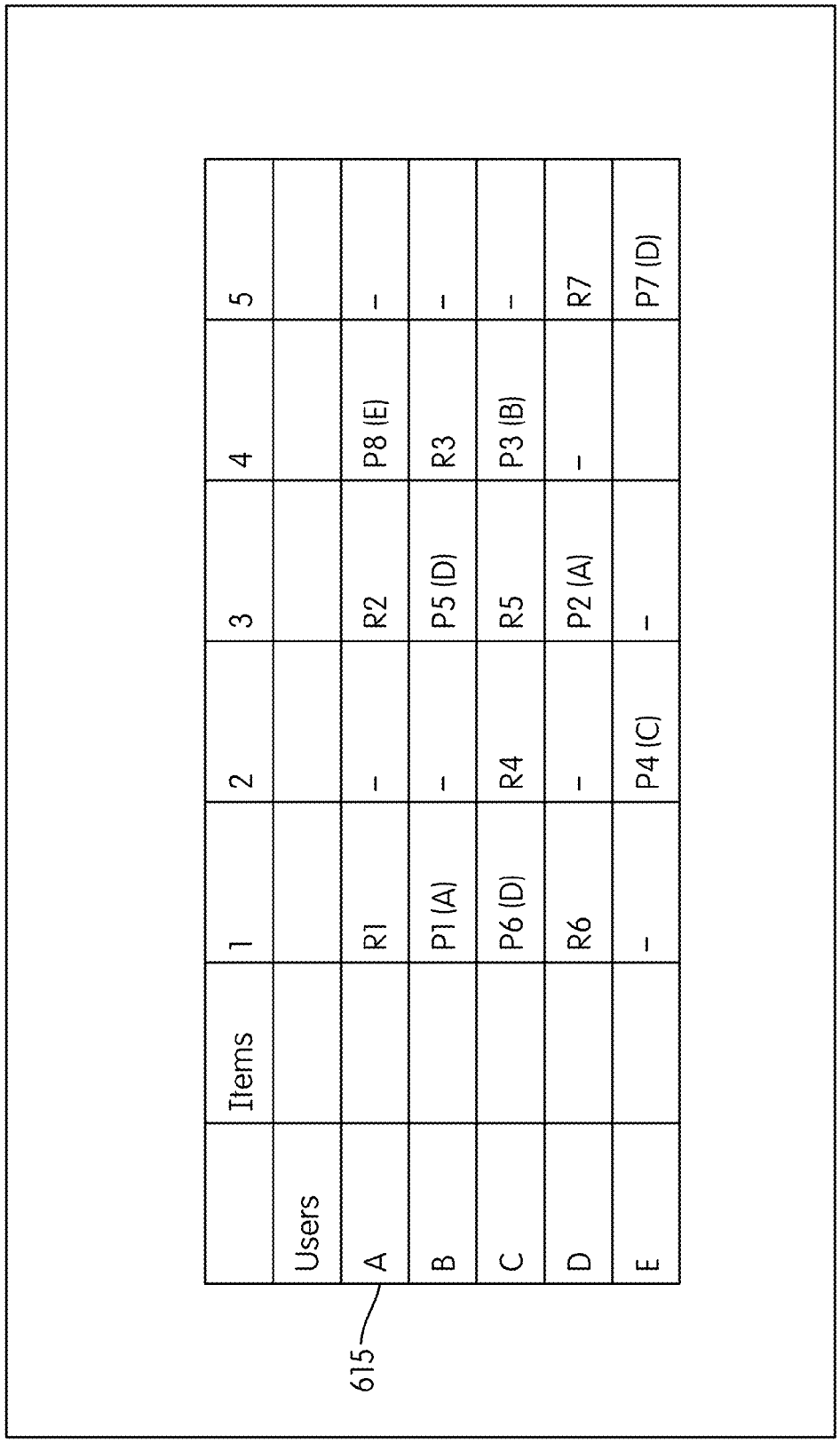
Figure 7:
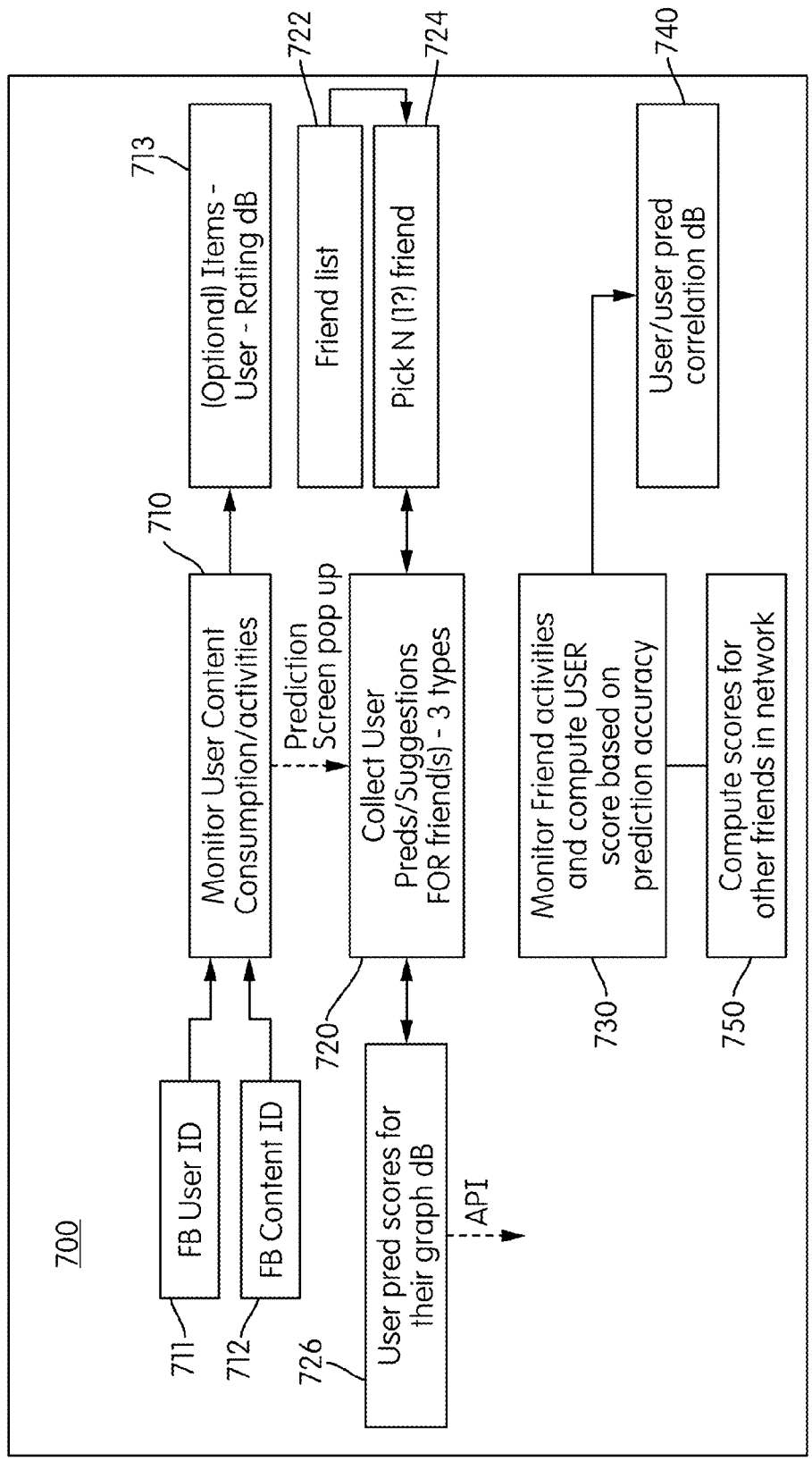
FIG. 7 illustrates an exemplary method used for identifying, presenting and calculating content and user scores for content and social graph engagements on a social network site or similar game site.
Figure 8A:
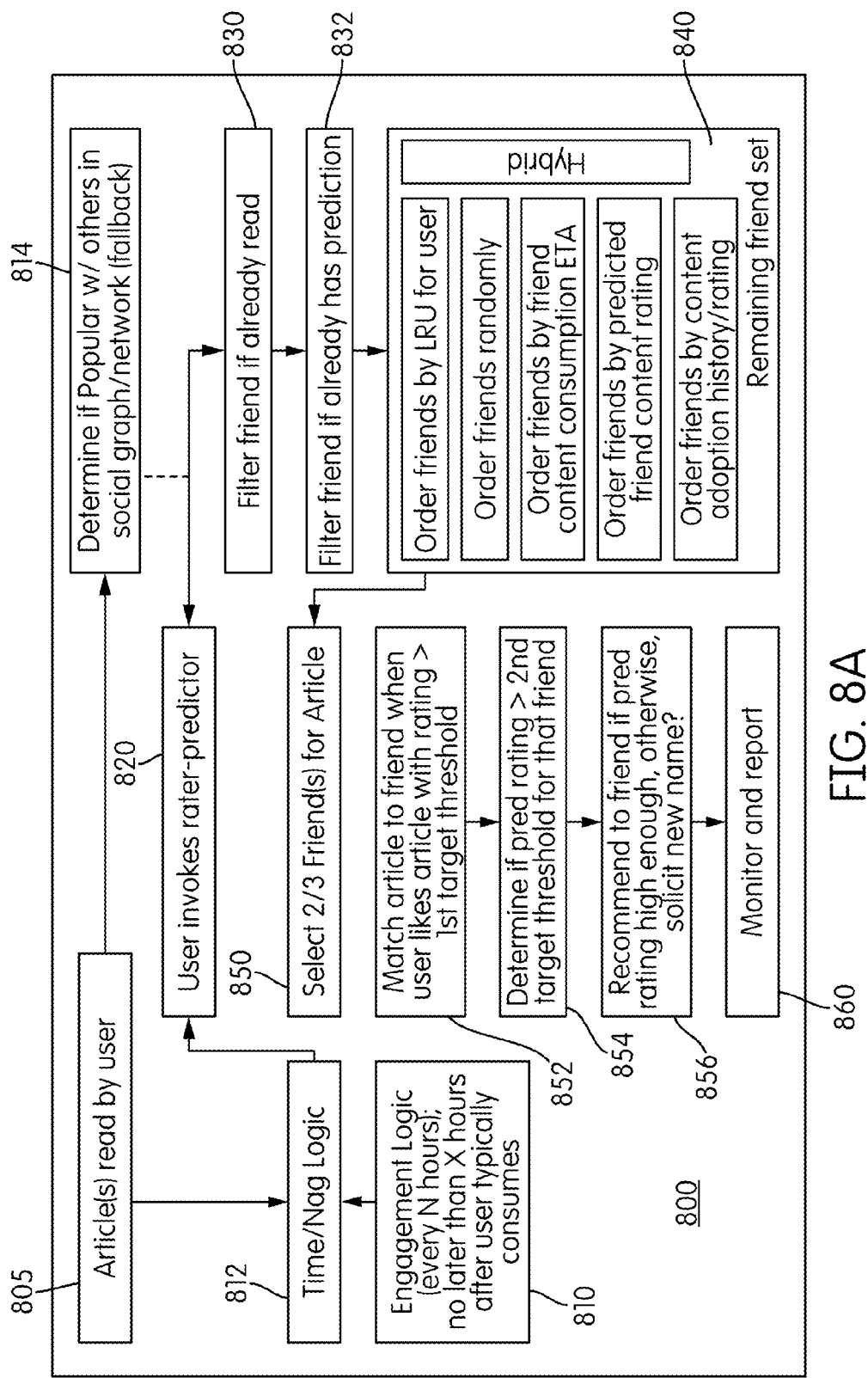
FIGS. 8A-8D illustrate exemplary methods for selecting content for particular users of a social network site.
Figure 8B:
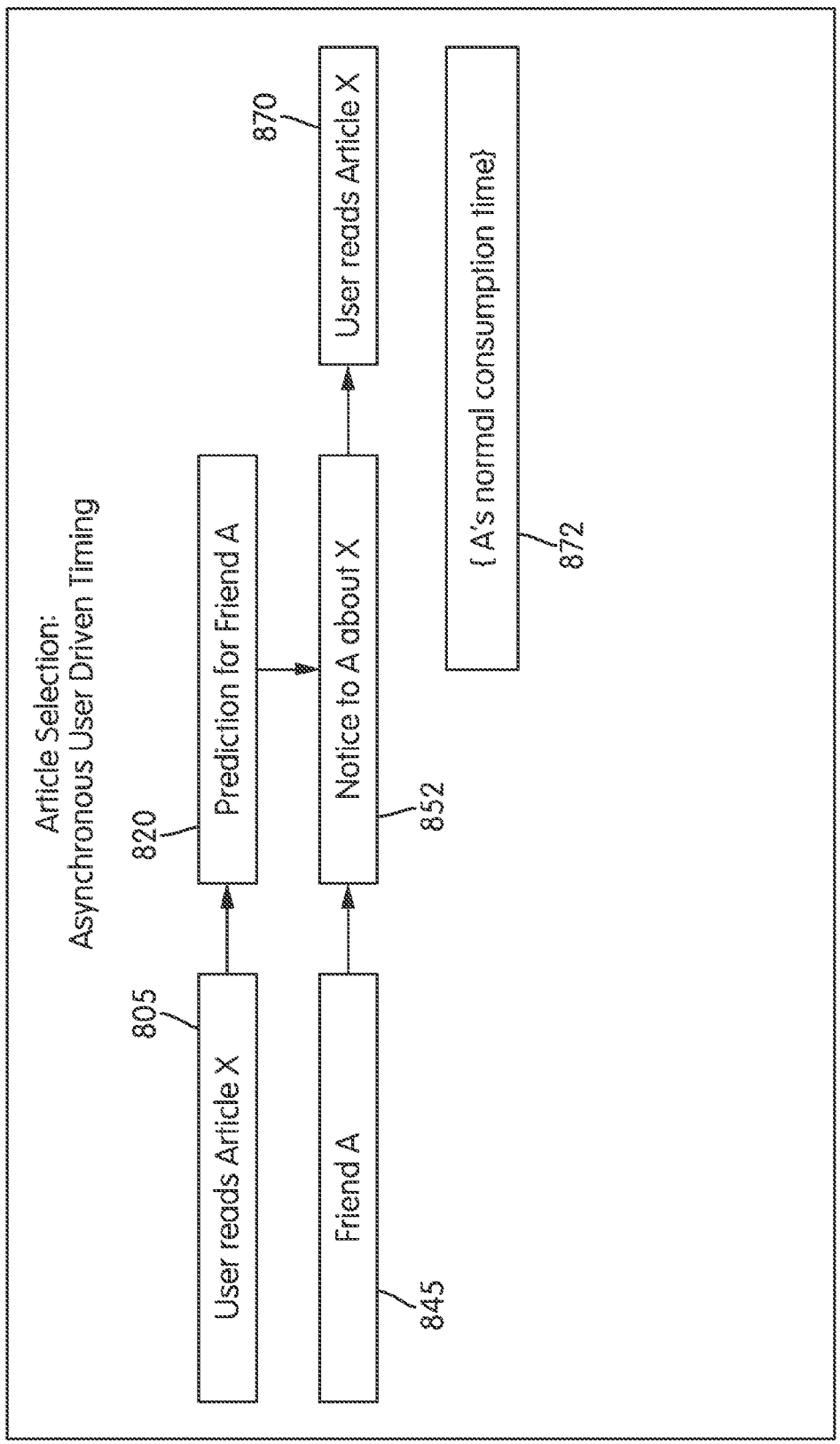
Figure 8C:
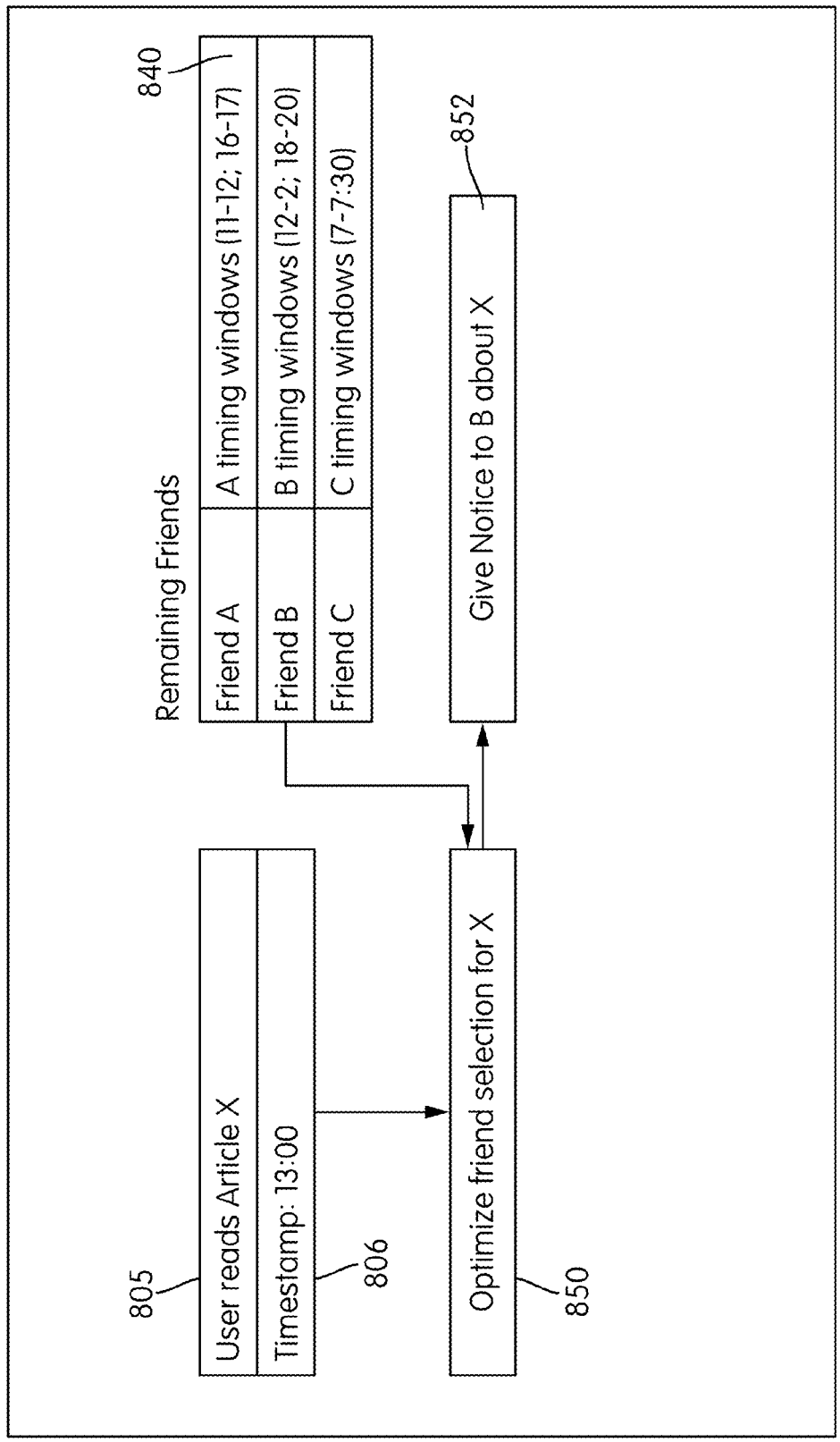
Figure 8D:
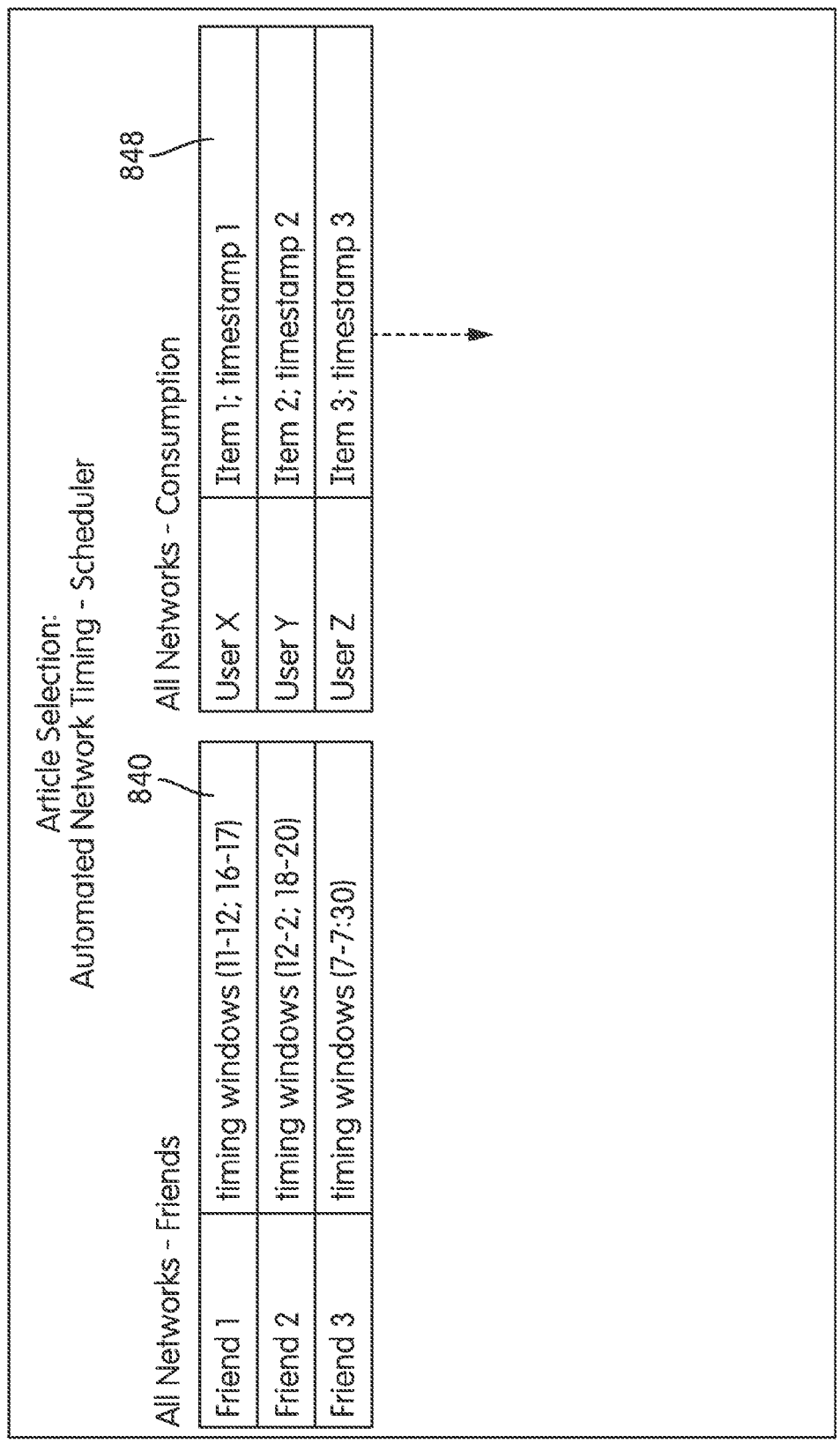

Additional preferred components of platform 110 include content engagement logic customized to effectuate various operations described herein, including:

Graph optimization/update logic 150—participates in building out augmented graph 138 based on programmable parameters such as increasing a number of nodes, edges, etc., and/or as initiated in accordance with parameters passed on by a content game of the present embodiments; see FIG. 2, box 220; FIGS. 6A-6D; FIG. 7 (box 722, 724); FIG. 8A; below among other things;

Engagement Timing Logic 152—participates in determining how and when to engage users with content based on programmable parameters such as increasing engagement rate by optimizing presentation times, etc. and in performing the operations seen in FIG. 2 (box 220); FIG. 8B-8D among other things;

Content Selection Logic 153—participates in locating, identifying and selecting content to be used for engaging site members, and in performing the operations seen in FIG. 2 (box 205); FIG. 7 (boxes 710, 713); FIG. 8A below; in the case of more generic game questions (see e.g., FIGS. 10-16) this logic can parse an existing activity log for actions (liked? watched? etc.) and objects (a movie, person) to be used as the subject of prediction questions, among other things;

Friend Selection Logic 154—participates in locating, identifying and selecting other members to be engaged with the user and in performing the operations seen in FIGS. 3A-3D; and 5A-5B; FIG. 7 (box 724) FIG. 8A (box 840) below among other things;

User-Item Pairings Logic 155—participates in defining what content is presented to which users in accordance with content/game rules and in performing the operations seen in FIG. 3C (selecting content 330 and friends); FIG. 7 (box 720) below; FIG. 8A (boxes 852-856); this logic creates a table of target content-user engagements (or a scheduled form of activity log) to be performed throughout a game cycle among other things;

Ratings Presentation/Collection Logic 156 participates in presenting content to users, collecting content/user ratings data through interfaces described below, and in performing the operations seen in FIGS. 3A-3D; FIG. 7 (box 720 below); FIG. 8 (box 856); FIGS. 10-16 (game embodiments) among other things;

Engagement Monitoring Logic 157—participates in monitoring user engagement with the content and other users through interfaces described below, and in performing the operations seen in FIG. 7 (box 730) below; FIG. 8A (box 860); this logic can monitor an existing use activity log, or create a separate activity database 126 to confirm which scheduled engagements (155) were completed, among other things; and Feedback Presentation/Collection Logic 158—participates in following up with feedback, collecting feedback data through interfaces described below, and in performing the operations seen in FIG. 2 (box 225, 230); FIG. 3D (feedback); FIG. 7 below (box 730); FIG. 8A (box 860), among other things.

Figure 4A:
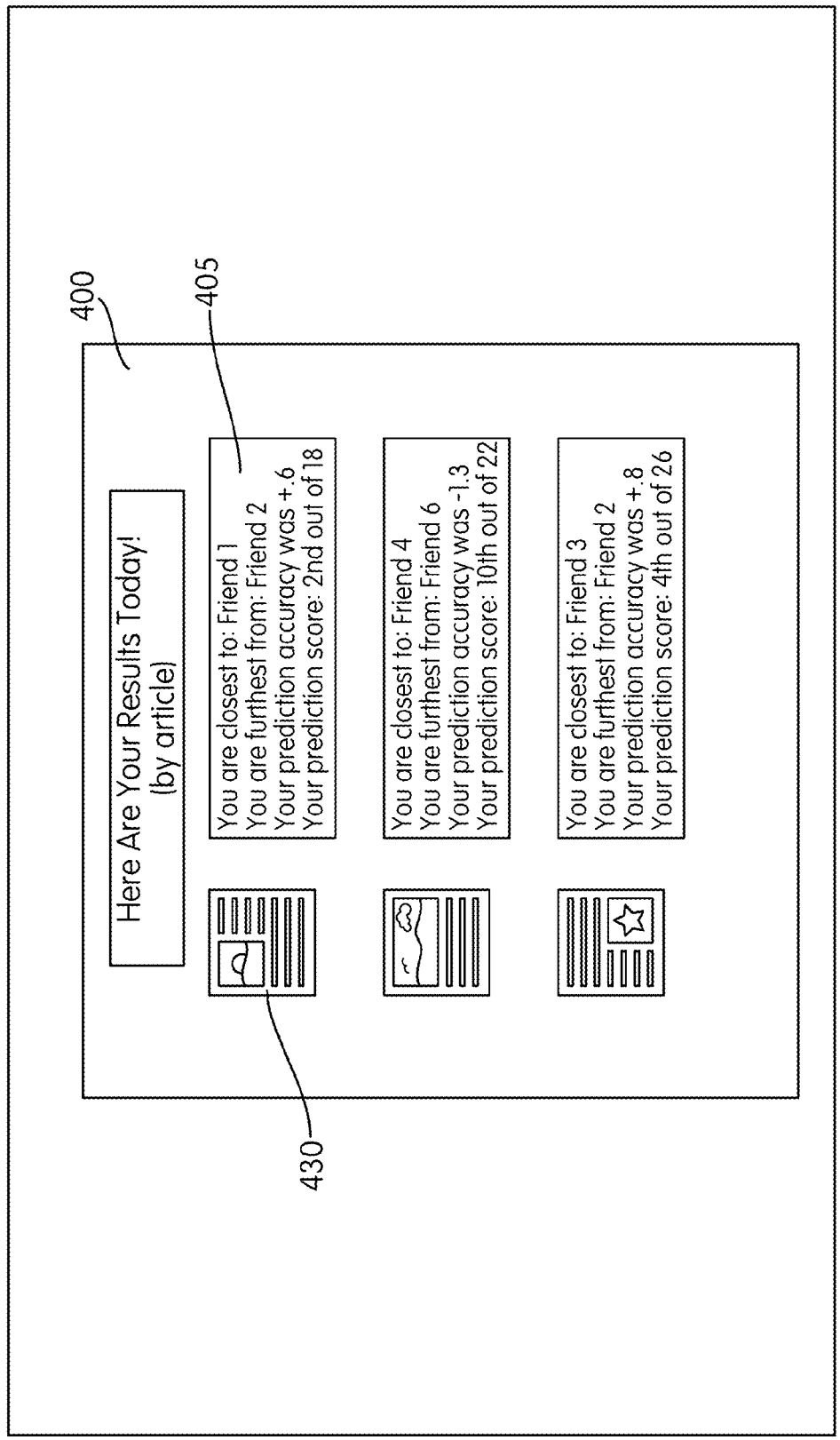
FIGS. 4A-4B show examples of graphical interfaces implemented on a user's computing device for presenting individual, group and other network game scores.
Figure 4B:
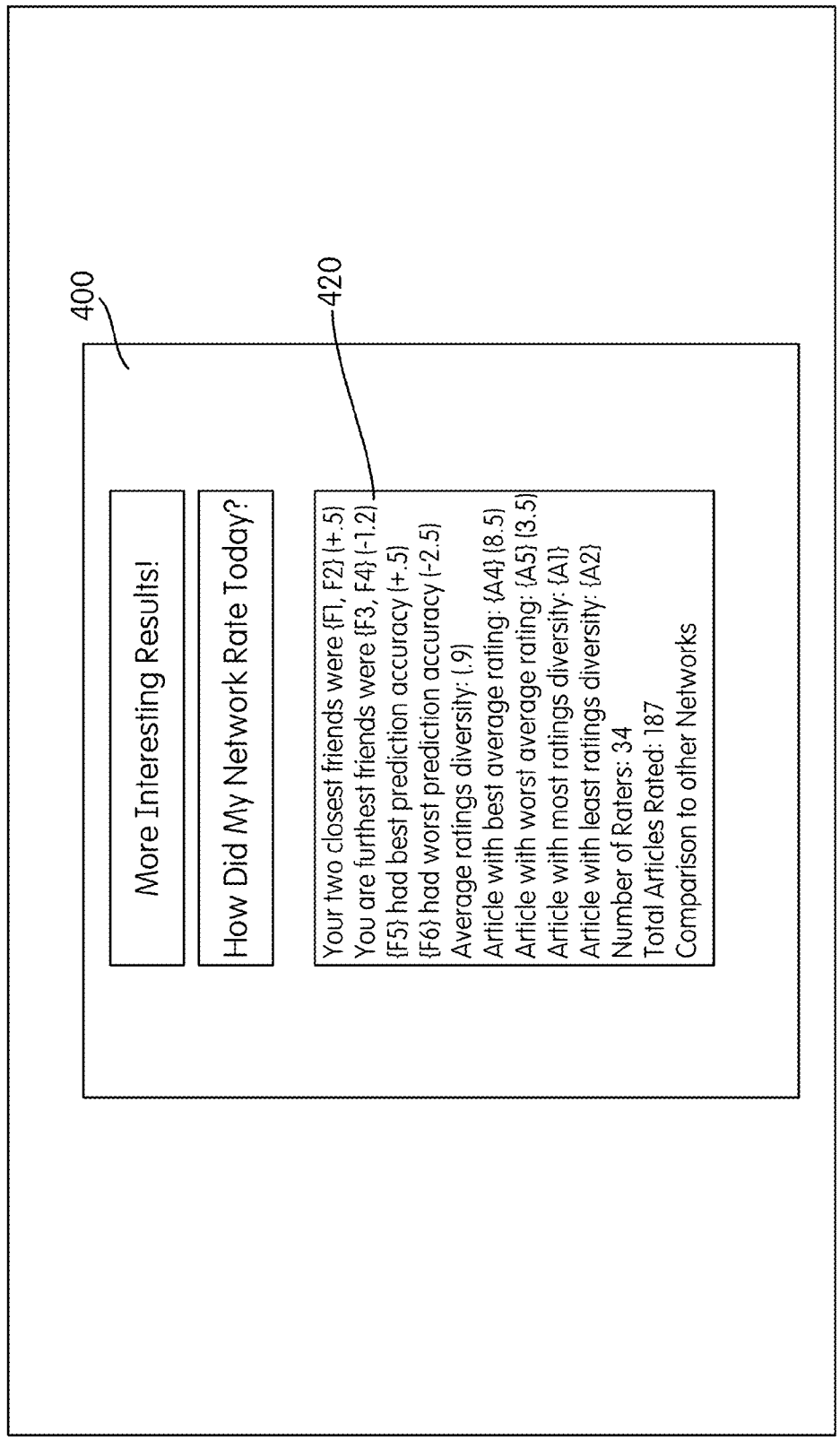
Figure 9:
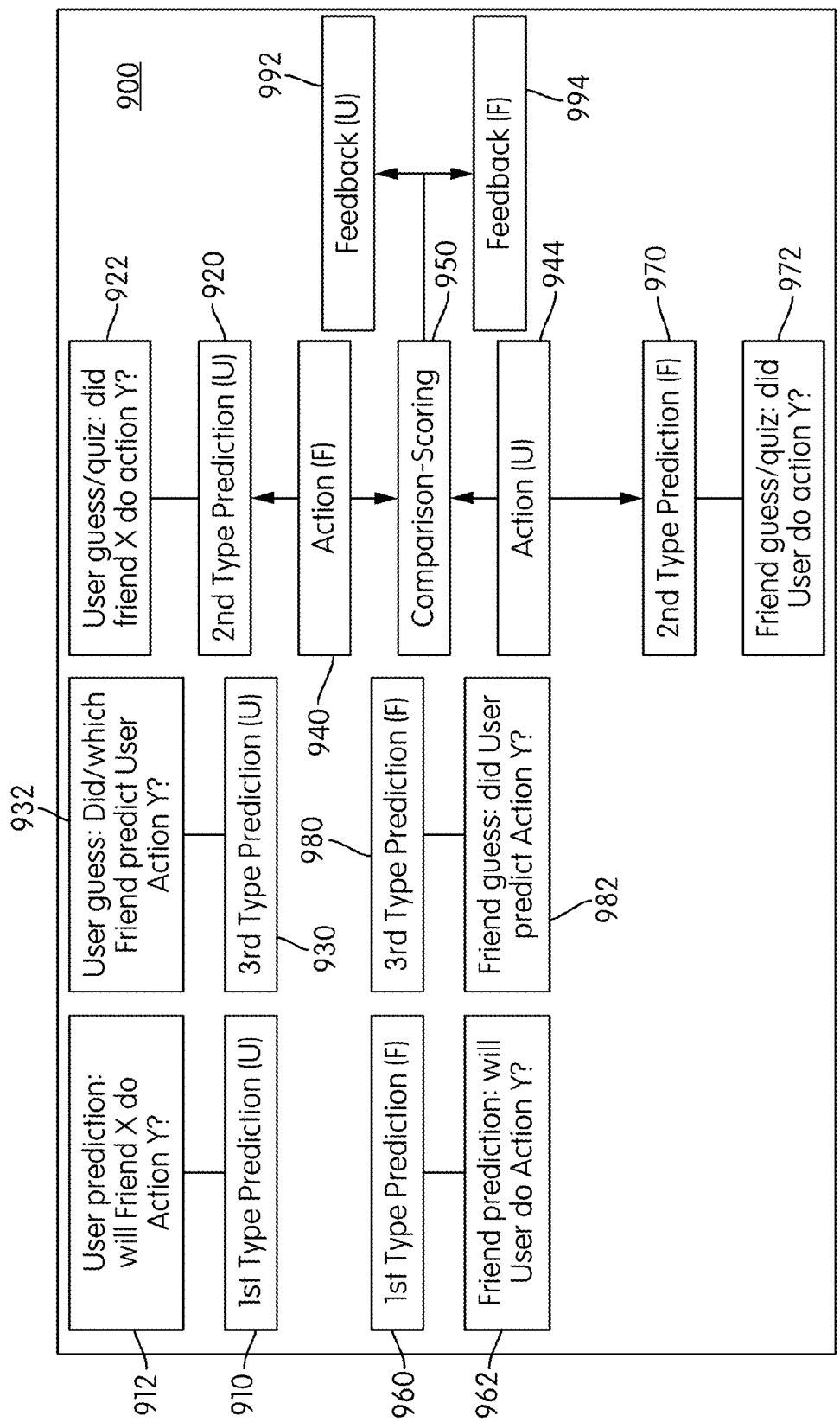
FIG. 9 is a diagram illustrating the general time-action-actor relationship that can be considered as a form of query/prediction template generator.

In addition, platform 110 includes game related logic customized to effectuate other operations described herein for MANDEIVO™, including:

Game Setup/Configuration logic 160—participates in initiating games on behalf of users, a social networking site, a publishing site, etc. based on programmable parameters such as a type of game, a type of action/ engagement desired, etc. among other things; see FIG. 9 depiction of different question types allowed in engagement system;

Game Update Logic 162—receives inputs (ratings, predictions, etc.) from users, social network platform and participates in registering user, content engagement, ratings, game status, etc., and in performing the operations seen in FIG. 2 (box 246); FIG. 7 (box 740, 750) below, among other things;

Member/Group Prediction Scores Logic 164—participates in calculating and updating user and group prediction scores and in performing the operations seen in FIG. 2 (updating db 242); FIG. 7 (box 740, 750) below among other things;

Member/Group Correlation Scores Logic 166—participates in calculating and updating user and group correlation scores and in performing the operations seen in FIG. 2 (updating db 244); FIG. 7 (box 740, 750) below among other things; and Member/Group Scores/Scoreboard 168—participates in calculating game scores, team scores, etc. and in performing the operations seen in FIG. 2 (box 246); FIG. 4A-4B (user and network scores); FIG. 7 (box 740, 750) below, among other things.

As seen in FIG. 1, some aspects of the claimed embodiments are implemented in a preferred mobile phone app as well. It is expected that parts of the program would operate as client side logic 159 on a user smartphone/computing device, while other back end operations (described herein) would be done on a server side 110. In some embodiments, depending on the capabilities of the smartphone/computing device and other factors, most or all key operations can take place client side.

It will be understood that system 110 will likely have other components, modules, etc., and so as to better highlight the key features of the present invention only those aspects most germane to such are presented. Moreover, the software modules described (referenced usually in the form of a functional engine) can be implemented from the present teachings using any one of many known programming languages suitable for creating applications that can run on client systems, and large scale computing systems, including servers connected to a network (such as the Internet). Such applications can be embodied in tangible, machine readable form for causing a computing system to execute appropriate operations in accordance with the present teachings. The details of the specific implementation of the present invention will vary depending on the programming language(s) used to embody the above principles, and are not essential to an understanding of the present invention. To the extent it is considered relevant to the present invention, the Applicant specifically disclaims any coverage that may encompass so-called "transitory" subject matter deemed unpatentable under 35 U.S.C. § 101, including for example any coverage to transitory media or bare transitory propagating signals and the like, or to any pure "abstract" ideas.

FIG. 2 illustrates the main processes 200 used in first embodiments of the disclosure, including the high level operations, steps and logic. In such embodiments, the bulk of the game logic is implemented as part of program 159 running on the user's device 112. The game is preferably implemented as an app that updates a user's social graph as needed at a social networking site, such as Facebook (FB). In these instances certain modules shown in FIG. 1 as part of platform 110 (including 150-158; 160-168) are preferably incorporated on the client side.

Content to be consumed by a user is presented at step 205, including through mechanisms such as the "News Feed" described earlier within a user's personalized account/page. Every time a piece of content (FB Id 212) is consumed by a user (FB User ID 211) this event is logged at step 210, and stored with accompanying user and ratings data (which may include context data, timestamp data, etc.) at step 213. Consumption patterns can be gleaned from timestamps to glean user profiles and models for some targeting operations. In addition to user ratings, predictions are also collected at step 215 through a ratings screen.

The ratings screen may be independently invoked by the user, or prompted to the user through some form of game scheduling logic 220. The scheduling logic 220 may be in the form of a programmable time based or activity based "nag" factor that is triggered according to some threshold. For example, the user may be engaged every N hours or N days, or some other desired target period. The game control logic may further participate in the "friend" selection logic for the prediction to ensure that the targeting is done for someone in the user's network who has not already received a prediction, or at least a prediction for this particular item. That is, engagement outside the "bubble" is selected and driven as desired.

The user's friends' activities and predictions are also collected and stored as seen in the "network data" box 240. The friends' activity logs are thus searched and recorded as well. Note that in a game application operating outside the confines of a social network site controlled feed, content can be presented by such game logic without conflicting or competing with other content that could interfere with game play. Thus, embodiments shown here operate under the premise that the target of the user's prediction will indeed receive notification of the user's action targeted to them. In applications operating on a social network site (see below) it is possible such engagements with friends will be limited by competition in a newsfeed for user attention (based on their object score relative to other content) so that feedback is not guaranteed for any particular prediction.

Databases for the user's predictions (242), and user/friend content ratings (248) are maintained. User/user correlations scores (244) and game stats/scores (246) are computed and stored as well. These operations may be performed primarily off-line, or on a server side, to reduce operational overhead on a user's client device. The structure and format of these databases can be customized for the needs of any particular application based on the present teachings.

The game scores are calculated and presented to users through the interfaces identified above or some other suitable mechanism at steps 225 and 230. The correlations can include, among others, the types of calculations for content and users described in U.S. Pat. No. 8,321,261, also incorporated by reference herein. Other types of scoring will be apparent to those skilled in the art. All of the operations shown can be achieved using standalone applications, programs, etc. that cooperate and operate either or both on a mobile computing device, a desktop/laptop device, a tablet device, a networked server, etc.

An example of a preferred graphical interface 300 that could be implemented on a user's computing device for capturing user ratings data is shown at FIGS. 3A-3D. The interface includes different portions for both presenting, collecting and scoring data from a user 310 including through ratings tool 305.

First, FIG. 3A shows how information can be obtained from the user on his/her perceptions of their relationship to others in their social graph. This is done by soliciting connection ratings 305 of how well they know their friends' 310 thinking and/or behavior. This input screen 300 might be used at initialization, or when a new friend is added, so that it is not needed later on again. Since users may have hundreds of friends, it can become unwieldy to rate them all at once, but that option could still be used by persons to sort/score their associations. In another embodiment to reduce burden the user's rating of his/her knowledge of the friend is only solicited when a prediction is made for that specific user. Note that this user data can then be used for augmenting/refining an automated derived social graph (such as shown in FIG. 6A) and for any number of purposes in a social network graph beyond simply recommending content. The format of the interface, including type of rating tool, information on friends, etc., can be customized as desired.

As seen in FIG. 3B, ratings are solicited for content 330 consumed, such as would occur during step 210 (FIG. 2) above. Any suitable mechanism for collecting this data can be employed; a slider is shown at 305, but other techniques may be preferable depending on the application. The user's activities (number of ratings) are logged on a rolling basis and an acknowledgement portion 320 reflects their content consumption and contribution of ratings.

In this embodiment the app may be self-contained and simply draw upon the user's activities as accessed through an API to his/her social graph and activity log at site 110. All of the interfaces, game operational logic, communications, etc., can be implemented using standard conventional software programming techniques and code adapted to operate on mobile and other computing devices.

As seen in FIG. 3C a preferred embodiment also captures user "input" prediction data, for his/her friends on a social network, or some other entity, such as described above for step 215 (FIG. 2). This forces the user to consider the mindset of the other person and how the latter would perceive the same content 330 viewed or consumed by the user. Again, any form of ratings tool 305 can be employed.

The rating solicited at 305 may be a specific rating for a specific friend {X}, or an expected average rating provided by selected portions of all members of a user's social graph. In some instances the user may not even have consumed the content 330, as they are simply shown a title and a snippet; however this can still be useful since many users know their friends' current interests, needs, etc., and can react or identify relevant content quickly even from limited information.

For example an article about "Real Estate Prices in SF" may be relevant to a friend X who is house hunting. Yet friend X may not even identify housing or real estate as an interest in their social graph, so here the user's "inside" information is useful for presenting recommendations. In some instances the user may desire to remain anonymous so this option can be presented as well.

The user's prescience in ratings can be acknowledged using any number of metrics as shown at score portion 320, with recognitions given for high scores, total number of predictions within a certain range, a certain accuracy, etc. Preferably users are asked at least one question about one friend daily based on the engagement logic noted above in FIG. 2. However, they can, if they are motivated and have time, provide as much prediction data as they want, by simply using the content engagement system on-demand.

Embodiments of the present invention exploit findings that show that people will "share" content even if they have not read it themselves. This sharing can be amplified by the present invention and facilitate something people are already doing in a recent new behavior, albeit imperfectly as they are only currently "recommending" content that is self-discovered. The other main difference is that the present invention allows for more 1:1 targeting of content, as opposed to simply having users "broadcast" their suggestions with less targeting to an entire social graph.

As seen in FIG. 3D an additional optional "output" of the system is feedback to the user about their friends' corresponding predictions in report section 333 and feedback portion 335. Preferably users are not shown friend predictions 335 until they have provided some form of prediction input of their own in field 333, to make the game more interesting and rich with predictions. Thus, the feedback fields 335 can be masked, or made opaque, and triggered to become active only after a user provides a rating in field 335. Other techniques will be apparent to those skilled in the art. This form of "bartering" can be done on a one-to-many basis, or a one-to-one basis, meaning the user might be shown multiple (if not all) friend predictions even for one user prediction, or the user may be required to provide a prediction for every friend prediction viewed. Each implementation may vary according to the audience, content, game purpose, etc.

Visual cues can be given to illustrate quickly how friends did in predicting the user behavior; the data could be presented in any number of visual forms, or in simplified form to show one larger graph in which all friends' are compared at once for ease of understanding. Friends of the user could be plotted along a spectrum and identified with icons, text, etc., to understand the number of predictions, accuracy, etc., on an individual basis. Other examples will be apparent to skilled artisans.

An example of an individual results output screen 400 that could be presented to the user for content engagement is shown in FIG. 4A. Unless otherwise noted, like reference numbers are intended to refer to like structures in the present figures. The MANDEIVO™ game logic operates on all the user and friend ratings and predictions data to compute and generate interesting correlations and reports, as shown in correlation portion 405 based on the consumed items 430.

Thus, for example in the correlation report portion 405, the user is informed both on an individual and aggregate level which particular social network friend gave a closest rating for a specific piece of content, on an item by item basis. Conversely a friend who gave the most different rating can be presented as well. The user's prediction accuracy can also be computed and presented, either in numeric or percentage terms, and compared to others in their social graph (or network wide) in terms of how well they performed for a specific piece of content. Again in some instances users can participate anonymously.

FIG. 4B illustrates that one other useful and interesting set of metrics and outputs is data for the user's entire social graph or network in scoreboard portion 420. Current social networks present little data to a user on overall aggregate behavior, interests, etc. of their friends. In embodiments of the invention, the ratings, activities, and predictions of the user's friends are processed and presented in an interesting form for users. Here they can see any number of interesting correlations of friends, such as which pair is closest in taste, which are furthest, etc. The computation of these results is straightforward from the information in FIG. 4B and as described herein. Other types of correlations can be computed as well and the invention is no limited in this respect. While not shown specifically it will be understood of course that text or image query capability could be implemented to find specific ratings, friends, content, predictions, etc.

Prediction performance can be measured as well. Since each user has his/her own social network, it is possible for person A to have a highest rating in their own respective network {A, B, C, D}, while B, who has their own second network {B, A, C, F, G, H}, may be highest in that second network. Each user therefore can ascertain a ranking of each user in their social graph.

The content consumed can also be rated, along with interesting data about the performance of that content. For example, an overall average can be presented, but in addition, ratings "diversity" can also be computed, using a conventional "difference of squares" calculation, such as discussed in U.S. Pat. No. 8,626,608, which is incorporated by reference in its entirety. Ratings diversity, as used herein, is a useful metric for understanding a degree of heterogeneity or homogeneity of a social network. Social network users are often motivated by concerns of increasing perspective and viewpoints, and embodiments of the invention can assist in finding other members for broadening a spectrum of tastes within such network.

In some instances comparisons to other networks might be possible as well. Thus, for two networks A, B with members {M1, M2 . . . Mn} and {N1, N2, . . . Nk} computations can be made across all content consumed to determine and sum a distance of each member from every other member for each piece of content, to identify degrees of similarity. Again it will be apparent that this is simply exemplary and other complementary data can be computed and presented for the social network performance. In addition, results presented on a mobile handset may vary dramatically from that shown on a webpage to a desktop user. The output results can be tailored for a particular platform using known techniques.

Figure 5A:
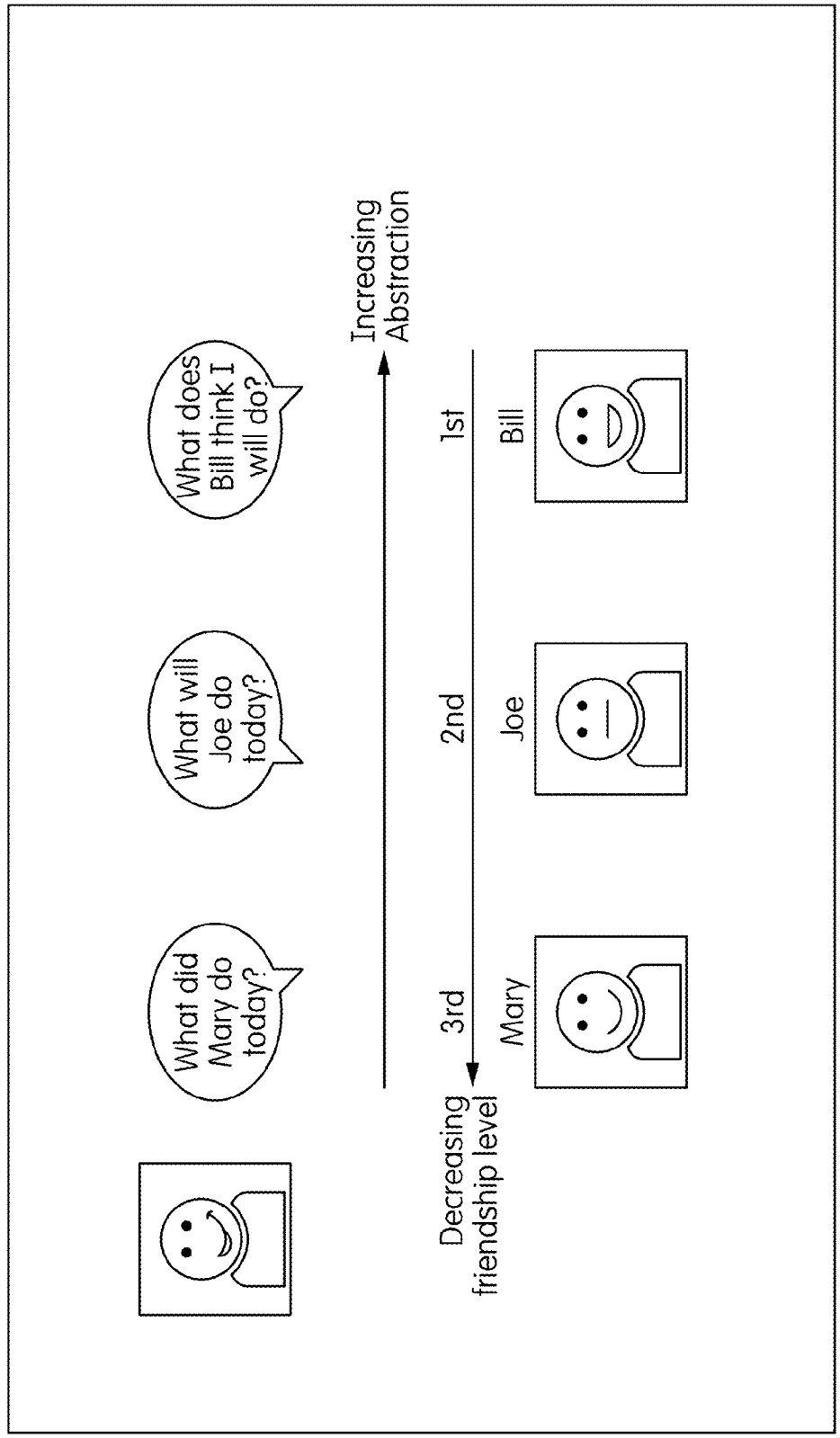
FIGS. 5A-5B depict visually how different types of predictions can be presented to users based on a degree of connection or friendship level.

FIG. 5A depicts visually how different types of predictions presented to users at step 215 (FIG. 2) also can be tailored by selection logic 220 to a degree of connection or friendship level with the friend in question. That is, some abstract, pure prediction questions ("what does X think I will do?") may require extensive contact or closeness to the target user (as shown on the far right by user Bill). Others may be presented and answerable based on some reasonably good understanding of a higher level thinking of a friend, on a second or third level. For other friends who are not frequently contacted or engaged, a simple question might ask about a guess on a specific action of what the user actually did or did not do on a particular day (far left for friend Mary). Thus the level of difficulty of the prediction or guess can be customized according to the identified or measured level of friendship connection, as measured from a social network graph or self-reported by the users.

A benefit of some embodiments of the invention is that users can be prompted and induced to engage with contacts in their graph that are not the subject of regular interaction. This results in renewal of social contacts and diversity of engagement, opinions, etc. over a wider spectrum of people, which helps to solve the problem of "filter bubble" effects discussed widely in the art, including by recognized social media authorities. Such engagement also serves to reduce defection and churn by less frequent users of a social network site, because they are made to be the attention of other friends.

Figure 5B:
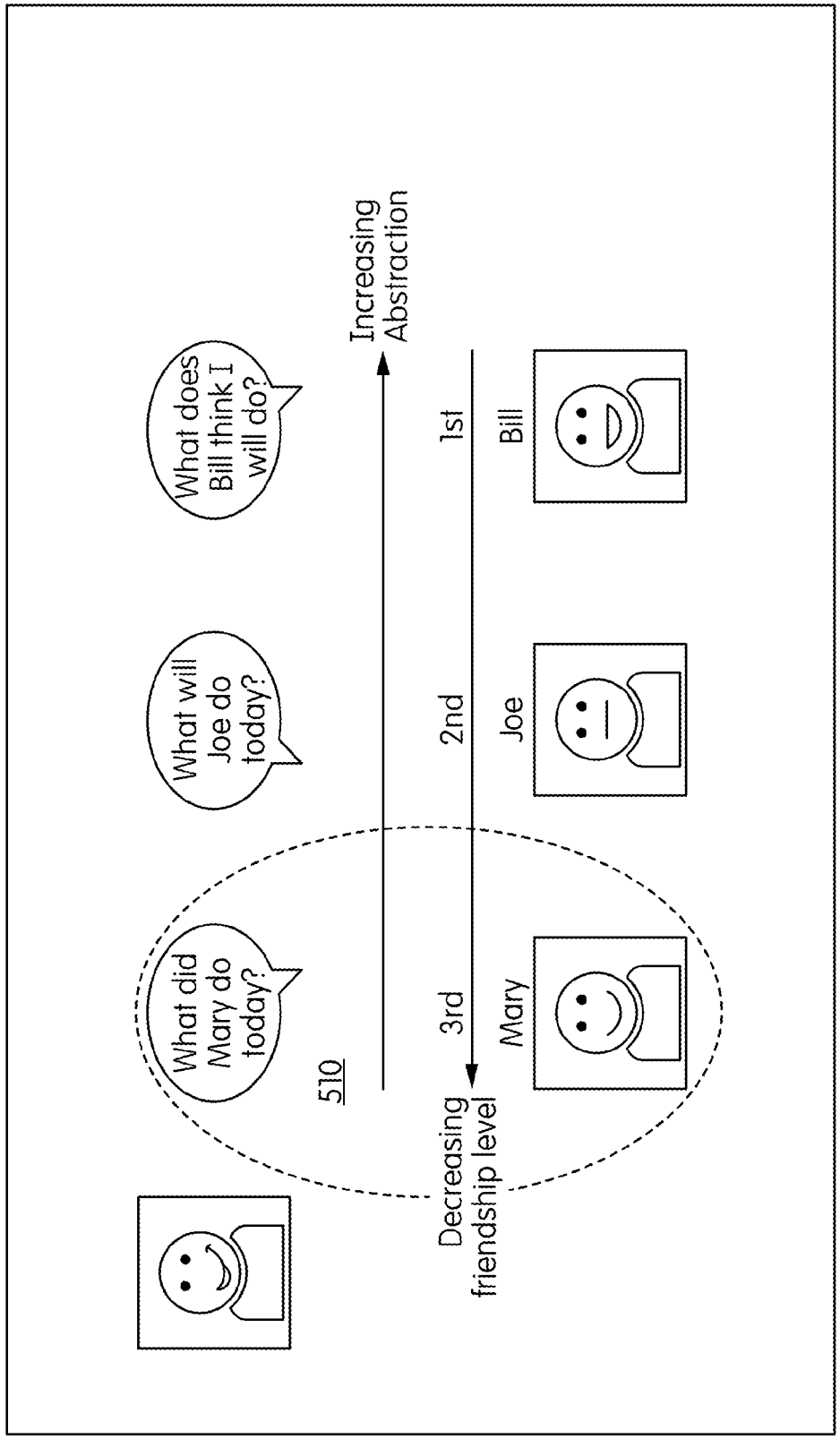

As alluded to earlier, most users engage daily with only a small number of their close contacts. As seen in FIG. 5B however, embodiments of the present game promote and enhances interaction outside the normal social "bubble" and with engagement techniques that are tailored to extend into groups 510 that may be less frequented by a circle of friends (such as Mary).

General benefits of the present embodiments include:

1) Content consumption (or any other FB recorded action) by users is "gameified" and feedback sharing is increased b/c it is fun;

2) Content awareness increased to other members and social graph is enhanced at little extra effort;

3) Incorporates information "bartering"; users must provide data to see data;

4) Users stay involved because they connect one-to-one with their friends and get feedback on a) how they compare to friends, and b) how good their prognostication powers are (how well they know friends); and c) their network taste/diversity characteristics;

5) User and article ratings logged and counted over time to reflect milestones (100 ratings, 100 articles, and so on); and 6) Game features can be presented over time with features tailored to different user tastes;

7) Gentle nagging/prioritization can be implemented to make sure people rate content and each member gets at least one prediction per day;

8) All game data (ratings, user correlations) can be used by a social network platform (such as Facebook) to supplement existing recommendation technologies for generating content for news feeds, and targeting of ads based on clustering/dimensionalizing users and articles;

9) Selection of Qs can be designed to build out social graph; i.e., it can be prioritized and optimized to fill node-edge "gaps" and resurrect activity by less active users to renew stale social graph data;

10) Anonymity for some predictions could induce some users who would otherwise remain silent to provide data, particularly for content that might be sensitive, or negative affinity/association; and 11) The present embodiments reduce Filter Bubble effects.

All of these directly improved the metrics discussed above, namely, a social network's site ability to attract new visitors; increase visitor time/interaction on site or with the content; and user (subscriber) retention rate.

Social Graph Enhancement

In a normal social network context, a social graph 600 is constructed with and stored as a set of nodes (A, B, C, D, E) and (D1-D5) and edges (R1, R2 . . . etc.) as seen in FIG. 6A. Information on this technique is provided at a site operated by Facebook, including under the topic "Edgerank." Edgerank operates like the Google counterpart "Pagerank" except that it leverages links between objects and people rather than documents, and computes similarities and rankings based on such relationships.

The Edgerank score is used to determine the output of Recommendation Logic 130 (FIG. 1) to users' news feeds, or content data streams, as received on their home pages, mobile devices, etc. The gaming embodiments of the present invention can be used to modify the scoring for objects, or create new objects, for presentation within the same types of news feeds.

Typically each object or item to be considered for a user's news feed on a social network site is given a score:

$$\text{Item/Object Score} = \Sigma_{edges} a_e w_e d_e$$

Where a=affinity score between user and friend who created edge w=weight of edge (whether it is a share, comment, like, tag, post, etc.) and d=time decay factor (how old the edge is). This information is stored as part of a nominal user/content graph 136 (FIG. 1).

This score can be computed across all user/friend pairs who are part of the user's social network and who interact with the object, or the entire network, or some other subset of persons. The items are then sorted by score, representing a prediction likelihood that the user will find the item relevant and interesting.

The items are then presented to the user in this order in the newsfeed 130, taking into consideration of course other content that must be presented within the user's home page. Notably, while the object or item score is defined usually relative to a newsfeed datastream, the same weighting could be applied to advertising content, search results, etc., as output by logic 142 and 132 respectively.

In the present embodiments, a number of adjustments and improvements can be made to this basic item score for presenting content that has been integrated and made part of game engagements. This results in new edges and objects that form part of an augmented user/content graph 138.

First, in the typical use cases, an "affinity" score is typically based on a quantity and frequency of interactions a user has with another member. If the user and friend don't interact very much, the affinity score is typically set lower. To break the "filter bubble," embodiments of the present invention consider that at least for some game content and some types of objects, an affinity score could be calculated using the opposite relationship, meaning that the lower the interaction, the higher the affinity score. A number of engagements (N) between the two users over a recent predetermined period (T) can be used as a baseline measurement for affinity. In a sense, this can be considered a modified or target affinity ($T_a$) score, as one game objective is to develop greater affinities between users. For example an online network might target 1 engagement per 10 days, or 0.1/day, etc. as a figure for $T_a$ and compare an actual affinity before and after a number of game cycles, or period of time, to determine an affinity "lift" offered by the present embodiments.

Similarly, in typical content feed optimization schemes, the "weight" of an object is based on the quality of interaction by the other member, so that a member creating an object is given a stronger weighting than that member simply liking it. In the present embodiments, a unique game weight ($G_w$) factor can be ascribed to reflect that a member performed one or more of the different interactions of "predicting" or "guessing" allowed within the game mechanics. Thus the $G_w$ factor may be increased or decreased relative to other object weights to get a reasonable amount of game exposure.

Finally, the basic prior art scoring system uses a decaying relevance time delay factor (d), so that older content becomes less relevant. In some instances, the content may become invisible after only a few hours. In contrast, in game embodiments, as noted below, there may be more desirable or optimal game engagement times that are determined experimentally and based on observing member content consumption patterns. The game time factor ($G_d$) therefore can be adjusted to give greater weightings during these target engagement times determined below in FIGS. 8A-8D.

The result of these modifications is that game content, as well as other items (ads, search) are reflected by a similar but new relationship, altered as noted above:

$$\text{Game Item/Object Score} = \sum_{real + predicted\ edges} Ta_e Gw_e Gd_e$$

This scoring can be used in addition to, or in lieu of the normal scoring noted above for considering content in a news feed. Not all members of a user's social graph are likely to participate in a content game engagement system, but this should not deprive such participants of the benefits of the additional understanding of relevant data for them.

Figure 6D:
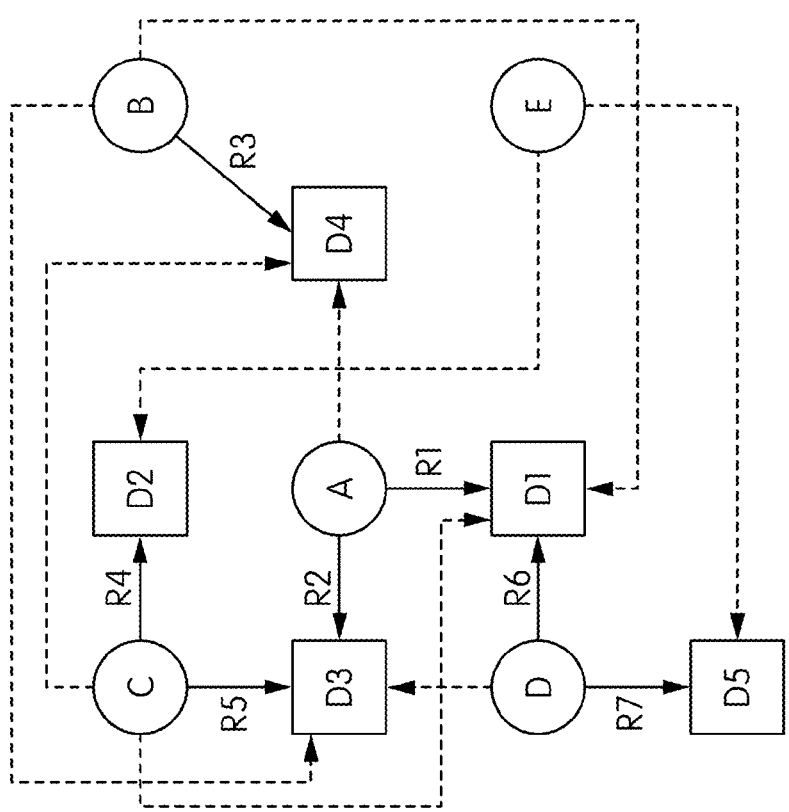

Thus the present game logic can consider scoring the object not only across those members who have interacted (to create an edge) but also those who are predicted to interact with such content (by users providing prediction data) and as reflected by the virtual/predicted edges discussed for FIG. 6D. As alluded to, the predicted edges may in turn be weighted separately or reduced in relevance if desired.

Consequently, embodiments of the present invention augment and enhance social graphs by collecting more and better ratings. Accordingly, such network sites can benefit significantly from the intelligent question/prediction targeting of the game.

FIG. 6B shows that in most social networks, interest graphs (box 136, FIG. 1) are mostly empty because the number of items soon dwarfs the number of users 614. Most users will not engage in a substantial amount of content consumption, so they have few ratings. Accordingly, it is difficult to make predictions for content for infrequent users (person E) or, more acutely, new users.

FIG. 6D illustrates visually how the invention enhances a typical social/interest graph. When A makes a prediction for C concerning an item D1, this can be used to construct an additional edge, or, at least, a tentative edge. The weighting of the edge could reflect the tentative designation. This tentative linking, however, has two uses; first, it can result in a real edge later on when C engages with the item. Second, by factoring in this tentative edge into a social graph edgerank calculation, improved targeting of content, ads, etc. can be achieved, particularly for users with lower amounts of ratings, interactions, etc. For example engagement with E, who has few links, creates and builds out the graph further with very minimal effort. This augmented graph 138 is thus created and stored by a social networking site.

As seen in FIG. 6C this activity creates and fills more data into the social graph—matrix. The targeting and number of predictions solicited can be controlled and optimized as needed to serve particular goals, including enhancing an overall recommendation performance of a larger content serving system. As noted above, existing social networks try to create interesting news feeds, by finding stories of most interest to their users. A number of different signals are used as seen in the case of Facebook for example. But, unlike the invention, they do not solicit or rely on friend predictions, tentative relationships or similar signals to improve relevancy.

Second Embodiments

It is understood in the art that there are limits to what apps can access or do with user social graph data. Third party apps in particular also typically cannot control or drive a question/feedback interface dynamically within platform.

A second embodiment of operation of a content engagement system is shown in FIG. 7. In these embodiments, the steps and processes are similar to that shown in FIG. 2, (again like reference numerals are intended to denote like objects) with the main difference being that engagement can be derived in context by observing user activities, including consumption of content on a social networking site. The MANDEIVO™ game core logic 700 is implemented directly by a social network platform to solicit and present questions, surveys and feedback in real-time, instead of requiring it to be pulled through an app.

A preferred enhanced embodiment 700, which tracks a user's activities dynamically and captures ratings in real time, is shown in FIG. 7. The user may or may not contribute ratings for the content as before. A game friend selection logic module presents potential friends to be the subject of a prediction by the user.

Every time a piece of content (FB Id 712) is consumed by a user (FB User ID 711) this event is logged at step 710, and stored with accompanying user and ratings data (which may include context data, timestamp data, etc.) in a database at step 713. This may include for example, a conventional activity log maintained at such site. In the situation of some social networks, an implicit rating can be generated based on the act of reviewing the content, and without an explicit rating (like, etc.,) from the user. Consumption patterns can be gleaned from timestamps to glean user profiles and models for some targeting operations.

In addition to user ratings, predictions are also collected at step 720 through a ratings interface, which may be presented in a separate pop-up screen along with the original content. Preferably this is presented during or immediately after the user's consumption of the content. The ratings screen may also be independently invoked by the user.

Friend selection logic accesses a friend list 722 to select one or more "friends" who form the subject of the prediction. The selection may be random or it may consider engagement optimization, engagement likelihood, graph gap fill requirements, etc. In other words, a prior engagement history may be consulted to detect if the friend is likely to reciprocate and engage with the user. Missing or desired data for a social graph or interest graph may be considered and processed to identify an optimal friend selection for maximum information contribution to a recommendation engine. Again, the logic here can be randomized, or configured to ensure that the targeting is done for someone in the user's network who has not already received a prediction, or at least a prediction for this particular item. As before, engagement outside the "bubble" can be configured and driven as desired.

At step 720 the system may then suggest different friends, and different kinds of predictions or guesses as seen in the flowchart. A first type of "prediction" can be solicited before an actor performs an activity; a second type of "guess" query can be presented after an action occurs, but before the user is perhaps aware; a third type of prediction looks at predicting which predictions have been made by friends. The user prediction actions, ratings, scores for their social graph can be stored in a database at step 725, published on their page or to other friends, etc. An API can be provided to permit third parties to access user-content-friend-ratings pairings as desired.

The user's friends' activities and predictions are also collected and stored as before in "network data" box 240 (FIG. 2). This, again, can be derived from searching and accessing an activity log at such sites. As noted above, in some applications engagement with friends is limited because the underlying social networking platform constrains a member newsfeed according to a predefined newsfeed algorithm. In some instances, game content will be scored in accordance with an existing newsfeed scoring system as noted above, but in preferred embodiments, a social networking site will at least employ game modified scoring to improve presentation of game features and engagement. In other instances too where the social network site is driving engagement it can of course control programmatically whether friends of the user are exposed to game predictions and solicitations.

Databases for the user's predictions (242), and user/friend content ratings (248) are maintained. User/user correlation scores (244) and game stats/scores (246) are computed and stored as well. These operations may be performed primarily off-line, or on a server side, to reduce operational overhead on a user's client device. The structure and format of these databases can be customized for the needs of any particular application based on the present teachings.

The user's social network friends are monitored at step 730 (including by accessing their activity logs), and compared against the user's predictions to compute a user score. Monitoring can be performed by examining details of a user's actions with objects taken in their account, such as described in U.S. Application Publication No. 2013/0179271, which is incorporated by reference, as one example. Scores for the user's network of friends can also be computed at step 750. Information on the correlations between users can be stored in a database at step 740, which can be the source of an API as well. For example, a third party vendor may tap into the user-user content correlations, albeit for different products, based on an assumption that the correlation would be the same for the item offered by such vendor. The game scores are calculated and presented to users through the interfaces described below. The correlations can include, among others, the types of calculations for content and users described above in FIG. 2.

Thus in these second embodiments, the application program is integrated within the fabric of a social networking site or web page, so that it can actively monitor user engagements, consumption, etc. dynamically. This approach can improve both the number and timeliness of ratings and predictions data since it can be solicited and reviewed in real-time by the user. Ideally user input should be collected as near as possible in time to the moment of perception.

Figure 10A:
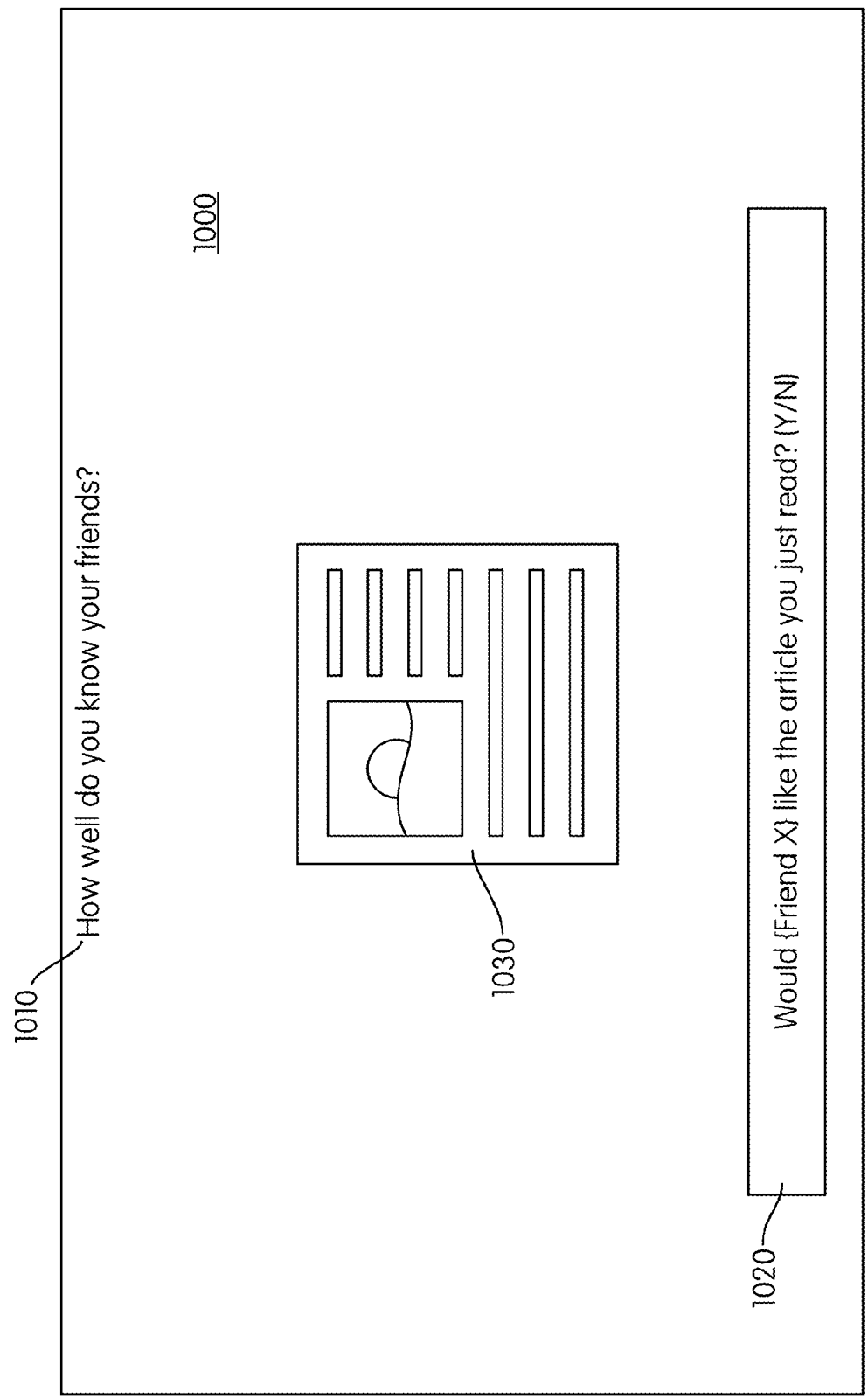
FIGS. 10A-10G and 11A-11E show examples of graphical interfaces implemented on a user's computing device for capturing, presenting, collecting and scoring data as experienced at a social networking site or similar platform.

FIG. 10A gives a first example of a standardized, lightweight prediction question that can be presented to users of a social networking site in accordance with any programmed logic for survey 1010. The questions can be based on any measurable activity permitted on the social network site. They are presented within a graphical interface 1000, which as noted above, may be presented by a conventional web browser or an application running on a client's device 112. In their simplest forms, the questions 1020 for the game/survey require simply binary Yes/No data, and are associated with a specific social network friend {X}, and a specific piece of content 1030. As alluded to above, friends can be picked at random; changed daily, etc., or optimized to increase engagement—and build out social graph/content. As noted above for the first embodiments user ratings can also be acquired, and data provided anonymously. The questions are stored and processed by a scheduler (see monitoring logic 157, FIG. 1) which then monitors friends' activities registered in a log, to confirm the occurrence of such, as well as any other predictions discussed herein.

Figure 10B:
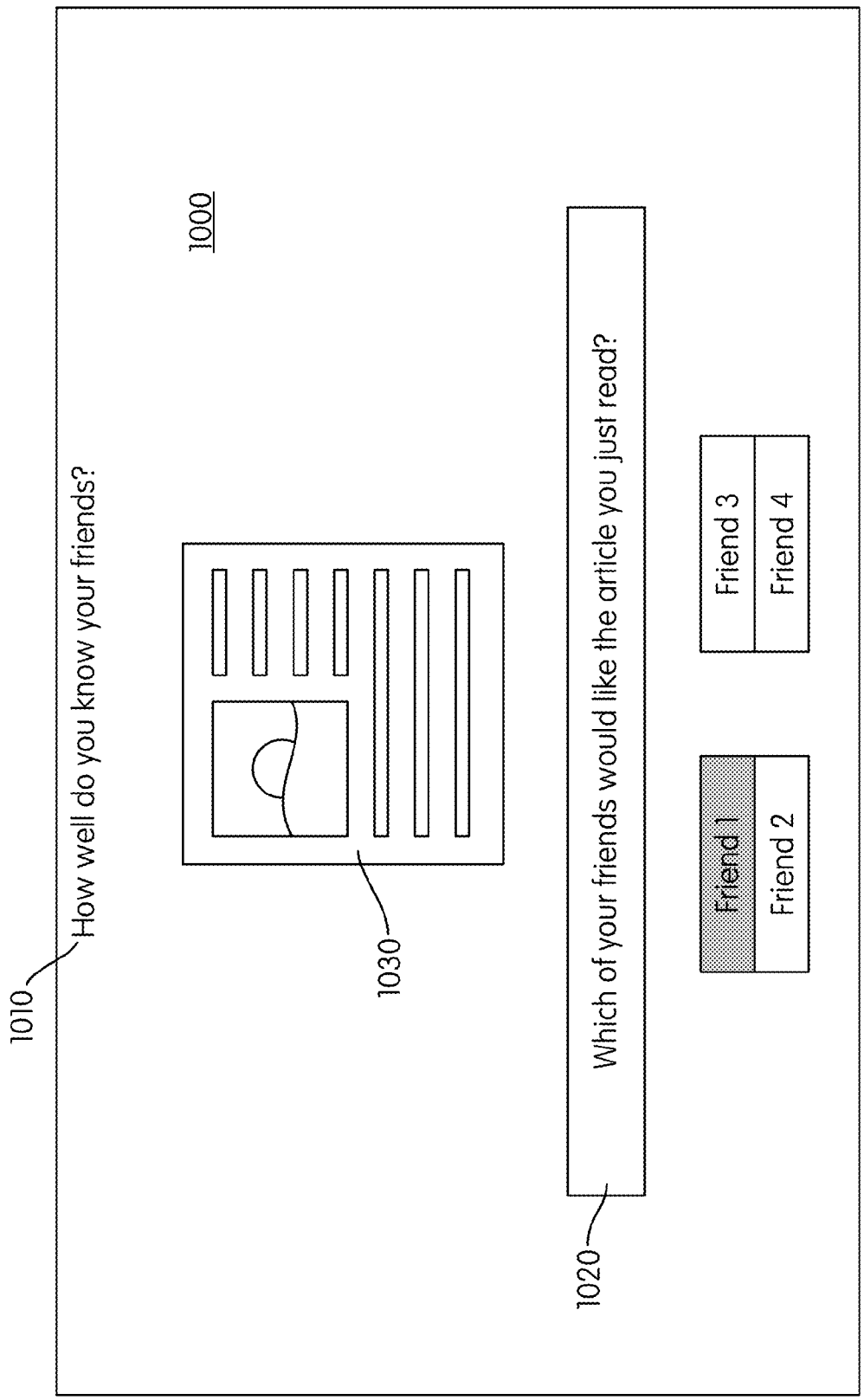

In the embodiment of FIG. 10B, the form of the survey/game question is slightly different and more open ended and rather than pre-selecting a single friend instead asks a prediction of which friends are likely to like the article read by the user. As is apparent more than one friend can be selected, allowing for a 1:N mapping of items to users. To preserve anonymity, some users may prefer to make such recommendations or predictions without attribution.

Figure 10C:
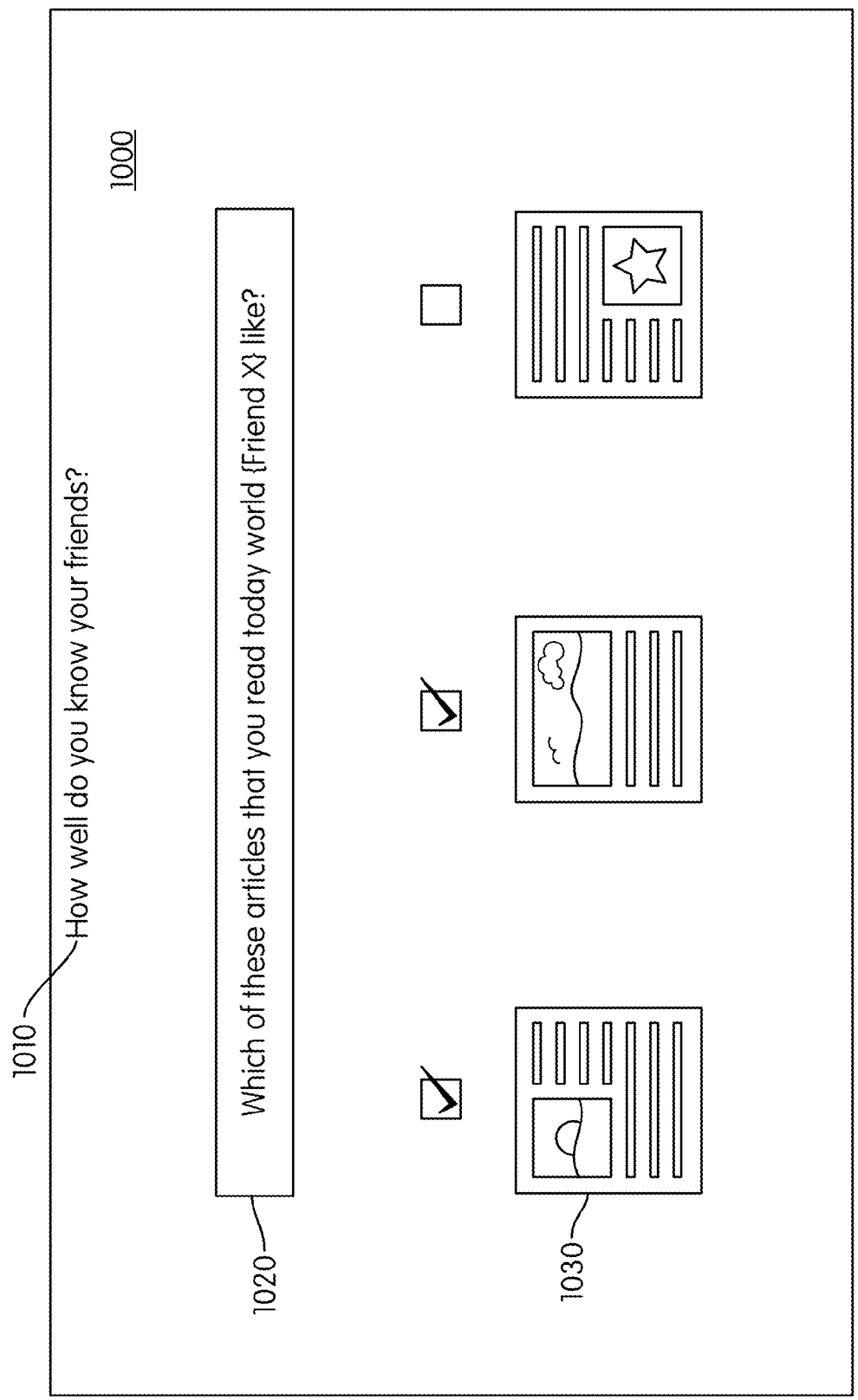

FIG. 10C shows a slightly more open ended question in that it presents the option for the user to select more than one item of content 1030 for a particular friend {X} in an N:1 mapping (items/user). This game question can be invoked and presented when the user has engaged or consumed more than one item of content.

The game questions above are triggered by activities of the user, again, which can be detected through monitoring an activity log. The friend engagements are then driven by these activities, as well as counterpart content consumption by the user's designated friends. By operating on both sides of the user-friend relationship, embodiments of the invention further create a form of social interaction lubricant.

Figure 10D:
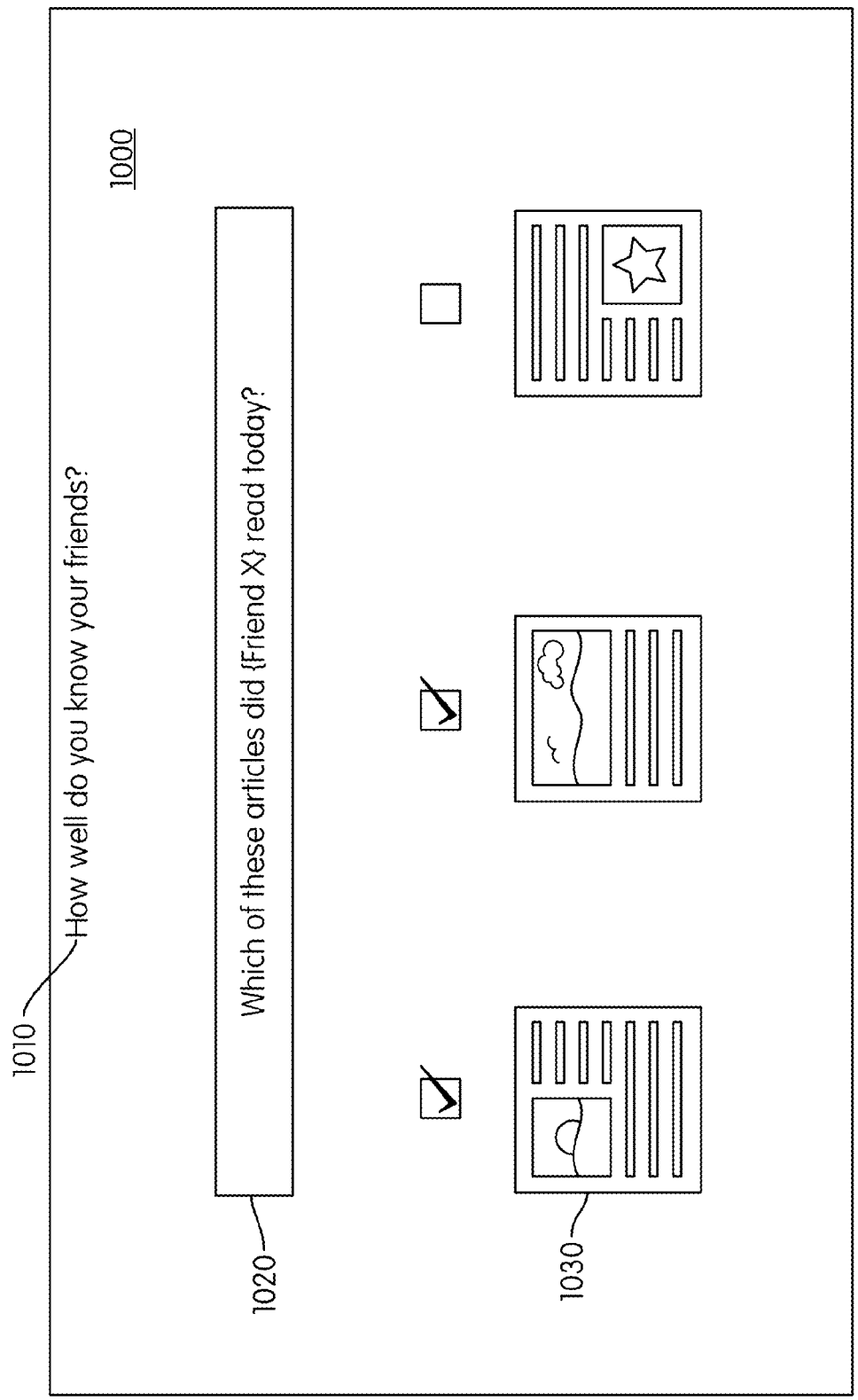

For example in the FIG. 10D this type of question 1020 presents a kind of after-the-fact "guess" in that the action for the member has already occurred, but the user is required to guess. A timer could be incorporated to reduce "cheating" because theoretically a user could review Friend X's timeline or activities to identify in fact what this person did. However as even such user perusal activity drives engagement, it is possible that in some embodiments such behavior would be in fact encouraged, not discouraged. The quiz is again presented in an N:1 format with a simple binary input (yes/no) to make it extremely lightweight b/c it focuses on a single friend-contact.

Figure 10E:
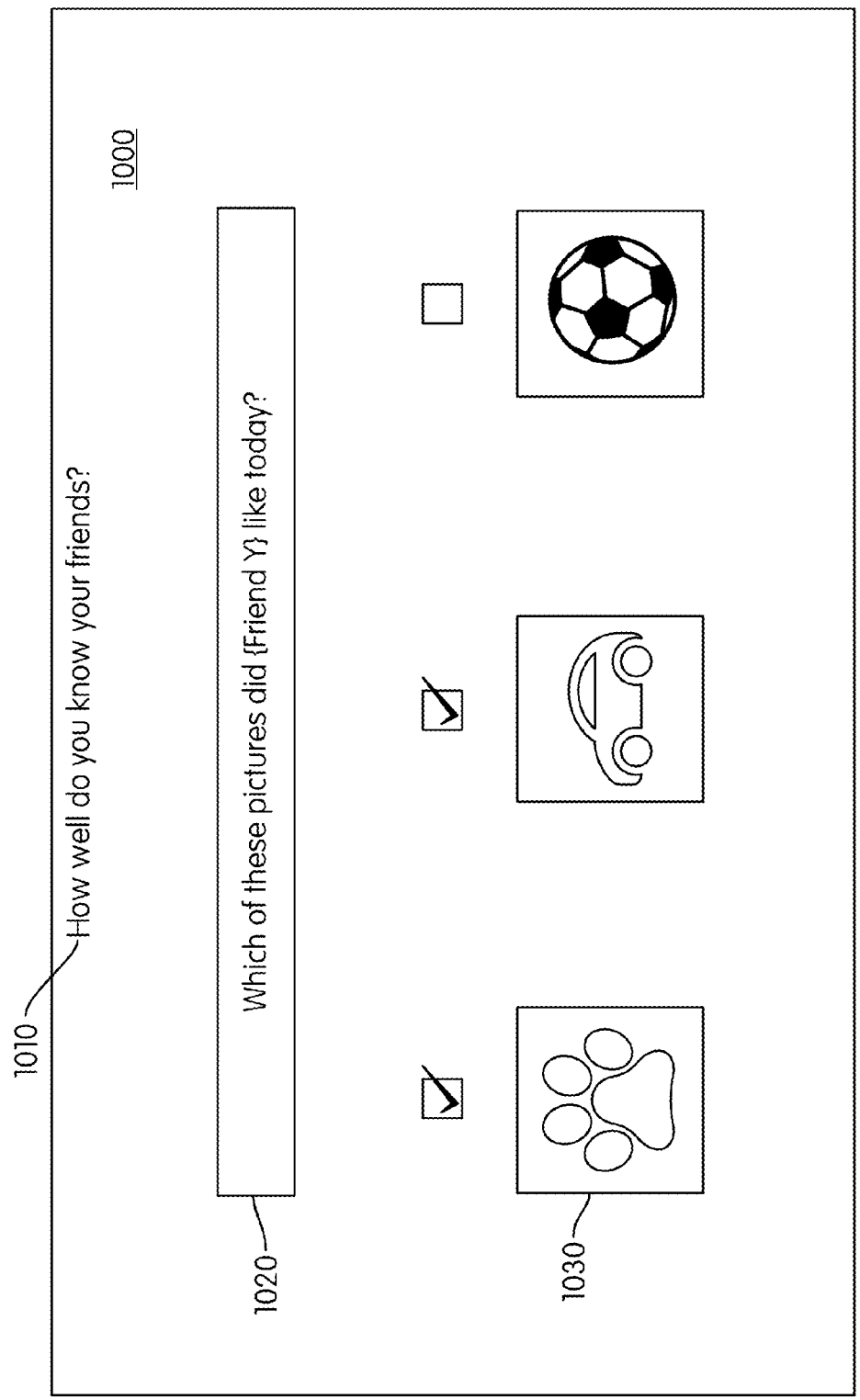

FIG. 10E illustrates that some game aspects can be expanded to encompass any form of content consumption or graph related action/behavior to be the subject of a prediction. The user could be asked about any multi-media content consumed by the social contact: stories, songs, video clips, game apps, etc. Since images are known to drive engagement more than text content, it may be preferable to weight such types of content predictions more heavily.

Figure 10F:
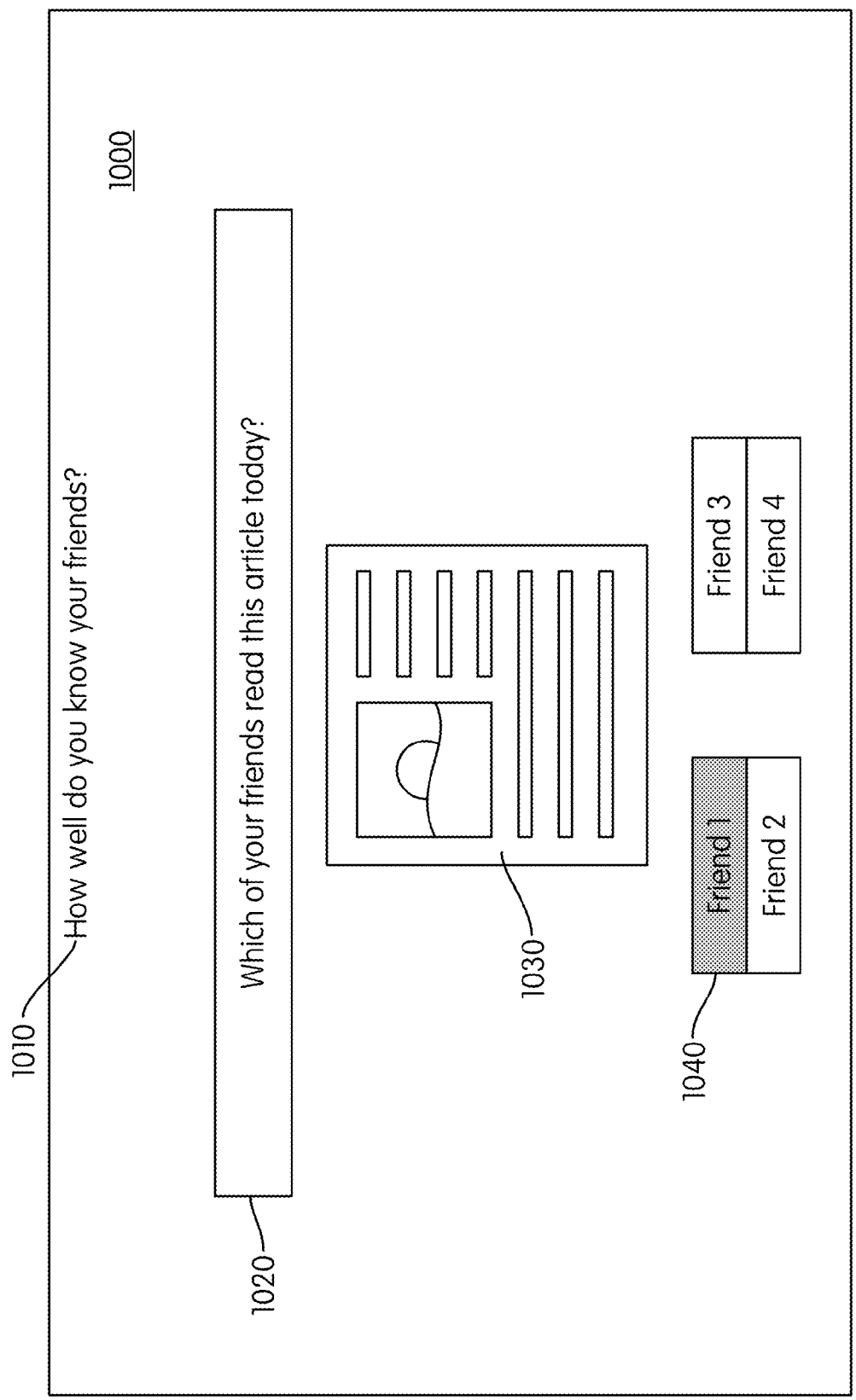

FIG. 10F is an extension or modification of the kind of question posed above, in that the activity has already occurred so technically it is not a "prediction" but an educated guess based on the user's understanding of the contact's interests and behavior. As above, this form of question is binary but is in a 1:N style which allows multiple guesses.

Figure 10G:
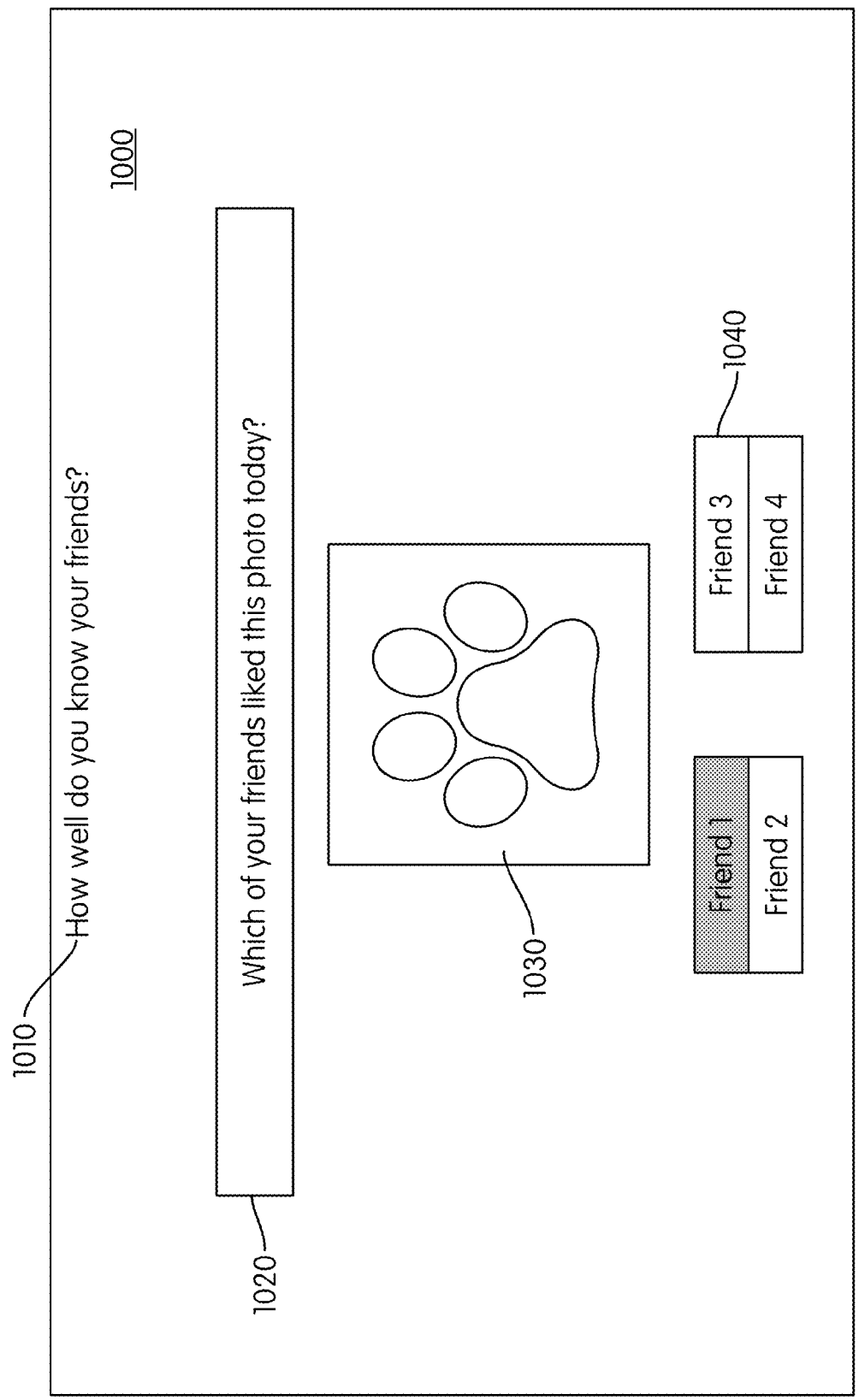

FIG. 10G corroborates that any form of content can be presented to the user for predictions/quizzes. Again, it is conceivable that a timer could be used to reduce opportunities from cheating from user's simply perusing their friends' timelines. The user's guess could be improved by studying friend behaviors, which may not be a bad thing again since it creates further engagement. Accordingly "cheating" may be incorporated and encouraged in some instances.

Another aspect of the engagement system involves a converse to FIG. 10A's survey, and considers quizzing the user to understand, determine or assess how well his/her friends know the user's tastes, behaviors, etc. This knowledge is not determined algorithmically, but, instead, through surveying the user directly. This is yet another alternative form of prediction-guess, which considers the perspective of the user trying to ascertain a friend's perceptions of the user's tastes/behaviors. As such, the question is complex in formulation, but easy to answer because again it is a 1:1:1 comparison: one answer, one item, one friend.

Figure 11A:
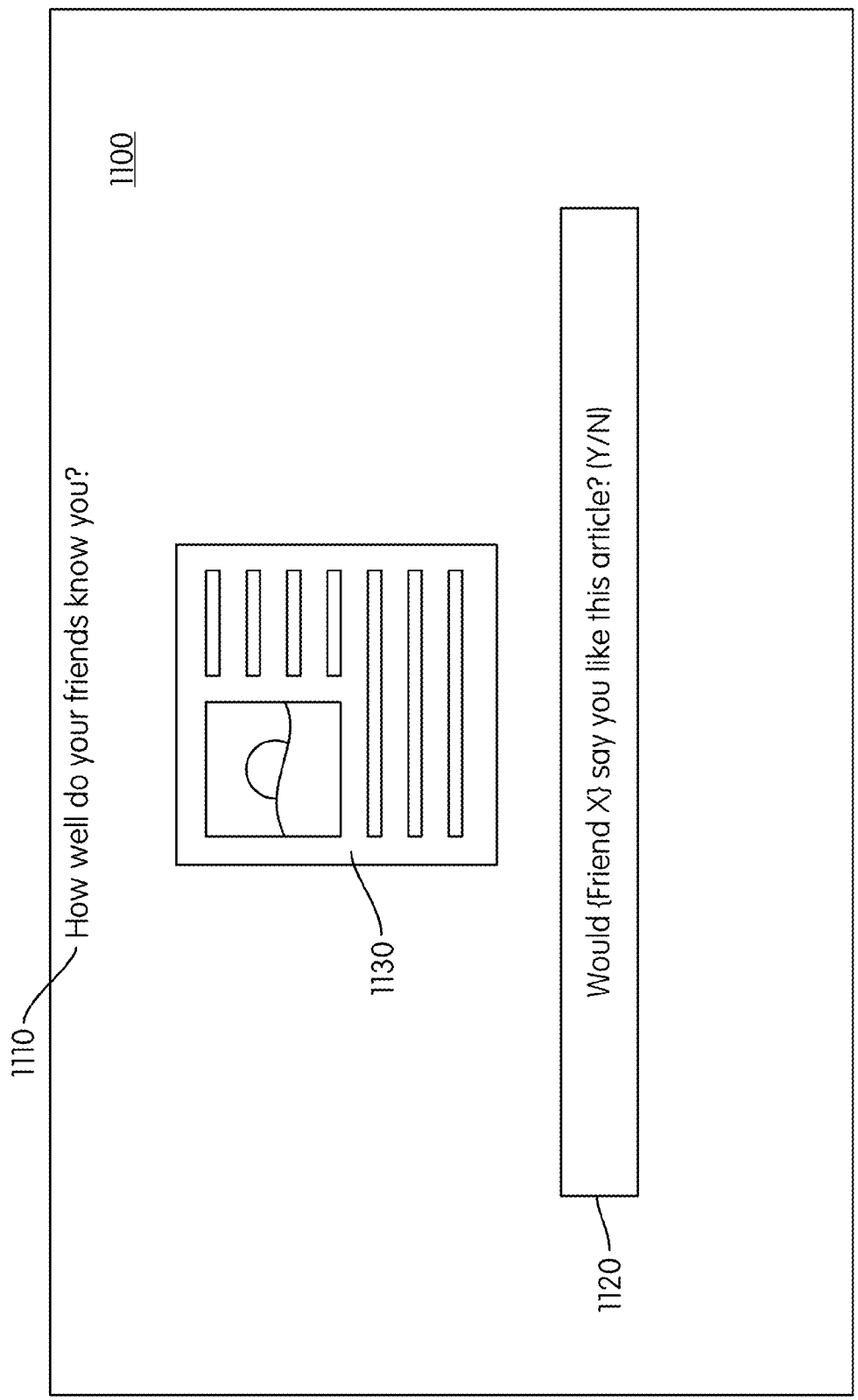

An example of such question is presented in an interface 1100 shown in FIG. 11A. The format of these questions 1120 for content 1130 should encourage easy participation by game players, and it is expected that similar types of engagement questions formulated for a specific user—knowledge—action domain could be developed.

Figure 11B:
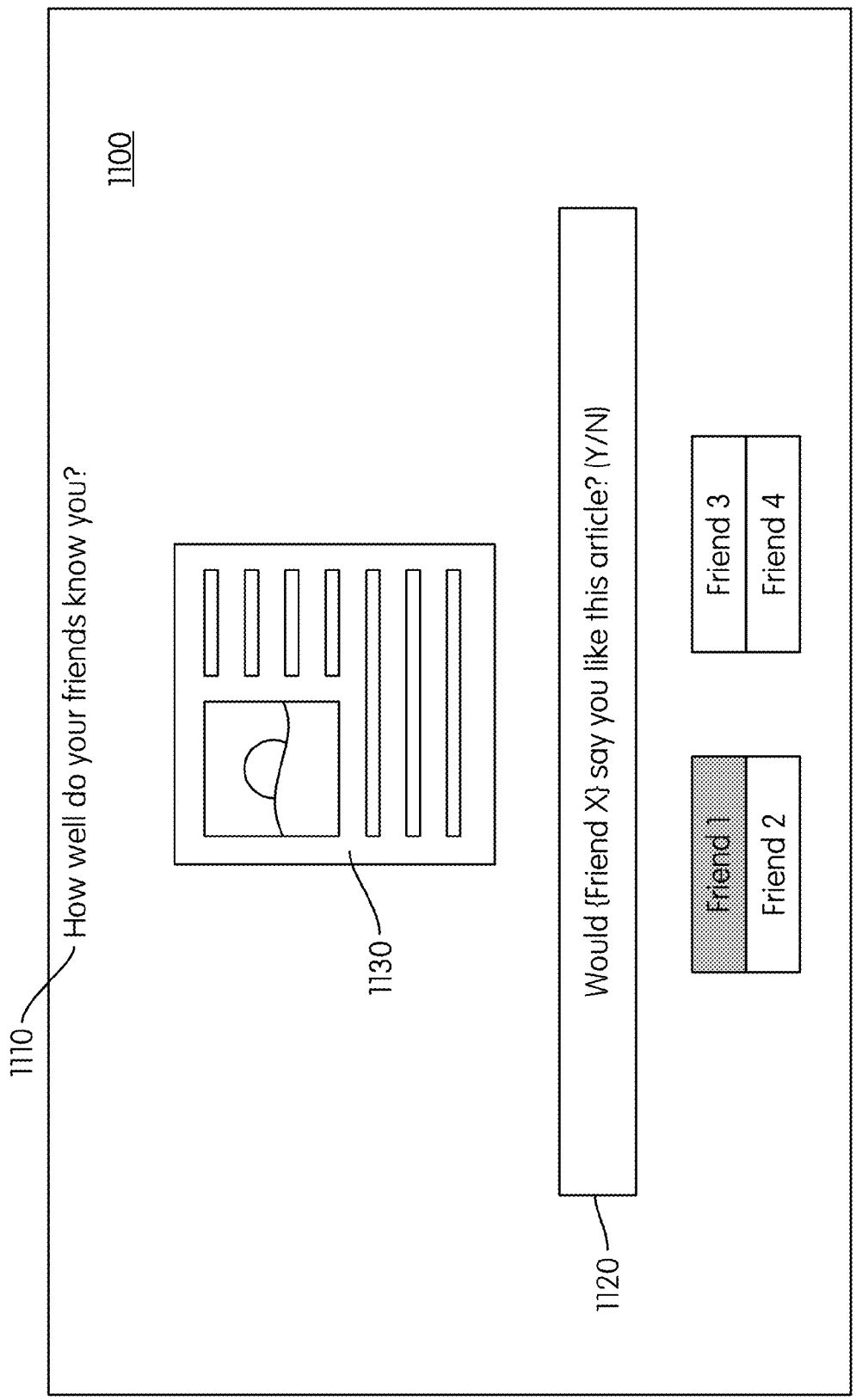

In the embodiments of the present invention the main purpose is to fill out interest and social graphs by gamifying the experience of rating and answering questions. FIG. 11B shows an example that is similar to the prior question, but now the user must consider the mindset of more than one friend. The benefit again is multiple predictions or guesses within a single question.

Figure 11C:
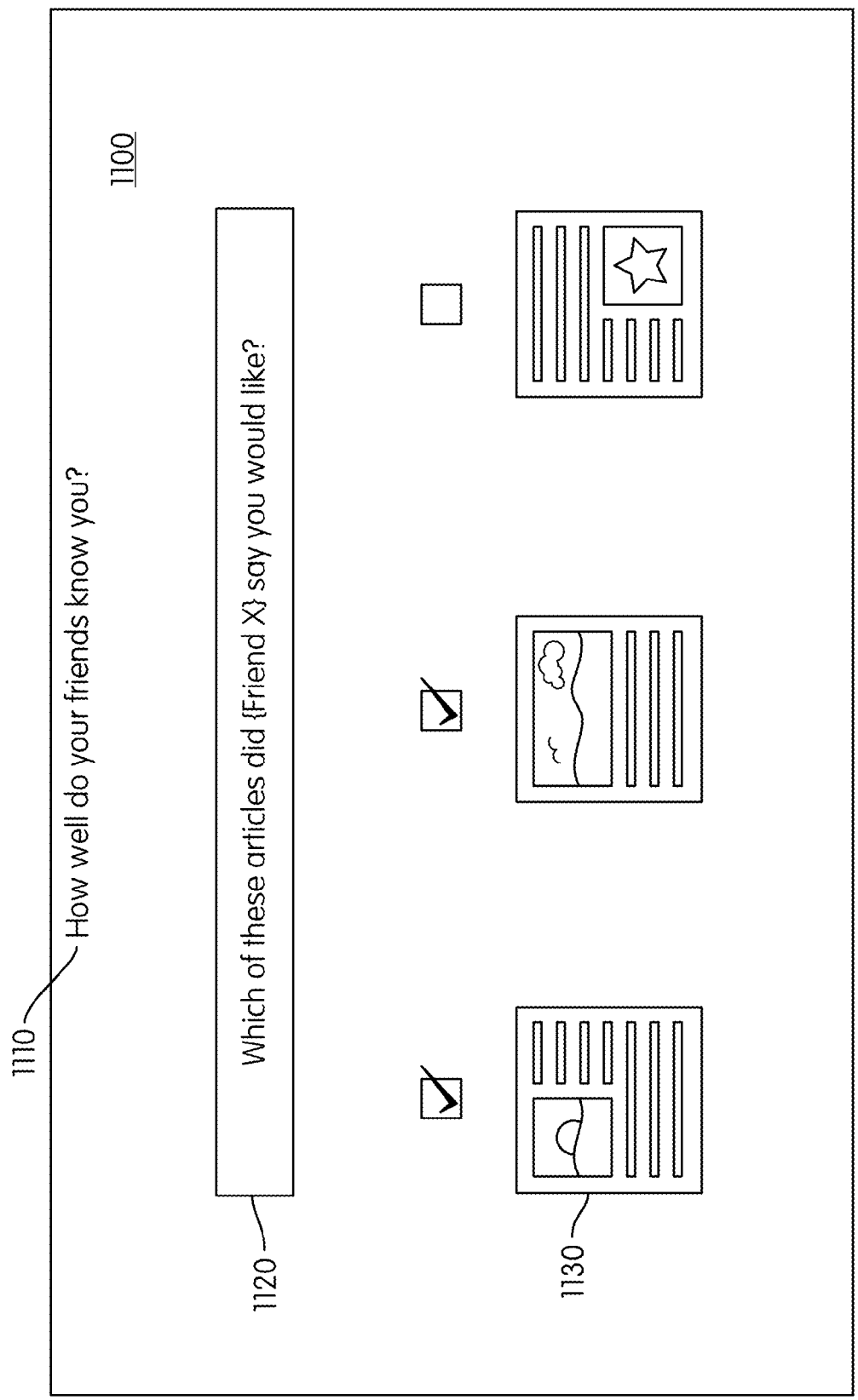
Figure 11D:
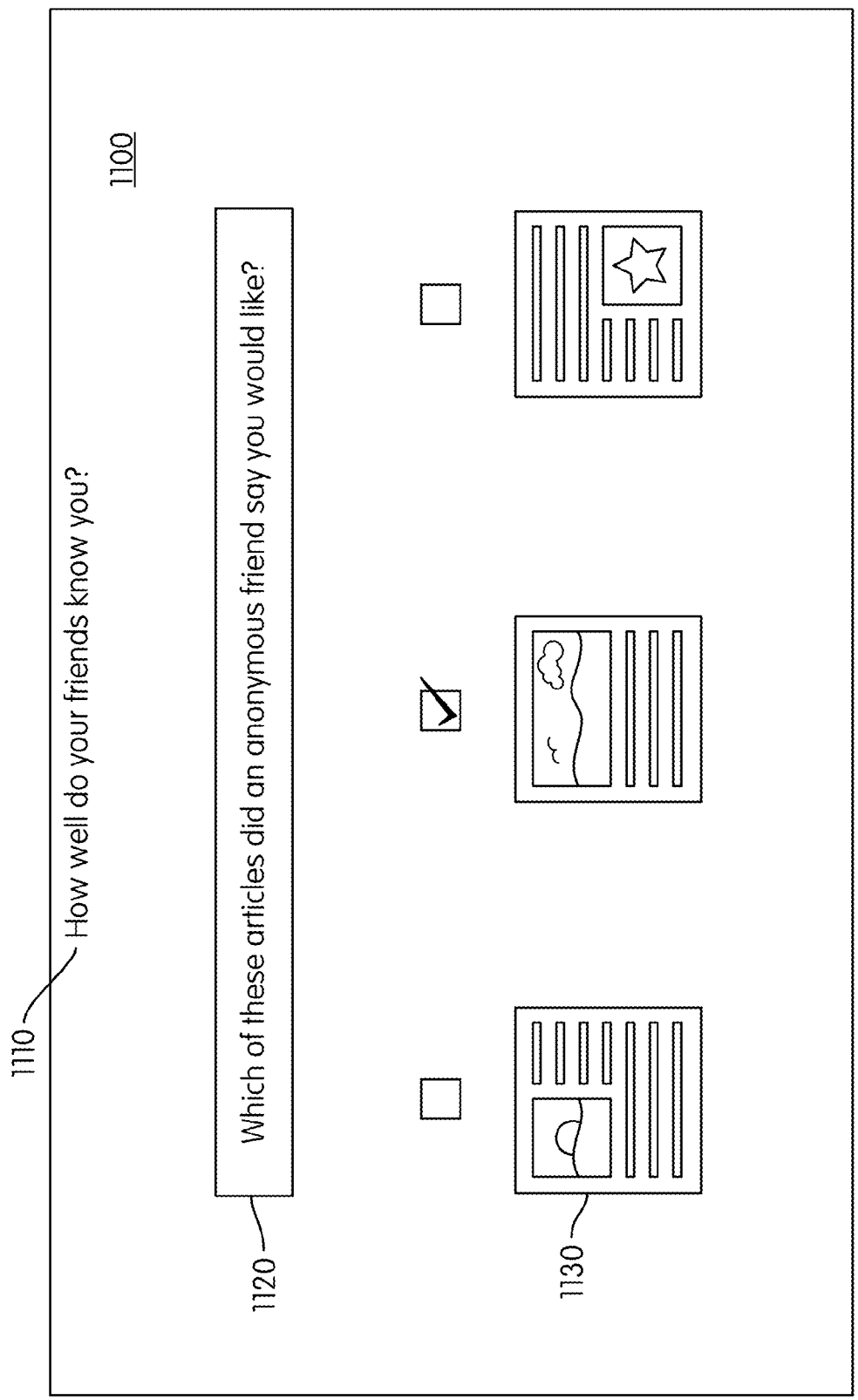

FIG. 11C shows another slight variation, where the targeting is 1:1 of friend to user, but the number of articles 1130 is varied. It will be understood that any and all forms of questions could be solicited, and it is possible from observation to determine which questions result in greater dataflow from particular users. That is, certain users may prefer direct questions, and others may prefer more open ended questions. Embodiments of the invention track these choices and present prediction questions appropriately. As FIG. 11D shows another aspect allows users to see anonymous recommendations as well.

Figure 11E:
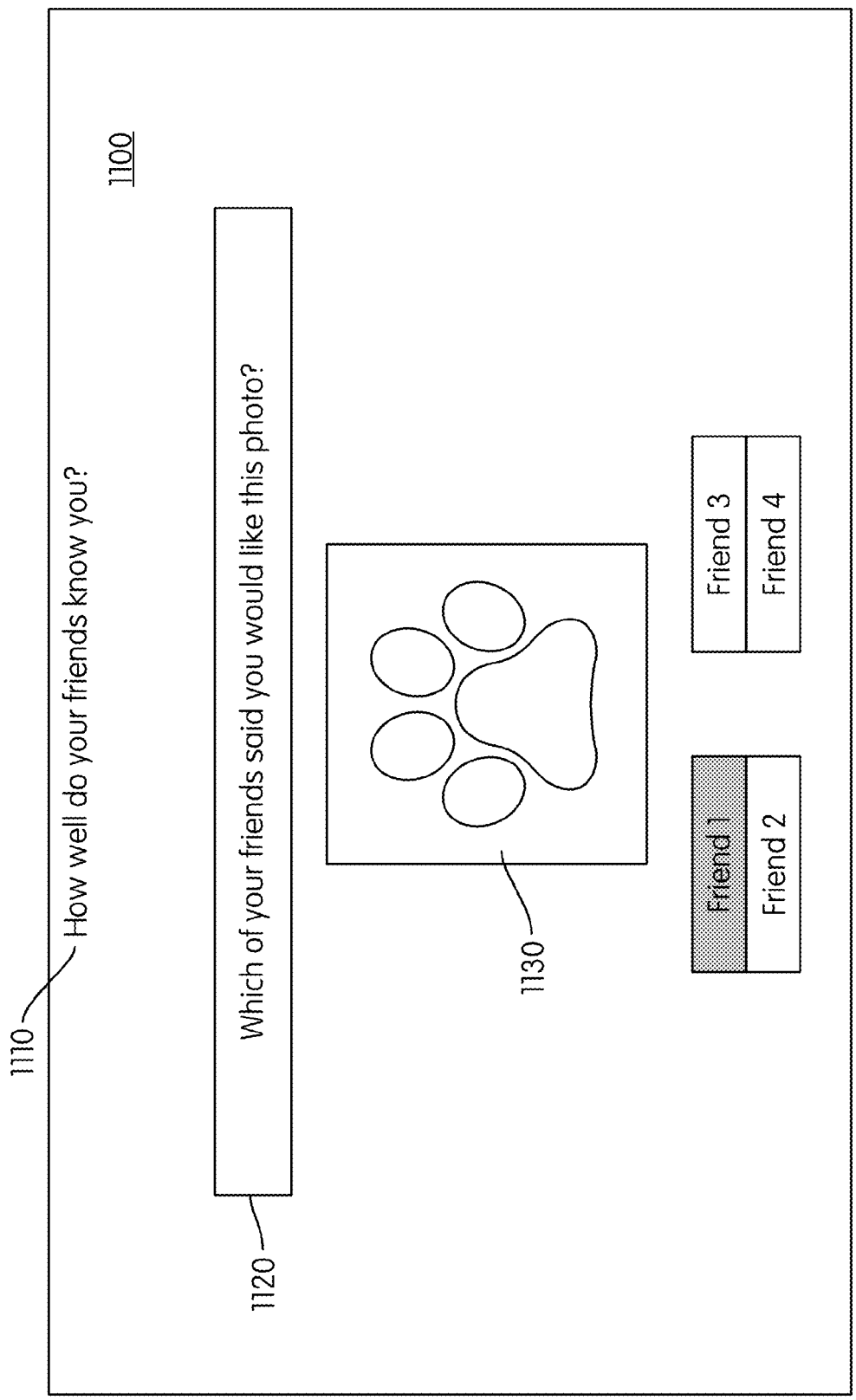

FIG. 11E shows an example of presentation of reciprocal questions above, in which the user is presented with the option that multiple friends may have recommended the same content. In some embodiments the invention could solicit a first prediction for the user; if that prediction is confirmed or ratified by yet a second user, this would be strong signal that the content would be of interest to the user.

Second type embodiments as described herein have all of benefits noted earlier in the first embodiments, and further include characteristics, namely:
  Triggers preferably are immediate based on user consumption;
  Degree of involvement is preferably tailored based on user interest or artificially constrained;
  Some users prefer to be asked (who did what?) than to be told (x,y,z did that);
  Participants feel good when they see friends are interested and "know" them;
  Participants feel good when they confirm that they know their friends;
  All data can be used to supplement existing recommendation technologies for generating content for news feeds, customizing search results, etc.;
  Prioritization can be implemented so that every member of the network preferably has at least one recommended piece of content per day; and
  Anonymity can be incorporated if desired.

Again these positive engagements drive increased user membership, attention, etc.

Other Variants of Social Graph Games

In addition to basic content consumption games, other embodiments of the invention can implement novel and unique games based on user engagement. For example, FIG. 12A shows an embodiment of a game 1210 presented in an interface 1200 that can be considered a social network activity "polygraph." This short quiz game allows the user to quickly make guesses (e.g., true or false) on activities 1240 about his/her friends in their social network. In this instance the prediction data is all simply yes/no confirmations but other forms of input could be used.

Figure 12B:
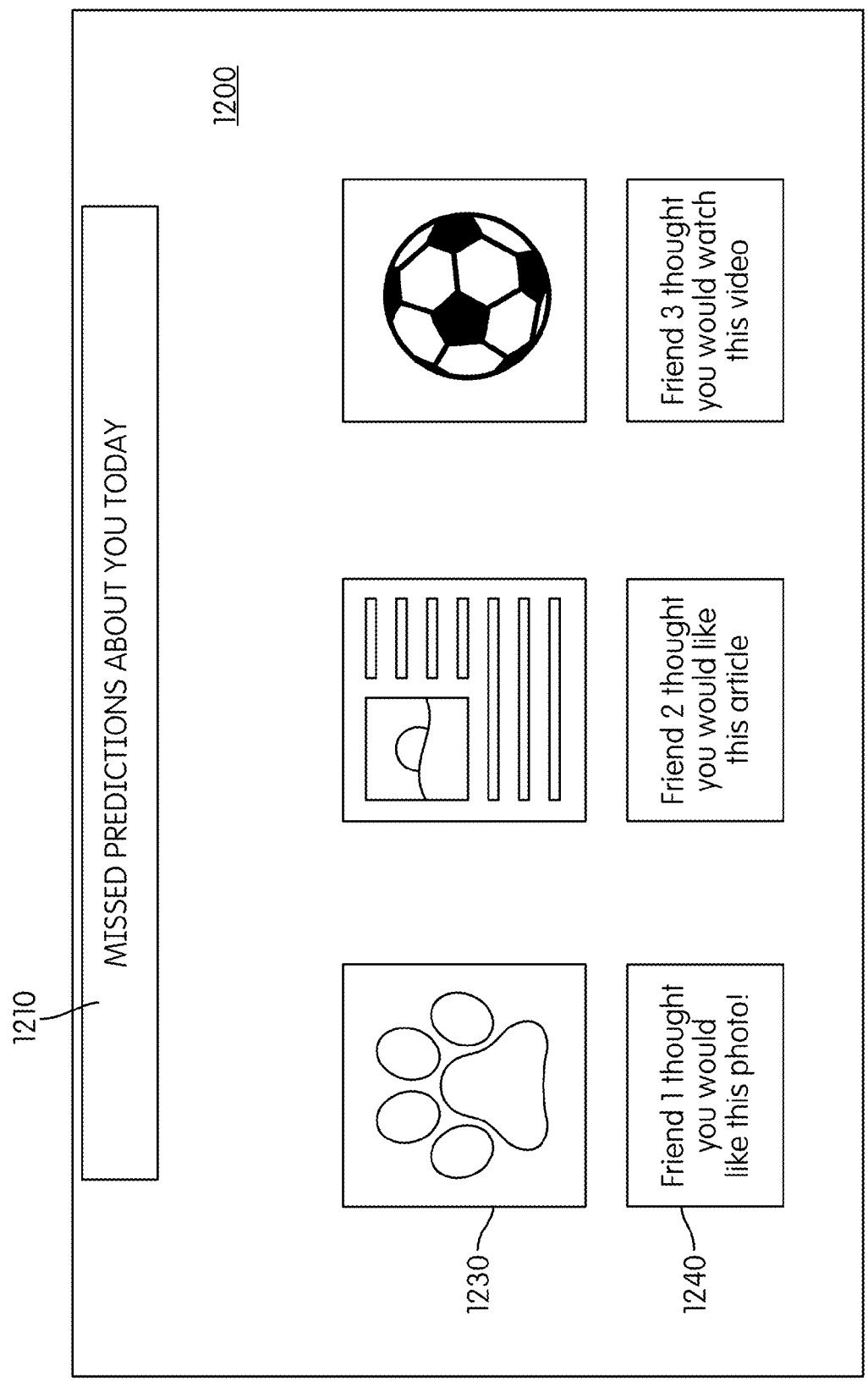

FIG. 12B shows feedback 1240 given to the user about predictions or guesses by the user's social network that were "off" or incorrect. These have an independent amusement value since "failure" in some predictive capacity can be a driver of social discourse and engagement as well.

As noted above, the bulk of predictions, guesses, etc., are solicited on a daily basis, or perhaps some other convenient time scale appropriate for the platform. For example upon initial login to a social network for the first time in a particular day the user is given a fortune cookie type engagement which identifies friend predictions, and/or solicits predictions.

Figure 13A:
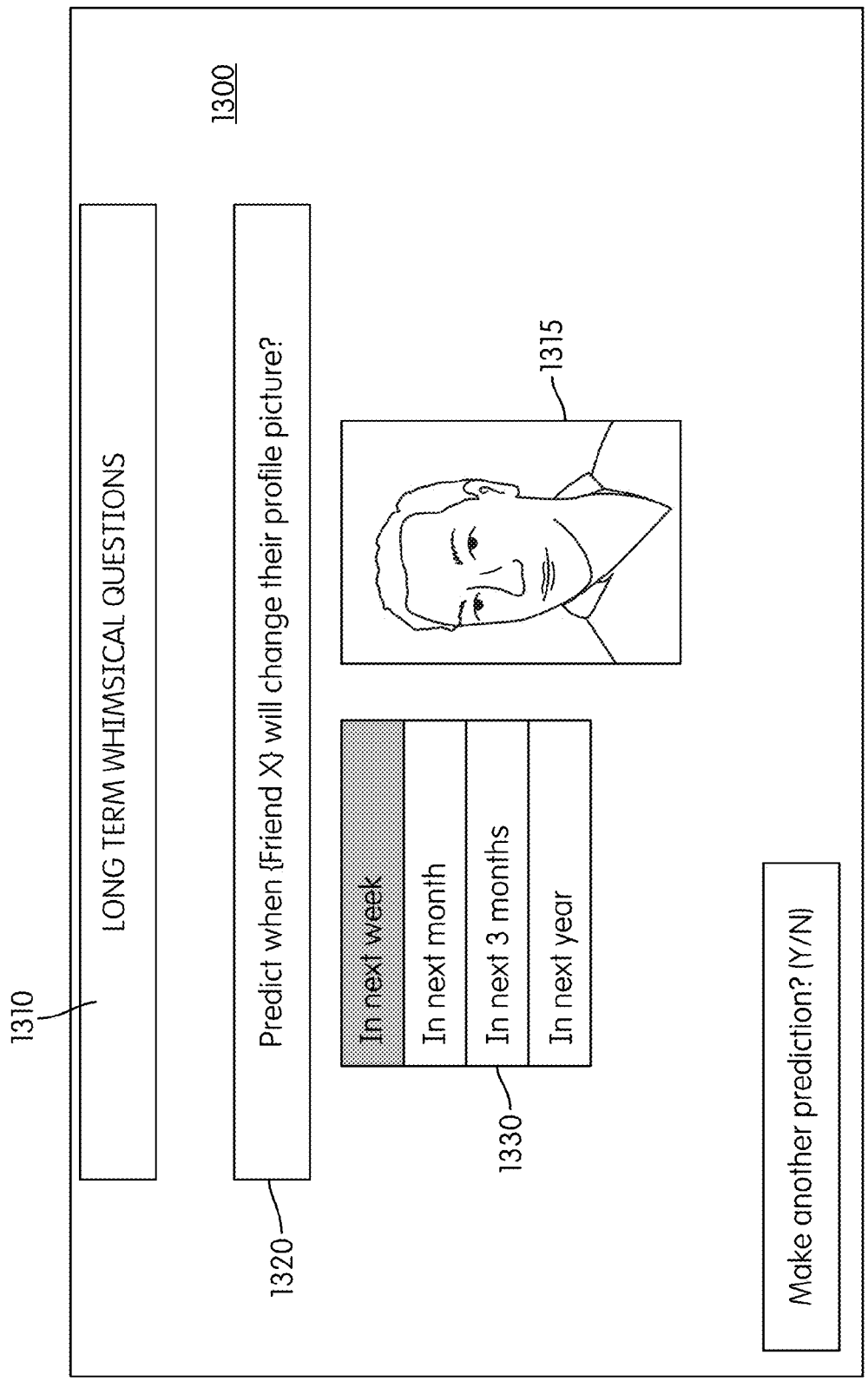

As seen in FIG. 13A another form of questions 1320 presented to users within a graphical interface 1300 could be in the form of longer term predictions 1310, in which users are asked to identify when a particular event will occur through input 1330. This exploits user interest in time-based or time dimension questions which can also be both interesting and useful. Other types of user actions (change in relationship, change in employment, etc.) can be solicited because these events are often telegraphed or communicated to close friends outside the realm of the electronic arena. Embodiments of the present invention therefore can tease out these peripheral or ancillary life events with very light-weight questions.

Again, for users who are more "game" interested, additional predictions can be made for other of their friends or for social network celebrities, etc. As clues, the game can provide feedback to guide the guesses or predictions—i.e., through charts, graphs or other raw data for the event(s) and person(s) of interest. Predictions can be solicited for any graph activity for any actor, and sent to any number of actors' friends: how many "likes" will X make in the next day/week; how many photos will X post; how many games of X; and so on. This feature could incorporate functionality to solicit extra-platform activities as well.

Figure 13B:
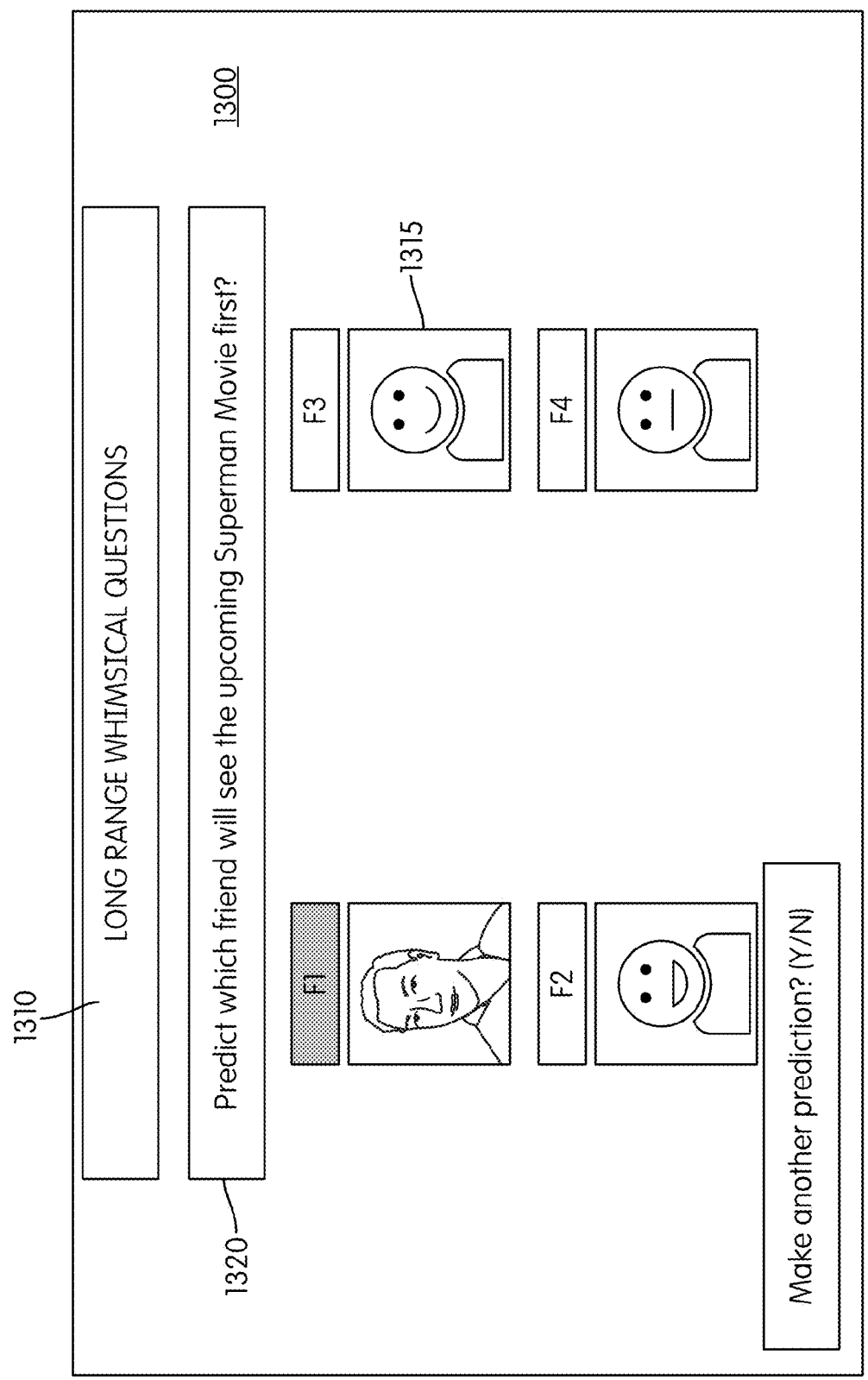

FIG. 13B provides yet another example of a prediction that can be solicited, including predicting which social graph member 1315 will first attend a particular event—here, a movie. Other events, such as concerts, sporting competitions, etc., could be used as well based on a local calendar and schedule of competitions.

Figure 13C:
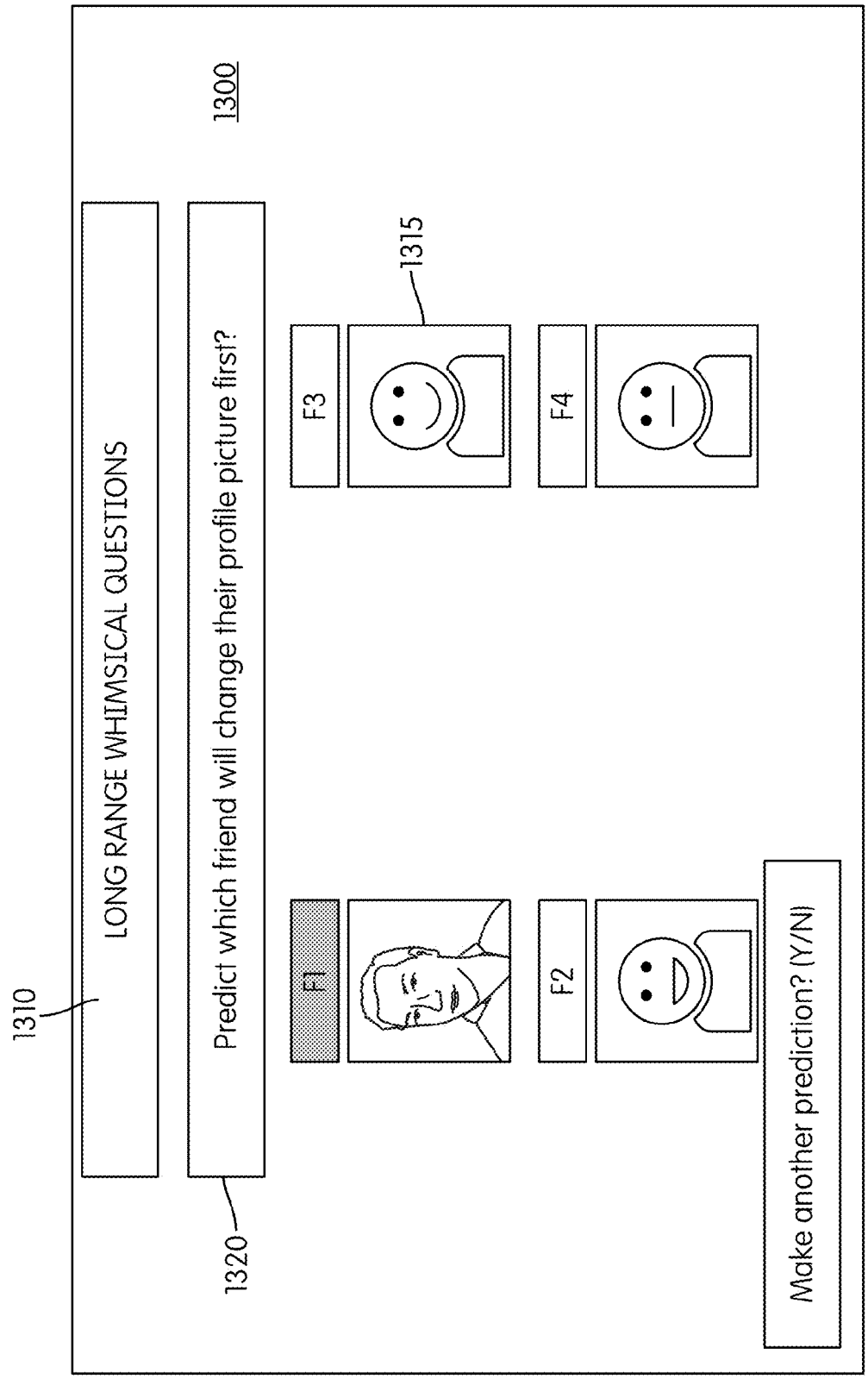

FIG. 13C is similar to the other survey solicitations, as a further playful element is introduced by which the same activity prediction is made across multiple users 1315 in an open ended time dimension. The source of the questions can be derived from a user activity log, and the predefined actions and objects that are associated with the same, as well as external activities.

Any form of activity can be rendered into a game question in this fashion using the basic templates presented herein and an available social network activity log: "Which friend will move first?" "Which friend will change their relationship status?" "Which friend will add 10 new friends fastest?" "Which friend will watch X first?" etc. The questions can be randomized to reduce game fatigue and preserve novelty and serendipity. In some instances, questions can be sponsored by content distributors (i.e. Sony) to ask questions like "Which of your friends will see X-Men first?" Thus questions can be tied to content creation as well, or to the needs and specifications of outside content creators.

Figure 14A:
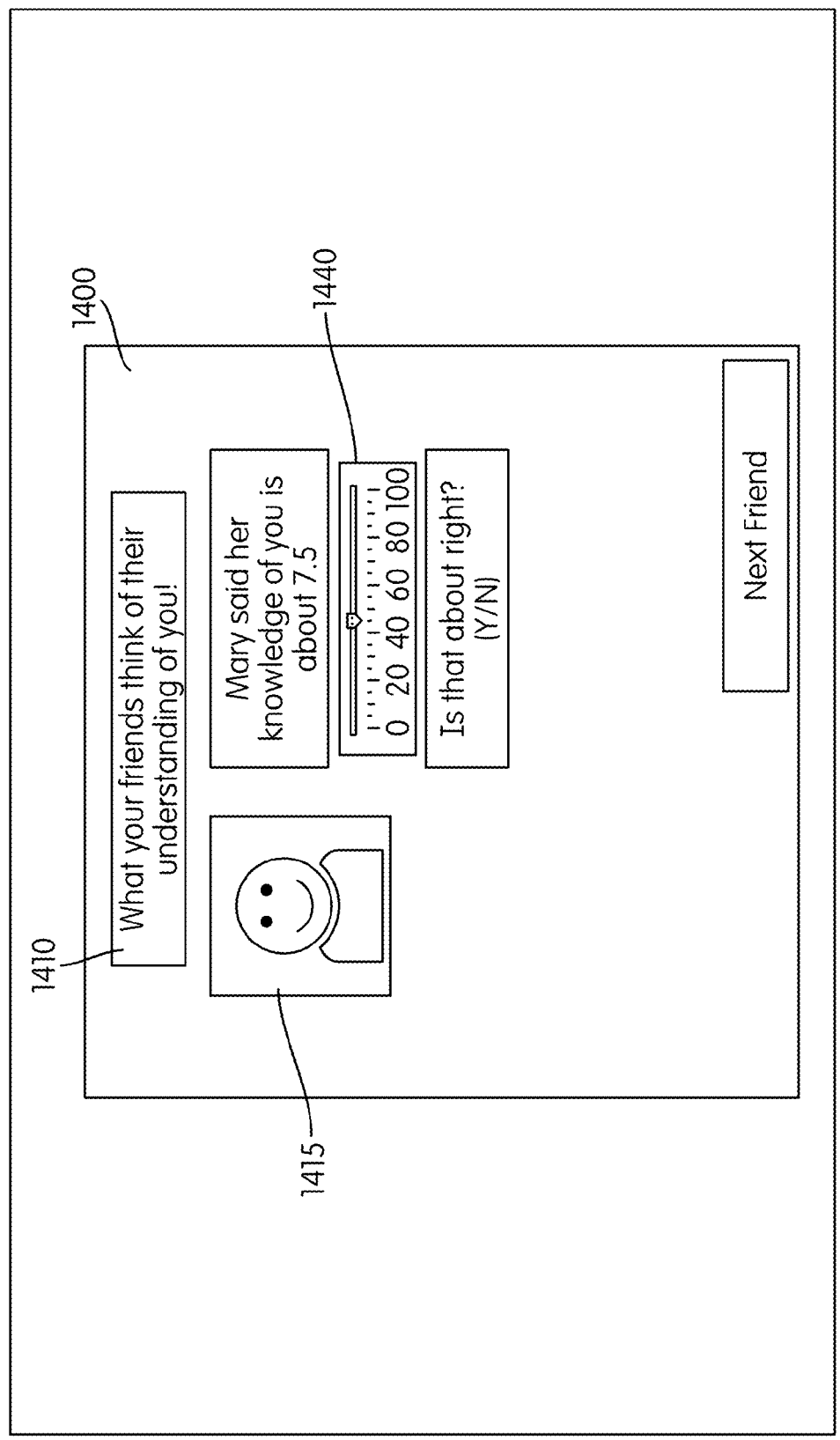

FIG. 14A gives an example of feedback data 1410 and interactions that can be optionally implemented in some embodiments through graphical data presentation/collection interface 1400. The user can be presented with the ratings provided by their friends 1415, and then confirm or modify the rated perception with rating input 1440. This allows both parties to glean insights into the accuracy of perceptions, and can be used by social graph systems as a signal when corroborating new ratings. That is, when two friends confirm that they have a mutual understanding of, or strong correlation in, each other's tastes, this can act as a form of weighted validation in any future prediction by one or the other.

Figure 14B:
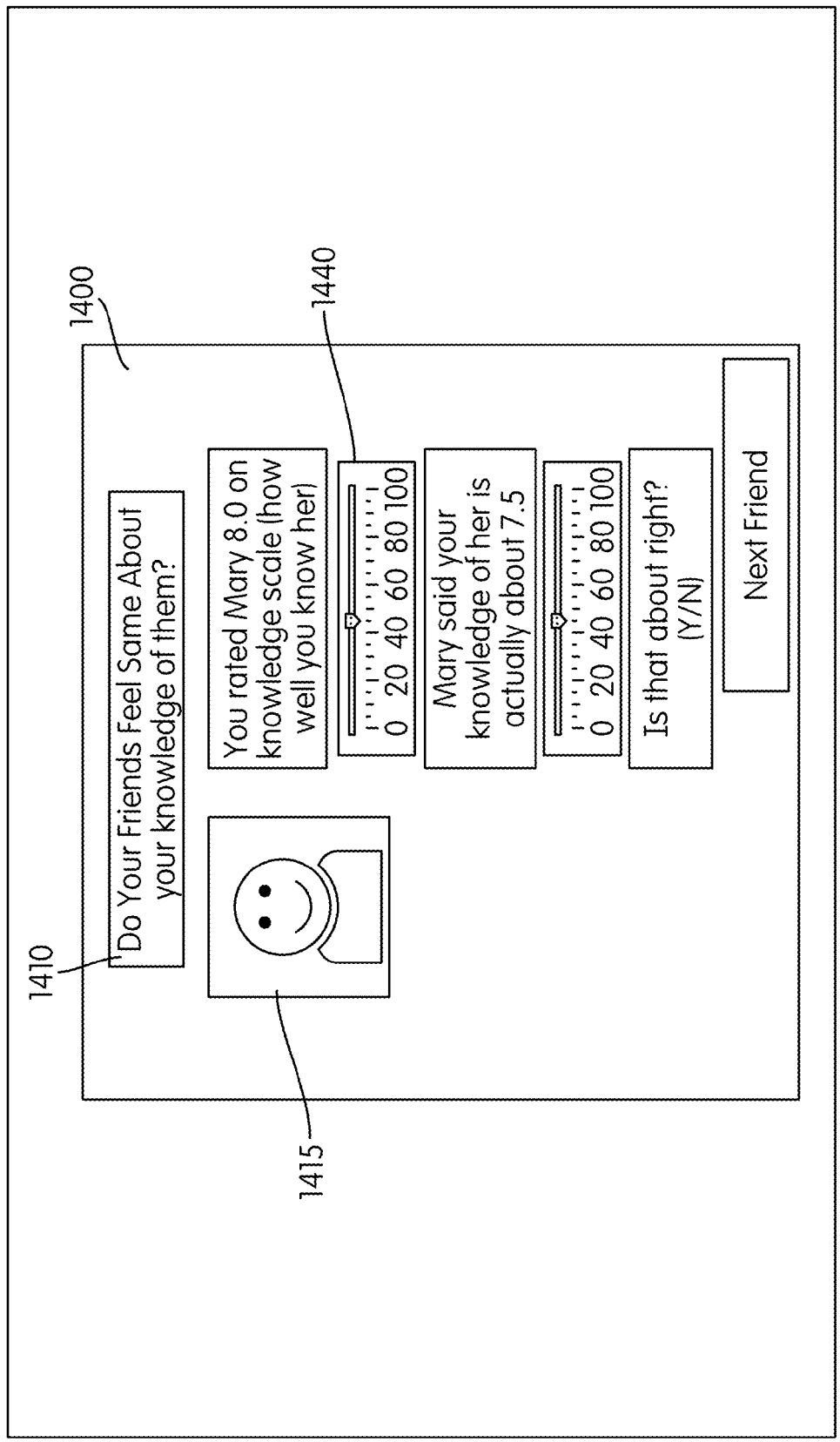

As shown in FIG. 14B, in this feedback-exchange cycle, the user is first asked about a target friend using a query such as shown above. This same query is then passed on to the target friend in a subsequent step, with or without the user's rating data. The friend then returns their ratings of the user's knowledge in a separate communication. The information is integrated into a second notification/query to the user who can then see how the friend felt about the same quiz item. They can accept or reject the friend's input to the question.

By using this kind of query-verify approach, more accurate understandings of the connections, correlations and strengths of edges in a social graph can be constructed. When both users concur or reach agreement on the strength or correlation of a connection, predictions can be much more accurate. Moreover the coefficients/weightings of existing edges can be adjusted based on these inputs by the parties, instead of relying on incomplete or stale data in a social graph.

Figure 15A:
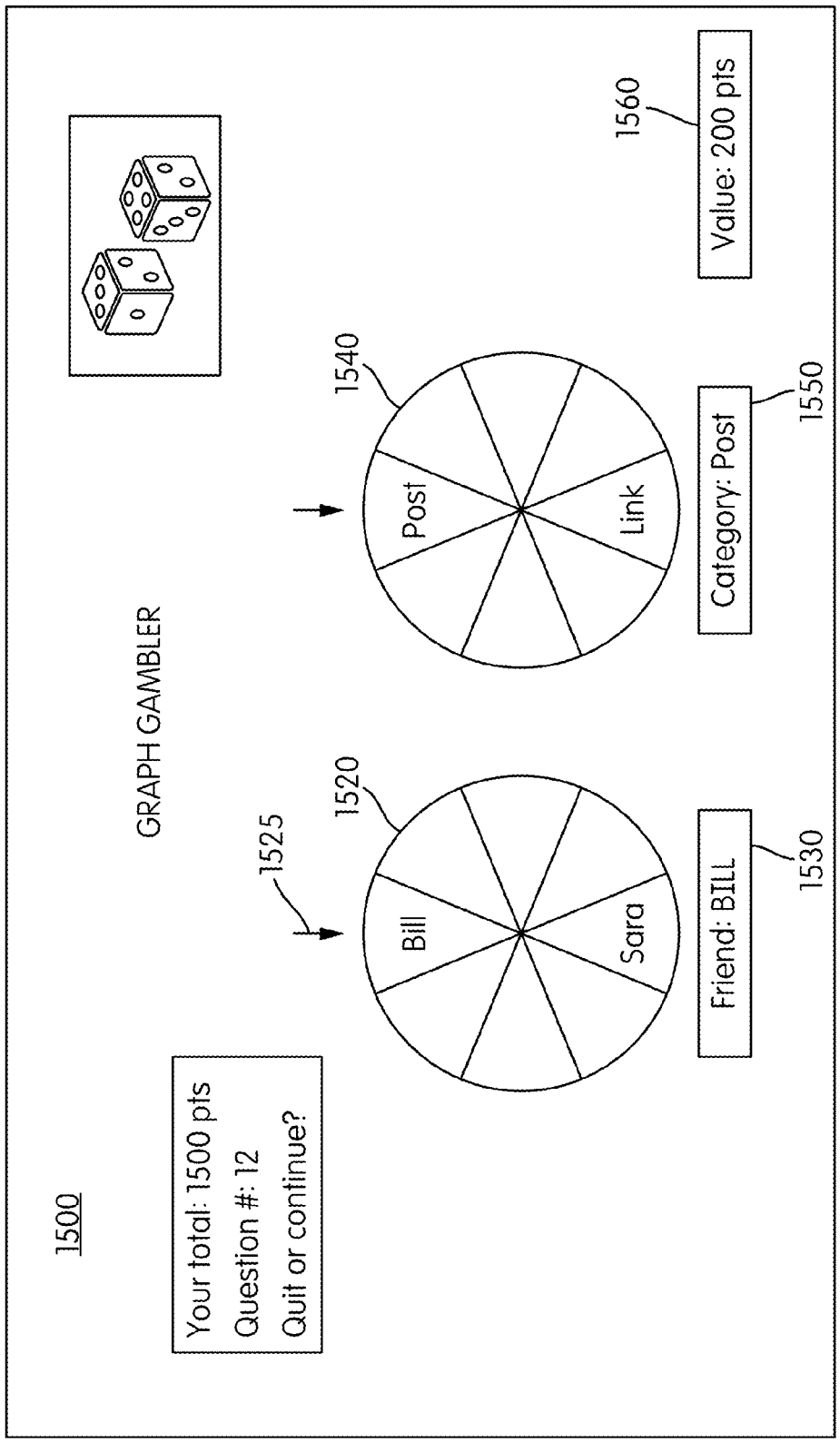
Figure 15B:
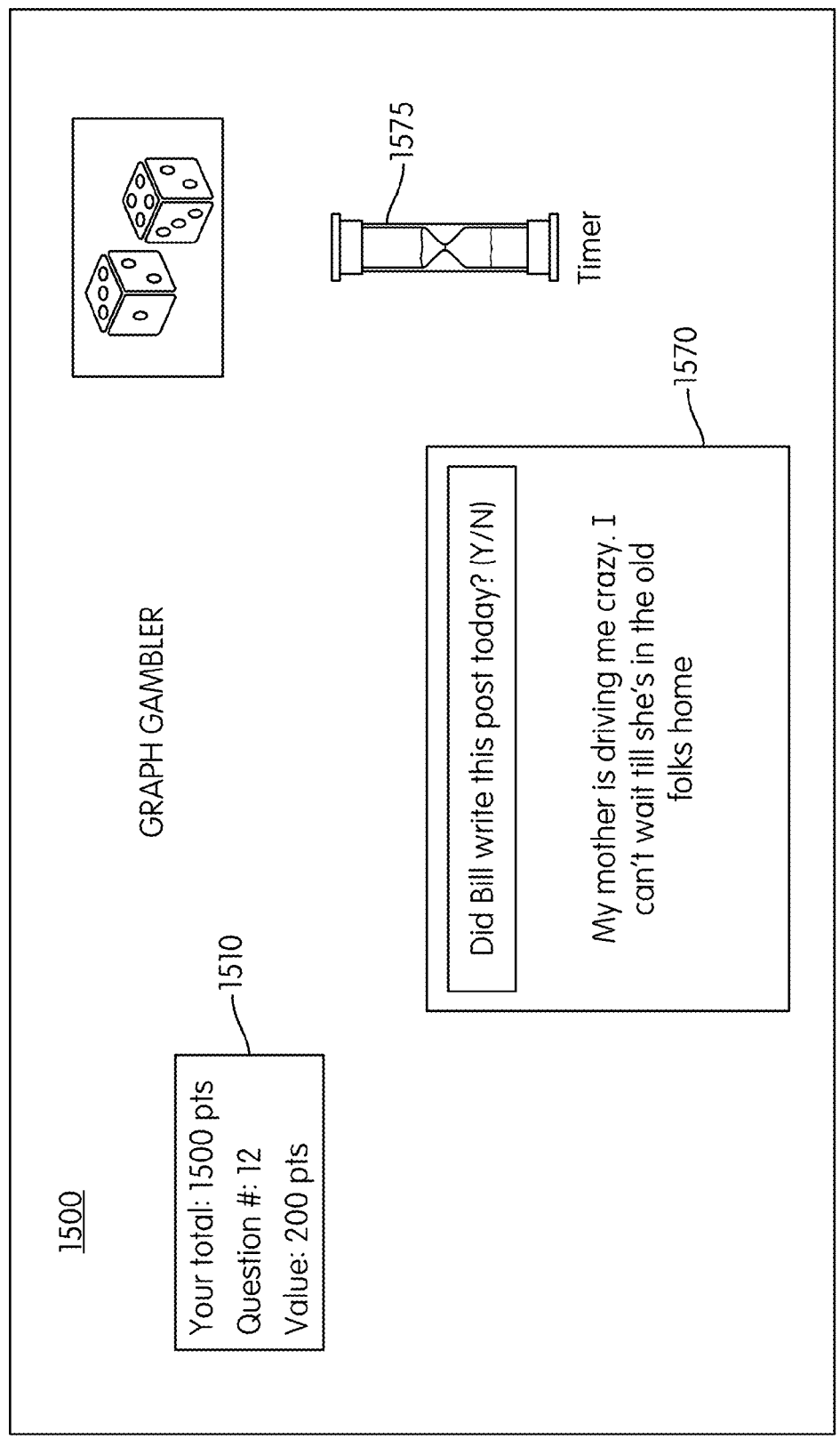

Still another game variant 1500 is shown in FIGS. 15A to 15C, which can be described as "Graph Gambler." This empowers the user to select a randomized social graph question. Here in FIG. 15A for example a type of gambling wheel 1525 can be implemented, which has multiple components: an actor, an action, and a point value. A first spin (which can be triggered by a user touching a mobile phone screen, for example) randomly picks a user friend: BILL as output 1530. The next spin for a second wheel 1540 identifies the type of action category: POST as output 1550.

The value field 1560 may be randomly processed and presented to the user, based on game objectives, question difficulty, etc. The candidates in both random wheels can be chosen by picking out data from an activity graph that can be accessed through APIs on conventional social network platforms. For example, as noted above, social networks track user actions in an activity log, which can be mined to identify the set of actors and actions. Accordingly, for any particular day, there may be N different actors in the user's social graph, and M different activities that can be the entries on the randomized wheel.

The output of Graph Gambler is a social network contact member, and a question 1570 derived from the latter's activities graph as seen in FIG. 15B. After the user has selected the actor and action, the game presents the question to the user.

In this instance, they are asked to confirm whether or not the actor in fact performed the action shown. Again, any type of action can be quizzed in this fashion. As part of the game play, an optional timer 1575 may be used. The game rules could further specify that the user's score 1510 is a function of how many questions they can answer serially without missing. In other instances the user could simply play out all the available questions of the day based on total activity in his/her graph.

Still another game variant 1600 could be implemented in FIG. 16A to permit control over the types of questions that are asked for the social activity game. A matrix can be created from social graph activity of the user's social contacts 1615, which makes it well suited for solitary play. In this version the user selects categories in the form of friends (actors) 1615 and a point value 1620; the output consists of another member, and a predefined social network activity.

Figure 16B:
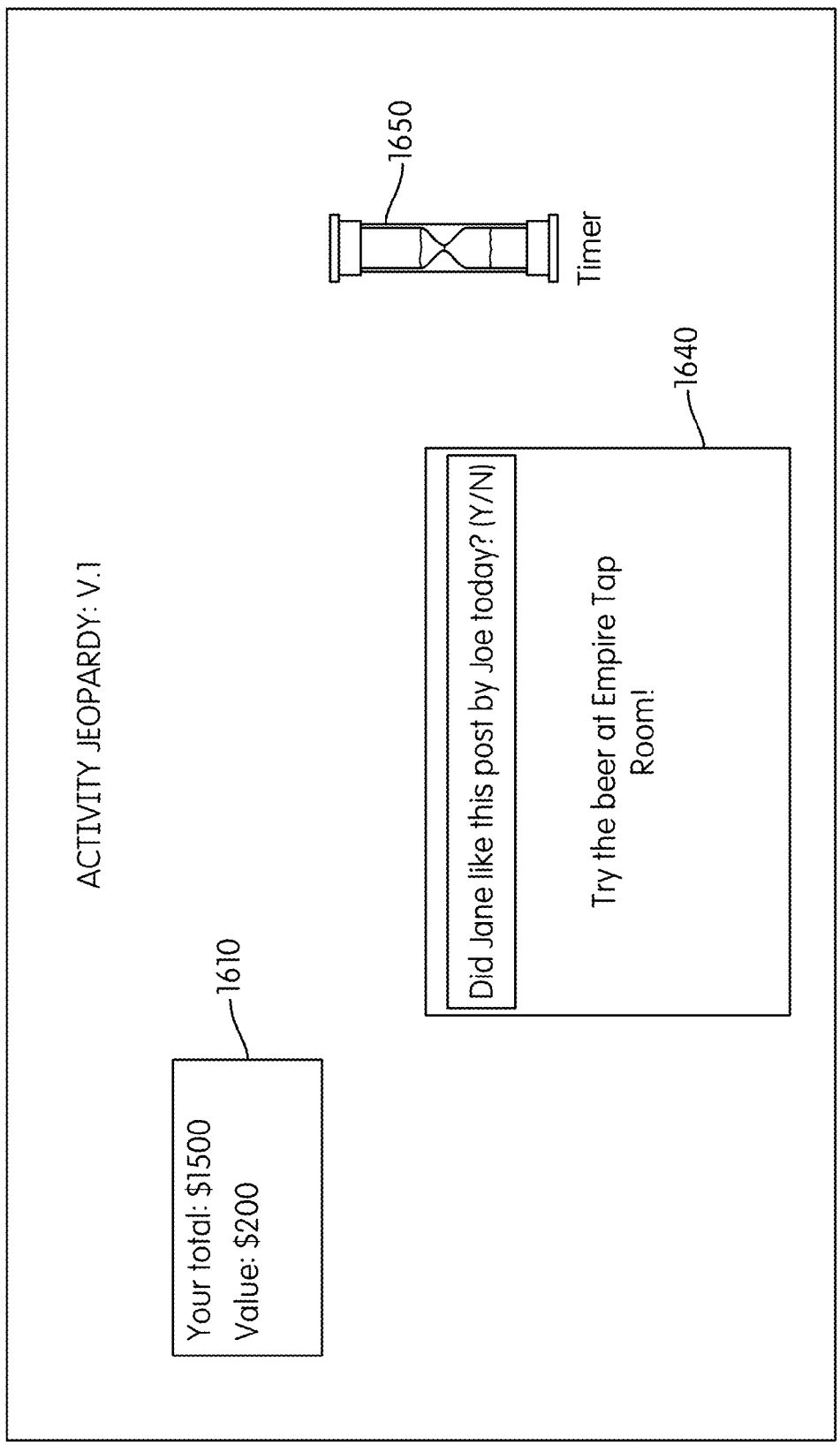

For example "Betty played Jewel" or "Betty Liked this photo" and so on as seen in FIG. 16B. Given a particular actor, the question 1640 can be presented as true/false, or multiple choice, along with appropriated targeted advertising. Optional timers 1650, point scores 1610, etc. can be tabulated as well. Players are permitted to run the game in a solitaire mode, or against other users/friends in an interactive, real-time mode. In other embodiments groups or teams taken from social graphs can compete against other groups or teams from different social graphs as part of one game variant.

FIG. 16C shows another variant, in which the logic is inverted. In this version of the game, social graph activities 1618 ("liked," "posted photo," "listened to music," "read article," "made post") are categories, and the questions then randomly invoke friends (actors). Other variants will be apparent, and are limited only by the extent of data maintained in an interest-activity graph.

FIG. 17 depicts still another game variant which resembles a game of Bingo, but is again adapted for a social network environment. As actors 1720 perform certain activities 1710, cells 1730 in a table 1700 are filled in until an entire row, column or diagonal is rendered, resulting in a game win. In one embodiment the game can randomize and present a single card every day to users which they can peruse and assess for interest. Throughout the day, they can review and see how they "stand" based on the card being filled in through friend activities detected on a social network, or activities on a mobile device, and so on. The first person to win in a game can be notified, along with other contestants. In another variation players can select the friends and activities to create or customize their own cards in an effort to maximize their chances of winning.

Again, status information can be communicated throughout the day to players, who preferably keep their cards secret to avoid alerting others of their needed milestones. As the game is based on user activities, and can't be completed without such, the game has the side effect of causing players to induce activities by friends on the former's behalf. This may or may not be desirable if the activity data is not entirely reliable (meaning, a user "likes" an item solely for the purpose of satisfying a friend's request). However, given that the game's goal is mostly bragging rights, and not monetary, there would be little incentive to cause persons to cheat. The targets may also resist such suggestions, particularly if they are playing the game as well. Game results, tabulations, scores, etc. can be presented to participants and posted on user walls, etc., to recognize player achievements.

Engagement Timing Logic

As noted above, the level and timing of engagement can be tailored on a user by user basis. For example, it can be configured to be N times per day, or whenever the user consumes/rates an item, or whenever the user wants to play, including in an all-you-want perpetual mode, such as game style. More importantly, as alluded to above, when users created new edges from engaging with game content, providing ratings, providing predictions, etc., an item/object score should be tagged with a targeted game delay weighting factor ($G_w$) that is tailored for increasing engagement at optimal times for the friend(s) in question.

In simplified embodiment shown in FIG. 8A, friend selection for predictions/queries can be simply randomized for ease of implementation. In an alternative embodiment, the friend targeting logic can be extremely well controlled to consider a number of factors, depending on available computing power, system requirements, etc.

As raw content for seeding a user's engagement, a game can consider articles read, liked, etc. by a user at step 805. These activities are time stamped and considered by engagement logic 810 and nag logic 812 to place such content into consideration as a candidate game item later at step 820. As seen in FIG. 8A, the engagement logic may be programmed to alert the user to present the content (if the user's score for the same exceeds a rating threshold) newly to the user after a few hours, to remind him/her that they should consider recommending it to a friend as well.

As seen on the right, a number of other parameters can be considered in selecting a target member/actor for a particular action or piece of content. For example, a consideration can be made at step 814 about whether the nominal (non game adjusted) item/object score is above a particular threshold for the user's social graph. When a user consumes content (step 805) or invokes the predictor game logic at step 820, the user's friend list is first filtered at step 830 to remove a candidate that has already consumed the item. In other instances the friend may be the subject of a prediction already as assessed at step 832, so the game attempts to spread the engagement around to other members of the network.

The remaining friend set can be sorted, ranked, etc. based on factors such as least recently engaged friend, randomization, expected content consumption by the friend, expected friend rating, or prior engagement history at step 840. A set of N potential friends is then presented at step 850 to the user. A game object score is then computed, as noted above, for the item and the member who is to receive it. Prior to this however, the game logic can consider the user's rating for the content at step 852 (if not earlier), so that items unlikely to be of interest are not presented to friends to reduce potential noise. A similar consideration can be made based on the user's prediction at step 854; if it does not exceed a particular threshold, it may not be shown to the friend to avoid feed clutter. If the friend's predicted rating is not high enough, the system may re-prompt the user with a different name to try and improve targeting. Otherwise, a set of game modified object scores for the content are computed, and one or more selected for presentation to the friend at step 856. Engagement is then monitored and reported at step 860 as described herein.

In some embodiments of the invention content consumption patterns and schedules can be considered as well as seen in FIGS. 8B-8D. After a user has consumed an item at step 805, and a target friend(s) identified, a prediction for Friend A is preferably made at step 820 before A has consumed the content in question, or the form/quality of queries is reduced. The volume-time consumption pattern for A (and others) can be logged at step 872 to identify ideal targeting times for sending notices at step 852. For example it may be calculated that 50% of A's consumption is before 9 a.m., with a 95% confidence level that all consumption is achieved by a later time $T_f$. This data can be used to affect a game time weighting factor ($G_d$) as noted above, so that the item scoring peaks at the right period. Other timing factors can be calculated and employed to help optimize query formulation.

As seen in FIG. 8C, to develop consumption profiles or models, user review of content is time stamped at step 806. Thus when a user considers an item X at 805, a friend selection for such item is optimized at step 850 based on an available time consumption pool or period calculated at step 840. In the example given B would be selected over A and C because the user event for item X is outside a preferred window for A, C, and best suited for presentation to user B at step 852. Other forms of selection and optimization can be employed to maximize user engagement.

As seen in FIG. 8D user consumption patterns can be measured, developed and exploited on a macro, network level, as opposed to user social graph levels. By considering an entirety of a community or entire consumption log 844, the selection of targets 840 for content can be maximized on a network level. An automated system can create matches of item consumption to item prediction with optimized selections and speed appropriate for its members' patterns using any number of algorithms. On a particular day, a game log starts with measuring a user X consuming an item 1 at T1. The game logic engagement timer includes reference timing windows for each potential member/friend of X. Optimal target friends are then derived from comparing time stamps and reference timing windows, or nag logic times and reference timing windows. The automated scheduler embodied in Timing Logic 152 then engages the user to solicit the prediction, engages the friend to solicit a response, and so on.

Extensions to Other E-Commerce Platforms

The game aspects of the invention can be overlaid on to other platforms that employ or exploit ratings, network graphs, etc.

Figure 18A:
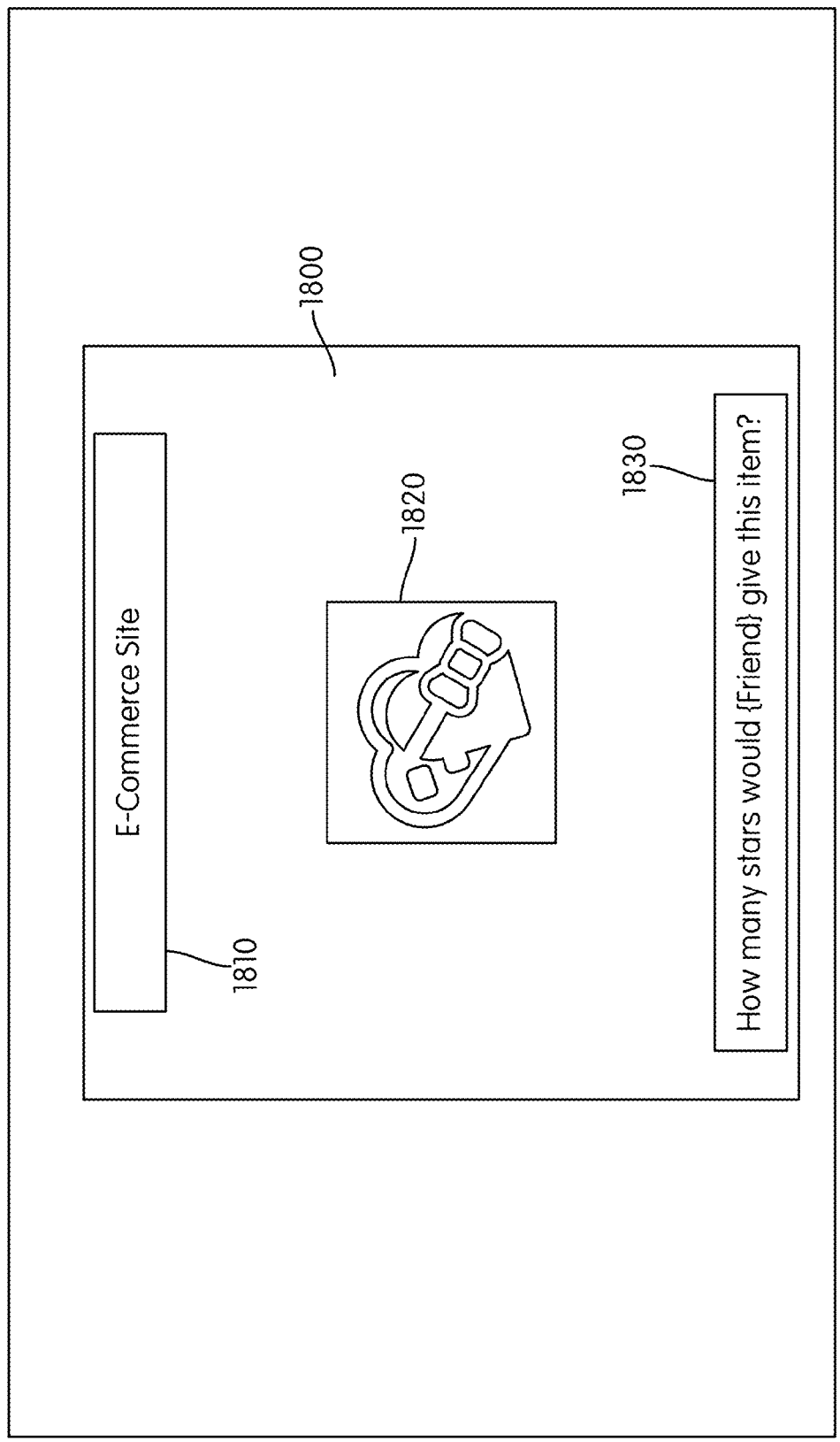

For example, as seen in FIG. 18A purchasers of items 1820 from an e-commerce site can be asked additional survey questions within an interface 1800 that reveal useful information, beyond the simple ratings data currently collected: i.e., how did YOU like this item as seen in field 1810? Rather, as seen in this example, the user's social graph is interrogated and a specific query is made concerning how such friend would rate a particular item in field 1830. Again this type of prediction data is not presently solicited but would add considerable value at low overhead cost.

Figure 18B:
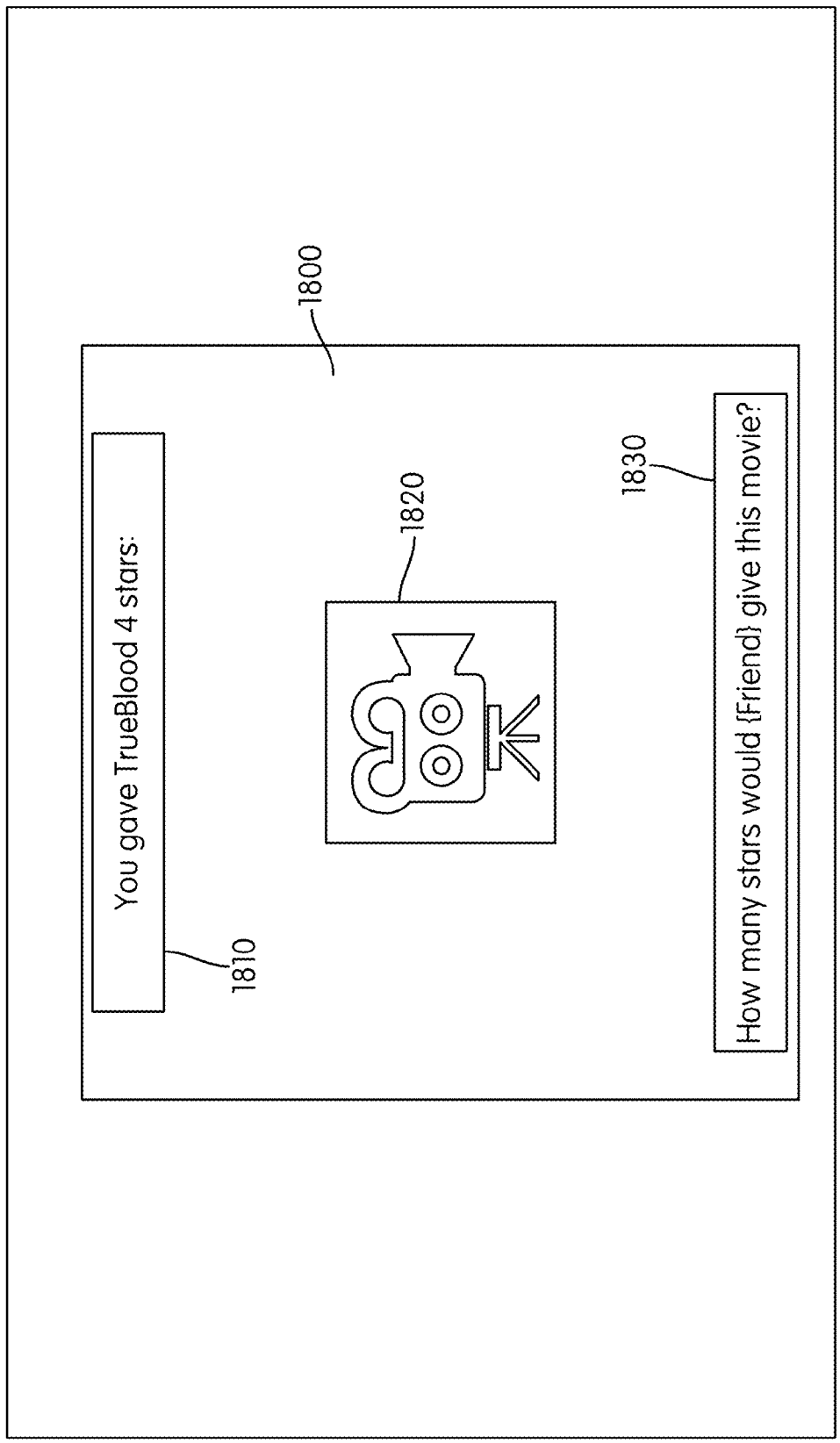

Similarly, as seen in FIG. 18B, a user of a movie/video entertainment service has given a TV series episode identified in field 1820 4 out of 5 stars in rating field 1810. This person is then also asked to identify and specify a rating prediction in field 1830 of how a friend would rate this same episode or movie 1820. Again the solicitation could be made within an interface 1800 presented at any online content service website including at those specializing in movies, user generated content (Youtube) or within an interface on a home set top box (Roku, Hulu, Tivo, etc.), portable computing device, etc. Prediction ratings for titles are collected here to increase recommendation accuracy for content presented to a user's friend network.

Broadcast messaging networks are also widely used, and are constantly searching for mechanisms to engage users, spread content, etc. Twitter is a quasi-social network of this type which could be adapted with game components as well. For example as shown in FIG. 18C, users could be quizzed on which followees or followers made a particular statement (Tweet). Predictions about which one of their followees/followers is likely to post about topic X could also be employed.

Figure 18D:
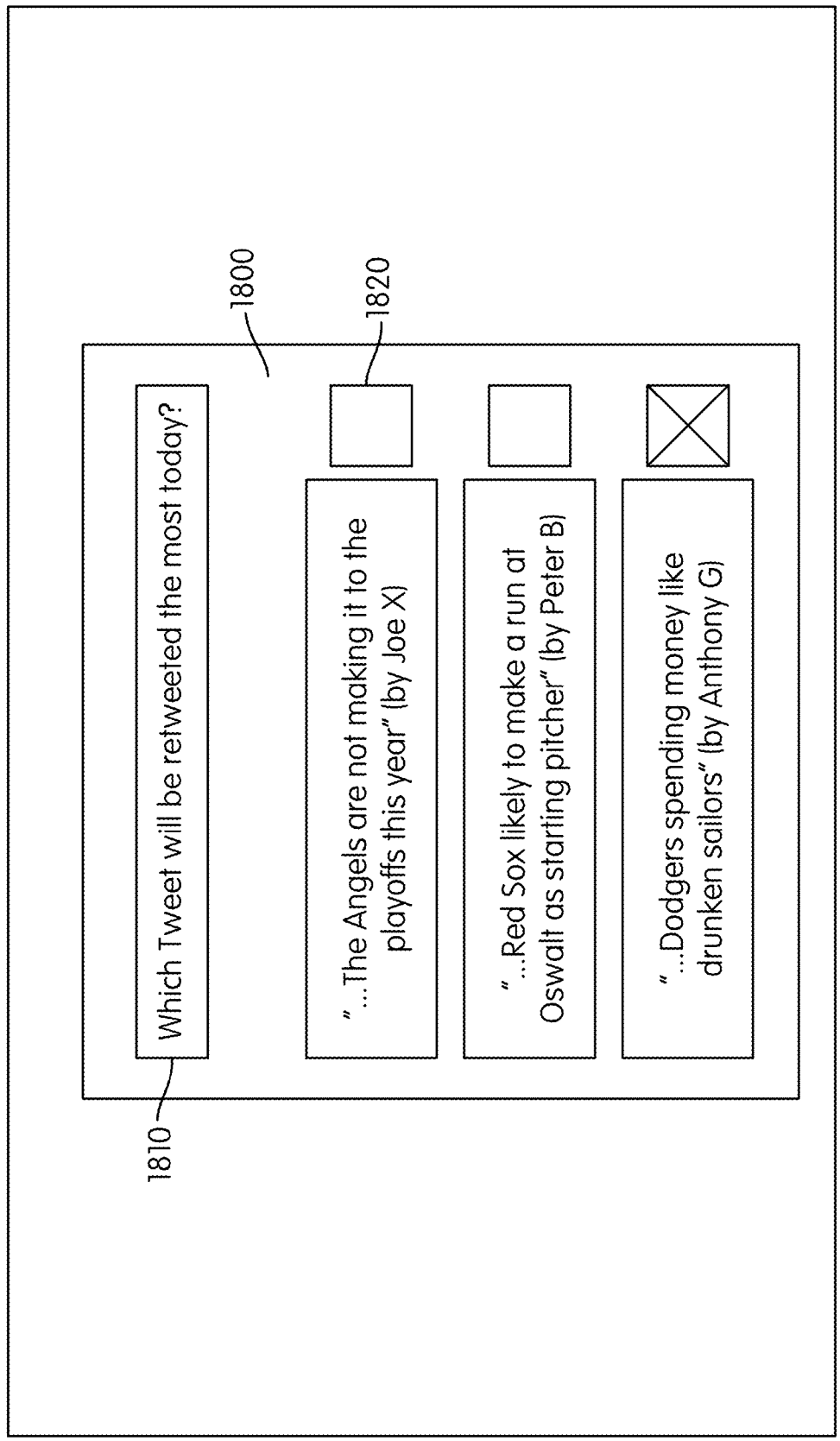

As seen in FIG. 18D, predictions about popularity of content can be solicited as well. Since content on Twitter is very ephemeral (and has a short half life) these predictions should be made very close in time to the initial publication. As with the other embodiments discussed above, the performance of participants can be compiled and made available for community wide or group wide consumption, or even by topic.

FIG. 9 is a diagram illustrating the general time-action-actor relationship that can be considered as a form of query/prediction template generator. Different types of predictions are solicited at different times, and with different objectives, dynamics and feedback. The result of certain types of predictions causes secondary feedback to be generated, which is then used to create further engagement. As seen in the flow diagram, a first type of user prediction (will F1 do Action Y, such as "like" a photo) is solicited and generated with the user's assistance. This event, in turn, can be the source of content for a follow up question to the actor F1 at a later time, post activity, such as after F1 has actually rated the photo, or some predefined period of time has passed. The different types of predictions and guesses are noted in the diagram.

Table 1 below summarizes the types of questions—queries, what they implicate, and the general significance of each within the MANDEIVO™ game. It will be understood that other forms of predictions, queries, etc. could be solicited of course depending on the platform and data that is acquired.

TABLE 1

| QUESTION TYPE | DETAILS | SIGNIFICANCE |
| --- | --- | --- |
| Pre-action "prediction" | User asked about friend action before action occurs | "How well do you know X" User becomes connected with friend/mindset; playful voyeurism b/c user does now know answer and will want to confirm result Best for $1^{st}$-$2^{nd}$ level friends; reinforces existing relationship |
| Post-action "guess/quiz" | User asked about friend action after action occurs | "How much do you follow X" Similar to above; can pick different, less connected friends to increase engagement b/c answers can be checked by user and cause positive report to friend Best for $2^{nd}$-$3^{rd}$ tier friends outside bubble whose behavior can't be predicted, but can be assessed for credibility |
| Post-prediction "guess" | User asked about prediction made by friend about the user | "How well does X know you" Reciprocal of ideas above. User forced to think about how others perceive him/her; prob best for closest friends within bubble. Wrong answer has low social/reputation cost. |

Table 2 illustrates the general types of feedback, the details and significance of each with game embodiments. It will be understood that other forms of feedback could be generated of course depending on the platform and data that is acquired.

TABLE 2

| FEEDACK TYPE | DETAILS | SIGNIFICANCE |
| --- | --- | --- |
| User pre-action "prediction" | User told whether friend took action predicted by user | "How well do you know X" User gets feedback on his/her knowledge of friend |
| User Post-action "guess/quiz" | User told whether action by Friend occurred | "How much do you follow X" User ability to find or guess relevant behavior |
| Friend "prediction" or guess/quiz | Reciprocal of above; User told of Friend's prediction of user action, or guess or quiz | "How well does X know you" User is given insight on Friend's perception of user, or interest (in the case of verifiable answers which can be checked by friend) |
| User-friend correlations | User given rankings of how close (far) they are to other members based on content comparisons | "Who is most like/unlike me in my social graph" Users find affinities - based on content ratings - that may not be known |
| User scores | User given his/her prediction accuracy, scores, etc. | "How good am I at predicting my friends' behavior" Bragging rights and |

TABLE 2-continued

| FEEDACK TYPE | DETAILS | SIGNIFICANCE |
| --- | --- | --- |
| Friend - network scores | User given scores for friends in their social graph | emotional closeness "What does my social graph look like" Users find other strong networkers/friends in their graph, network diversity, etc. |

It will be apparent to those skilled in the art that this is not the entire set of hardware machines and software modules that can be used, or an exhaustive list of all operations executed by such modules. It is expected, in fact, that other features will be added by system operators in accordance with customer preferences and/or system performance requirements. Furthermore, while not explicitly shown or described herein, the details of the various software routines, executable code, etc., required to effectuate the functionality discussed above in such modules are not material to the present invention, and may be implemented in any number of ways known to those skilled in the art. Such code, routines, etc. may be stored in any number of forms of machine readable media. The above descriptions are intended as merely illustrative embodiments of the proposed inventions. It is understood that the protection afforded the present invention also comprehends and extends to embodiments different from those above, but which fall within the scope of the present claims.

What is claimed is:

1. A computer-implemented method of recommending content to users of a social network based on values embodied in a social graph the improvement comprising:
    monitoring and measuring user activities with a computing system to create edges and nodes for the social graph connecting said users to each other as well as to a set of items;
    wherein the social graph is stored in an electronic data file identifying said edges, said nodes and associated values of each;
    soliciting a first prediction with the computing system from a second user connected in the social graph to said first user concerning a first rating that said first user would give to a target item in said set of items;
    wherein said target item is represented by a first node that is not yet connected to said first user in said social graph;
    creating at least a tentative edge with the computing system in said social graph connecting said first node for said target item to said first user based in part at least on said first prediction;
    wherein recommendations for one of said set of items, including said target item, are generated by a recommender computing system for said first user based in part at least on said tentative edge in said social graph.

2. The method of claim 1 further including a step: converting said tentative edge to a permanent edge in the social graph after obtaining an actual rating from said first user.

3. The method of claim 1 wherein an accuracy of said first prediction is computed and presented for said second user within a graphical interface.

4. The method of claim 1 further including a step: computing an accuracy of multiple first predictions made by other second users for said first user, and presenting such results to said first user within a graphical interface.

5. The method of claim 1 wherein said recommendations are further generated and presented to said first user at a time derived from monitoring prior content consumption behavior by said first user.

6. The method of claim 1 wherein recommendations are presented only to a subset of first users connected to the second user, which subset is selected based on which of said first users satisfies a time-based content consumption behavior.

7. The method of claim 1 further including a step: calculating which of a plurality of first users connected in said social graph to said second user should receive a first prediction from said second user based on an affinity score.

8. The method of claim 1 further including a step: calculating which of a plurality of first users connected in said social graph to said second user should receive a first prediction from said second user based on optimizing and/or augmenting a number of nodes and edges in said social graph.

9. The method of claim 1 wherein said first prediction is selected from a plurality of different types of predictions, wherein a different prediction type is associated with a respective different connection strength in the social graph between said first user and said second user.

10. The method of claim 1, further including steps: soliciting a second prediction with the computing system from said first user concerning said first rating provided by said second user; comparing said first prediction and said second prediction; and adjusting a weighting of an edge connection between said first user and said second user based on said comparing.

11. The method of claim 1 wherein said tentative edge is given a different weighting than an explicit edge in said social network graph.

12. A computer-implemented method of recommending content to users of a social network based on values embodied in a social graph the improvement comprising:
    monitoring and measuring activities of a set of users with a computing system at a social networking site to create explicit edges and nodes for the social graph connecting users to each other as well as to a set of items based on ratings and friend designations made by said set of users;
    wherein the social graph is stored in an electronic data file identifying said edges, said nodes and associated values of each;
    analyzing said social graph to identify data sparsities corresponding to a lack of explicit ratings data for said set of users and/or said set of items;
    selecting one of a first user and a second user connected in said social graph to said first user from said set of users based on identifying said data sparsities;
    soliciting a first prediction with the computing system from said second user concerning a first rating that said first user would give to a target item in said set of items;
    wherein said target item is represented by a first node that is not yet connected with an explicit edge to said first user in said social graph;
    creating at least a tentative edge with the computing system in said social graph connecting said first node for said target item to said first user based in part at least on said first prediction;
    wherein recommendations for one of said set of items, including said target item, are generated by a recommender computing system for said first user based in part at least on both explicit edges and tentative edges in said social graph.

13. The method of claim 12 further including a step: notifying said first user of said first prediction as part of presenting said recommendations to said first user.

14. The method of claim 12 wherein said data sparsities are identified for users calculated to be likely to defect from said social network site.

15. The method of claim 12 wherein said second user is selected by identifying friends who have not engaged with the first user within a predetermined past period.

16. The method of claim 12 wherein said tentative edge is given a different weighting than an explicit edge in said social network graph.

17. The method of claim 12 wherein a set of optimal friends are calculated and selected for maximum information contribution to the social graph used by the recommender system.

\* \* \* \* \*